US009966865B2

(12) United States Patent
Shimura et al.

(10) Patent No.: US 9,966,865 B2
(45) Date of Patent: May 8, 2018

(54) POWER SUPPLY APPARATUS AND IMAGE FORMING APPARATUS

(71) Applicant: CANON KABUSHIKI KAISHA, Tokyo (JP)

(72) Inventors: Yasuhiro Shimura, Yokohama (JP); Hiroki Asano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/174,222

(22) Filed: Jun. 6, 2016

(65) Prior Publication Data

US 2017/0005585 A1    Jan. 5, 2017

(30) Foreign Application Priority Data

Jun. 30, 2015 (JP) ................................. 2015-131592
Jun. 30, 2015 (JP) ................................. 2015-131593

(51) Int. Cl.
*H02M 1/00* (2006.01)
*H02M 3/335* (2006.01)
*G03G 15/00* (2006.01)

(52) U.S. Cl.
CPC ........ *H02M 3/33569* (2013.01); *G03G 15/80* (2013.01); *H02M 2001/0006* (2013.01);
(Continued)

(58) Field of Classification Search
CPC ......... H02M 3/33569; H02M 3/33507; H02M 2001/0032; H02M 3/33561;
(Continued)

(56) References Cited

U.S. PATENT DOCUMENTS 4,937,728 A * 6/1990 Leonardi ........... H02M 3/33523
363/19
6,061,252 A * 5/2000 Hosotani ............. H02M 3/3385
363/134
(Continued)

FOREIGN PATENT DOCUMENTS

JP    H11-187664 A    7/1999
JP    2003-009528 A   1/2003
(Continued)

*Primary Examiner* — Clayton E Laballe
*Assistant Examiner* — Ruifeng Pu
(74) *Attorney, Agent, or Firm* — Fitzpatrick, Cella, Harper & Scinto

(57) ABSTRACT

The power supply apparatus includes a control unit that can perform intermittent operation of alternately repeating a switching period and a switching halt period, wherein the switching period is for performing switching operation of alternately turning on or turning off two switching elements across a turn-off period for turning off both of the two switching elements, and the switching halt period is for halting the switching operation. In a transition from the switching period to the switching halt period, the control unit makes the transition to the switching halt period after turning on a second switching element. In a transition from the switching halt period to the switching period, the control unit also makes the transition to the switching period after turning on the second switching element.

57 Claims, 20 Drawing Sheets

(52) U.S. Cl.
CPC ............. *H02M 2001/0035* (2013.01); *H02M 2001/0048* (2013.01); *H02M 2001/0058* (2013.01); *Y02B 70/1491* (2013.01); *Y02B 70/16* (2013.01)

(58) Field of Classification Search
CPC ....... H02M 3/3385; H02M 2001/0006; H02M 2001/0035; H02M 2001/0048; H02M 2001/0058; Y02B 70/16
See application file for complete search history.

(56) References Cited

U.S. PATENT DOCUMENTS

| | | | | |
|---|---|---|---|---|
| 6,201,713 | B1* | 3/2001 | Hosotani | H02M 1/34 363/131 |
| 6,282,385 | B1* | 8/2001 | Suto | G03G 15/065 399/282 |
| 2006/0062024 | A1* | 3/2006 | Hosotani | H02M 3/33569 363/16 |
| 2008/0049472 | A1* | 2/2008 | Nishida | H02M 3/3381 363/84 |
| 2008/0291702 | A1* | 11/2008 | Hosotani | H02M 3/33569 363/21.02 |
| 2009/0251925 | A1* | 10/2009 | Usui | H02M 3/33561 363/16 |
| 2011/0103100 | A1* | 5/2011 | Hosotani | H01F 3/10 363/21.02 |
| 2012/0314454 | A1* | 12/2012 | Hosotani | H02M 3/33507 363/21.01 |
| 2013/0250625 | A1* | 9/2013 | Yamaguchi | H02M 3/33507 363/21.02 |
| 2013/0250626 | A1* | 9/2013 | Hosotani | H02M 3/33553 363/21.02 |
| 2013/0272031 | A1* | 10/2013 | Hosotani | H02M 3/33569 363/16 |
| 2015/0003121 | A1 | 1/2015 | Yang et al. | |
| 2016/0020703 | A1* | 1/2016 | Gong | H02M 3/33592 363/21.14 |

FOREIGN PATENT DOCUMENTS

| | | |
|---|---|---|
| JP | 4370844 B2 | 11/2009 |
| JP | 2013-201829 A | 10/2013 |

* cited by examiner (i) VOLTAGE BETWEEN FET1 GATE AND POWER SOURCE (DRV-L)
(ii) VOLTAGE BETWEEN FET2 GATE AND POWER SOURCE (DRV-H)
(iii) VOLTAGE BETWEEN FET1 GATE AND POWER SOURCE
(iv) FET1 DRAIN CURRENT (INCLUDING CURRENT FLOWING IN C1 AND D1)
(v) FET2 DRAIN CURRENT (INCLUDING CURRENT FLOWING IN D2)
(vi) CURRENT FLOWING IN D11

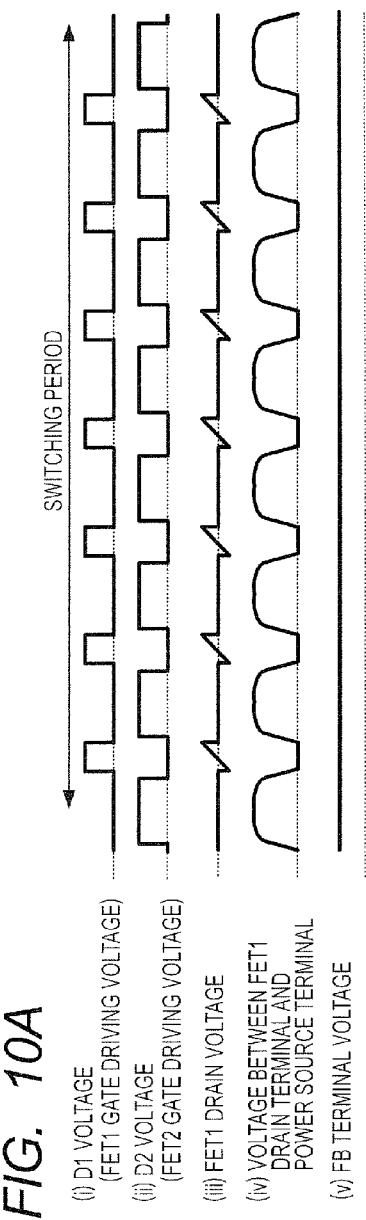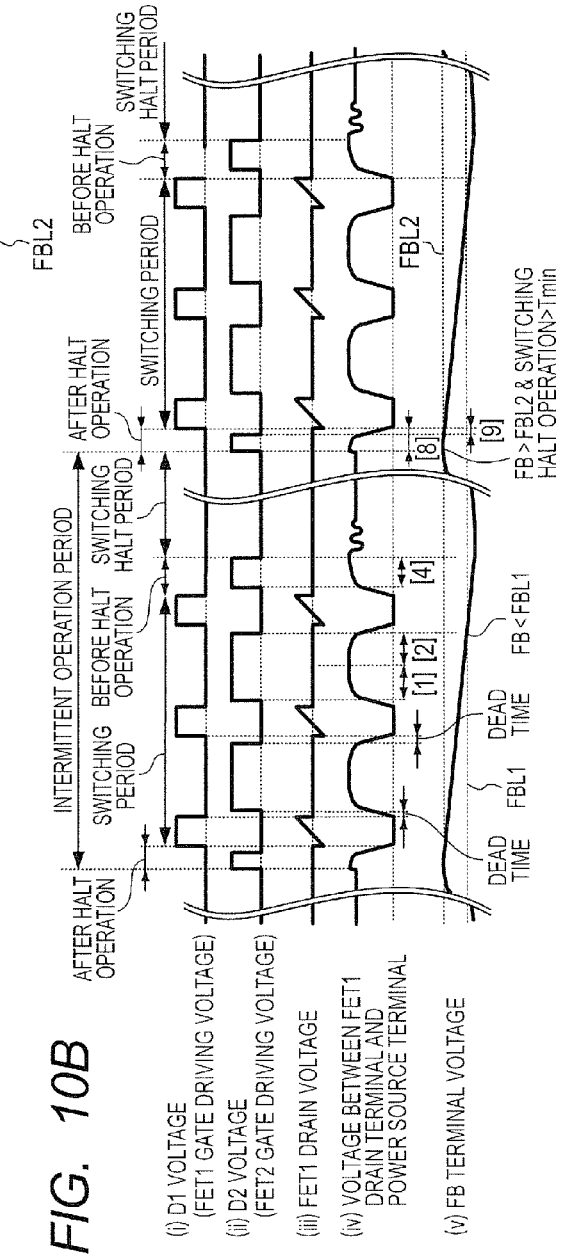

FIG. 12

TARGET VOLTAGE = 24V

V1SN TERMINAL VOLTAGE = 51dec
(EQUIVALENT TO 225V AS AC POWER SUPPLY VOLTAGE)

| FB TERMINAL VOLTAGE [dec] | TIME1 | TIME2 | TIME1/TIME2 |
|---|---|---|---|
| 1 | 0.13 μs | 0.21 μs | 0.606251 |
| 2 | 0.26 μs | 0.42 μs | 0.609132 |
| 3 | 0.38 μs | 0.63 μs | 0.612039 |
| 4 | 0.51 μs | 0.83 μs | 0.614975 |
| 5 | 0.64 μs | 1.04 μs | 0.617939 |
| 6 | 0.77 μs | 1.24 μs | 0.620932 |
| 7 | 0.90 μs | 1.44 μs | 0.623954 |
| 8 | 1.03 μs | 1.64 μs | 0.627006 |
| 9 | 1.15 μs | 1.83 μs | 0.630087 |
| 10 | 1.28 μs | 2.02 μs | 0.633199 |
| 11 | 1.41 μs | 2.22 μs | 0.636342 |
| 12 | 1.54 μs | 2.41 μs | 0.639516 |
| 13 | 1.67 μs | 2.59 μs | 0.642722 |
| 14 | 1.79 μs | 2.78 μs | 0.645961 |
| 15 | 1.92 μs | 2.96 μs | 0.649232 |
| 16 | 2.05 μs | 3.14 μs | 0.652536 |
| 17 | 2.18 μs | 3.32 μs | 0.655875 |
| 18 | 2.31 μs | 3.50 μs | 0.659247 |
| 19 | 2.44 μs | 3.68 μs | 0.662655 |
| 20 | 2.56 μs | 3.85 μs | 0.666098 |
| 21 | 2.69 μs | 4.02 μs | 0.669576 |
| 22 | 2.82 μs | 4.19 μs | 0.673092 |
| 23 | 2.95 μs | 4.36 μs | 0.676644 |
| 24 | 3.08 μs | 4.52 μs | 0.680234 |
| 25 | 3.21 μs | 4.69 μs | 0.683863 |
| 26 | 3.33 μs | 4.85 μs | 0.68753 |
| 27 | 3.46 μs | 5.01 μs | 0.691237 |
| 28 | 3.59 μs | 5.17 μs | 0.694984 |
| 29 | 3.72 μs | 5.32 μs | 0.698772 |
| 30 | 3.85 μs | 5.47 μs | 0.702602 |
| 31 | 3.97 μs | 5.63 μs | 0.706473 |
| 32 | 4.10 μs | 5.78 μs | 0.710388 |
| 33 | 4.23 μs | 5.92 μs | 0.714346 |
| 34 | 4.36 μs | 6.07 μs | 0.718349 |
| 35 | 4.49 μs | 6.21 μs | 0.722396 |
| 36 | 4.62 μs | 6.35 μs | 0.72649 |
| 37 | 4.74 μs | 6.49 μs | 0.73063 |
| 38 | 4.87 μs | 6.63 μs | 0.734818 |
| 39 | 5.00 μs | 6.77 μs | 0.739054 |
| 40 | 5.13 μs | 6.90 μs | 0.743339 |
| 41 | 5.26 μs | 7.03 μs | 0.747674 |
| 42 | 5.38 μs | 7.16 μs | 0.75206 |
| 43 | 5.51 μs | 7.29 μs | 0.756497 |
| 44 | 5.64 μs | 7.41 μs | 0.760988 |
| 45 | 5.77 μs | 7.54 μs | 0.765532 |
| 46 | 5.90 μs | 7.66 μs | 0.77013 |
| 47 | 6.03 μs | 7.78 μs | 0.774784 |
| 48 | 6.15 μs | 7.89 μs | 0.779495 |
| 49 | 6.28 μs | 8.01 μs | 0.784264 |
| 50 | 6.41 μs | 8.12 μs | 0.789091 |
| 51 | 6.54 μs | 8.24 μs | 0.793978 |
| 52 | 6.67 μs | 8.34 μs | 0.798925 |
| 53 | 6.79 μs | 8.45 μs | 0.803935 |
| 54 | 6.92 μs | 8.56 μs | 0.809008 |
| 55 | 7.05 μs | 8.66 μs | 0.814146 |
| 56 | 7.18 μs | 8.76 μs | 0.819349 |
| 57 | 7.31 μs | 8.86 μs | 0.824619 |
| 58 | 7.44 μs | 8.96 μs | 0.829957 |
| 59 | 7.56 μs | 9.05 μs | 0.835365 |
| 60 | 7.69 μs | 9.15 μs | 0.840844 |
| 61 | 7.82 μs | 9.24 μs | 0.846395 |
| 62 | 7.95 μs | 9.33 μs | 0.85202 |
| 63 | 8.08 μs | 9.42 μs | 0.85772 |

V1SN TERMINAL VOLTAGE = 48dec
(EQUIVALENT TO 215V AS AC POWER SUPPLY VOLTAGE)

| FB TERMINAL VOLTAGE [dec] | TIME1 | TIME2 | TIME1/TIME2 |
|---|---|---|---|
| 1 | 0.13 μs | 0.21 μs | 0.634449 |
| 2 | 0.27 μs | 0.42 μs | 0.637463 |
| 3 | 0.40 μs | 0.63 μs | 0.640506 |
| 4 | 0.54 μs | 0.83 μs | 0.643579 |
| 5 | 0.67 μs | 1.04 μs | 0.646681 |
| 6 | 0.81 μs | 1.24 μs | 0.649813 |
| 7 | 0.94 μs | 1.44 μs | 0.652975 |
| 8 | 1.07 μs | 1.64 μs | 0.656169 |
| 9 | 1.21 μs | 1.83 μs | 0.659394 |
| 10 | 1.34 μs | 2.02 μs | 0.66265 |
| 11 | 1.48 μs | 2.22 μs | 0.66594 |
| 12 | 1.61 μs | 2.41 μs | 0.669261 |
| 13 | 1.74 μs | 2.59 μs | 0.672617 |
| 14 | 1.88 μs | 2.78 μs | 0.676006 |
| 15 | 2.01 μs | 2.96 μs | 0.679429 |
| 16 | 2.15 μs | 3.14 μs | 0.682887 |
| 17 | 2.28 μs | 3.32 μs | 0.68638 |
| 18 | 2.42 μs | 3.50 μs | 0.68991 |
| 19 | 2.55 μs | 3.68 μs | 0.693476 |
| 20 | 2.68 μs | 3.85 μs | 0.697079 |
| 21 | 2.82 μs | 4.02 μs | 0.70072 |
| 22 | 2.95 μs | 4.19 μs | 0.704398 |
| 23 | 3.09 μs | 4.36 μs | 0.708116 |
| 24 | 3.22 μs | 4.52 μs | 0.711873 |
| 25 | 3.35 μs | 4.69 μs | 0.71567 |
| 26 | 3.49 μs | 4.85 μs | 0.719508 |
| 27 | 3.62 μs | 5.01 μs | 0.723388 |
| 28 | 3.76 μs | 5.17 μs | 0.727309 |
| 29 | 3.89 μs | 5.32 μs | 0.731273 |
| 30 | 4.03 μs | 5.47 μs | 0.735281 |
| 31 | 4.16 μs | 5.63 μs | 0.739333 |
| 32 | 4.29 μs | 5.78 μs | 0.743429 |
| 33 | 4.43 μs | 5.92 μs | 0.747572 |
| 34 | 4.56 μs | 6.07 μs | 0.75176 |
| 35 | 4.70 μs | 6.21 μs | 0.755996 |
| 36 | 4.83 μs | 6.35 μs | 0.76028 |
| 37 | 4.96 μs | 6.49 μs | 0.764613 |
| 38 | 5.10 μs | 6.63 μs | 0.768995 |
| 39 | 5.23 μs | 6.77 μs | 0.773428 |
| 40 | 5.37 μs | 6.90 μs | 0.777913 |
| 41 | 5.50 μs | 7.03 μs | 0.782449 |
| 42 | 5.64 μs | 7.16 μs | 0.787039 |
| 43 | 5.77 μs | 7.29 μs | 0.791683 |
| 44 | 5.90 μs | 7.41 μs | 0.796383 |
| 45 | 6.04 μs | 7.54 μs | 0.801138 |
| 46 | 6.17 μs | 7.66 μs | 0.80595 |
| 47 | 6.31 μs | 7.78 μs | 0.810821 |
| 48 | 6.44 μs | 7.89 μs | 0.815751 |
| 49 | 6.57 μs | 8.01 μs | 0.820741 |
| 50 | 6.71 μs | 8.12 μs | 0.825793 |
| 51 | 6.84 μs | 8.24 μs | 0.830907 |
| 52 | 6.98 μs | 8.34 μs | 0.836085 |
| 53 | 7.11 μs | 8.45 μs | 0.841327 |
| 54 | 7.25 μs | 8.56 μs | 0.846636 |
| 55 | 7.38 μs | 8.66 μs | 0.852013 |
| 56 | 7.51 μs | 8.76 μs | 0.857458 |
| 57 | 7.65 μs | 8.86 μs | 0.862973 |
| 58 | 7.78 μs | 8.96 μs | 0.86856 |
| 59 | 7.92 μs | 9.05 μs | 0.874219 |
| 60 | 8.05 μs | 9.15 μs | 0.879953 |
| 61 | 8.18 μs | 9.24 μs | 0.885762 |
| 62 | 8.32 μs | 9.33 μs | 0.891649 |
| 63 | 8.45 μs | 9.42 μs | 0.897614 |

FIG. 13

TARGET VOLTAGE = 5V

V1SN TERMINAL VOLTAGE = 51dec
(EQUIVALENT TO 225V AS AC POWER SUPPLY VOLTAGE)

| FB TERMINAL VOLTAGE [dec] | TIME1 | TIME2 | TIME1/TIME2 |
|---|---|---|---|
| 1 | 4.04 μs | 28.16 μs | 0.143428 |
| 2 | 4.04 μs | 28.16 μs | 0.143428 |
| 3 | 4.04 μs | 28.16 μs | 0.143428 |
| 4 | 4.04 μs | 28.16 μs | 0.143428 |
| 5 | 4.04 μs | 28.16 μs | 0.143428 |
| 6 | 4.04 μs | 28.16 μs | 0.143428 |
| 7 | 4.04 μs | 28.16 μs | 0.143428 |
| 8 | 4.04 μs | 28.16 μs | 0.143428 |
| 9 | 4.04 μs | 28.16 μs | 0.143428 |
| 10 | 4.04 μs | 28.16 μs | 0.143428 |
| 11 | 4.04 μs | 28.16 μs | 0.143428 |
| 12 | 4.04 μs | 28.16 μs | 0.143428 |
| 13 | 4.04 μs | 28.16 μs | 0.143428 |
| 14 | 4.04 μs | 28.16 μs | 0.143428 |
| 15 | 4.04 μs | 28.16 μs | 0.143428 |
| 16 | 4.04 μs | 28.16 μs | 0.143428 |
| 17 | 4.04 μs | 28.16 μs | 0.143428 |
| 18 | 4.04 μs | 28.16 μs | 0.143428 |
| 19 | 4.04 μs | 28.16 μs | 0.143428 |
| 20 | 4.04 μs | 28.16 μs | 0.143428 |
| 21 | 4.04 μs | 28.16 μs | 0.143428 |
| 22 | 4.04 μs | 28.16 μs | 0.143428 |
| 23 | 4.04 μs | 28.16 μs | 0.143428 |
| 24 | 4.04 μs | 28.16 μs | 0.143428 |
| 25 | 4.04 μs | 28.16 μs | 0.143428 |
| 26 | 4.04 μs | 28.16 μs | 0.143428 |
| 27 | 4.04 μs | 28.16 μs | 0.143428 |
| 28 | 4.04 μs | 28.16 μs | 0.143428 |
| 29 | 4.04 μs | 28.16 μs | 0.143428 |
| 30 | 4.04 μs | 28.16 μs | 0.143428 |
| 31 | 4.04 μs | 28.16 μs | 0.143428 |
| 32 | 4.04 μs | 28.16 μs | 0.143428 |
| 33 | 4.04 μs | 28.16 μs | 0.143428 |
| 34 | 4.04 μs | 28.16 μs | 0.143428 |
| 35 | 4.04 μs | 28.16 μs | 0.143428 |
| 36 | 4.04 μs | 28.16 μs | 0.143428 |
| 37 | 4.04 μs | 28.16 μs | 0.143428 |
| 38 | 4.04 μs | 28.16 μs | 0.143428 |
| 39 | 4.04 μs | 28.16 μs | 0.143428 |
| 40 | 4.04 μs | 28.16 μs | 0.143428 |
| 41 | 4.04 μs | 28.16 μs | 0.143428 |
| 42 | 4.04 μs | 28.16 μs | 0.143428 |
| 43 | 4.04 μs | 28.16 μs | 0.143428 |
| 44 | 4.04 μs | 28.16 μs | 0.143428 |
| 45 | 4.04 μs | 28.16 μs | 0.143428 |
| 46 | 4.04 μs | 28.16 μs | 0.143428 |
| 47 | 4.04 μs | 28.16 μs | 0.143428 |
| 48 | 4.04 μs | 28.16 μs | 0.143428 |
| 49 | 4.04 μs | 28.16 μs | 0.143428 |
| 50 | 4.04 μs | 28.16 μs | 0.143428 |
| 51 | 4.04 μs | 28.16 μs | 0.143428 |
| 52 | 4.04 μs | 28.16 μs | 0.143428 |
| 53 | 4.04 μs | 28.16 μs | 0.143428 |
| 54 | 4.04 μs | 28.16 μs | 0.143428 |
| 55 | 4.04 μs | 28.16 μs | 0.143428 |
| 56 | 4.04 μs | 28.16 μs | 0.143428 |
| 57 | 4.04 μs | 28.16 μs | 0.143428 |
| 58 | 4.04 μs | 28.16 μs | 0.143428 |
| 59 | 4.04 μs | 28.16 μs | 0.143428 |
| 60 | 4.04 μs | 28.16 μs | 0.143428 |
| 61 | 4.04 μs | 28.16 μs | 0.143428 |
| 62 | 4.04 μs | 28.16 μs | 0.143428 |
| 63 | 4.04 μs | 28.16 μs | 0.143428 |

V1SN TERMINAL VOLTAGE = 48dec
(EQUIVALENT TO 215V AS AC POWER SUPPLY VOLTAGE)

| FB TERMINAL VOLTAGE [dec] | TIME1 | TIME2 | TIME1/TIME2 |
|---|---|---|---|
| 1 | 4.23 μs | 28.16 μs | 0.150099 |
| 2 | 4.23 μs | 28.16 μs | 0.150099 |
| 3 | 4.23 μs | 28.16 μs | 0.150099 |
| 4 | 4.23 μs | 28.16 μs | 0.150099 |
| 5 | 4.23 μs | 28.16 μs | 0.150099 |
| 6 | 4.23 μs | 28.16 μs | 0.150099 |
| 7 | 4.23 μs | 28.16 μs | 0.150099 |
| 8 | 4.23 μs | 28.16 μs | 0.150099 |
| 9 | 4.23 μs | 28.16 μs | 0.150099 |
| 10 | 4.23 μs | 28.16 μs | 0.150099 |
| 11 | 4.23 μs | 28.16 μs | 0.150099 |
| 12 | 4.23 μs | 28.16 μs | 0.150099 |
| 13 | 4.23 μs | 28.16 μs | 0.150099 |
| 14 | 4.23 μs | 28.16 μs | 0.150099 |
| 15 | 4.23 μs | 28.16 μs | 0.150099 |
| 16 | 4.23 μs | 28.16 μs | 0.150099 |
| 17 | 4.23 μs | 28.16 μs | 0.150099 |
| 18 | 4.23 μs | 28.16 μs | 0.150099 |
| 19 | 4.23 μs | 28.16 μs | 0.150099 |
| 20 | 4.23 μs | 28.16 μs | 0.150099 |
| 21 | 4.23 μs | 28.16 μs | 0.150099 |
| 22 | 4.23 μs | 28.16 μs | 0.150099 |
| 23 | 4.23 μs | 28.16 μs | 0.150099 |
| 24 | 4.23 μs | 28.16 μs | 0.150099 |
| 25 | 4.23 μs | 28.16 μs | 0.150099 |
| 26 | 4.23 μs | 28.16 μs | 0.150099 |
| 27 | 4.23 μs | 28.16 μs | 0.150099 |
| 28 | 4.23 μs | 28.16 μs | 0.150099 |
| 29 | 4.23 μs | 28.16 μs | 0.150099 |
| 30 | 4.23 μs | 28.16 μs | 0.150099 |
| 31 | 4.23 μs | 28.16 μs | 0.150099 |
| 32 | 4.23 μs | 28.16 μs | 0.150099 |
| 33 | 4.23 μs | 28.16 μs | 0.150099 |
| 34 | 4.23 μs | 28.16 μs | 0.150099 |
| 35 | 4.23 μs | 28.16 μs | 0.150099 |
| 36 | 4.23 μs | 28.16 μs | 0.150099 |
| 37 | 4.23 μs | 28.16 μs | 0.150099 |
| 38 | 4.23 μs | 28.16 μs | 0.150099 |
| 39 | 4.23 μs | 28.16 μs | 0.150099 |
| 40 | 4.23 μs | 28.16 μs | 0.150099 |
| 41 | 4.23 μs | 28.16 μs | 0.150099 |
| 42 | 4.23 μs | 28.16 μs | 0.150099 |
| 43 | 4.23 μs | 28.16 μs | 0.150099 |
| 44 | 4.23 μs | 28.16 μs | 0.150099 |
| 45 | 4.23 μs | 28.16 μs | 0.150099 |
| 46 | 4.23 μs | 28.16 μs | 0.150099 |
| 47 | 4.23 μs | 28.16 μs | 0.150099 |
| 48 | 4.23 μs | 28.16 μs | 0.150099 |
| 49 | 4.23 μs | 28.16 μs | 0.150099 |
| 50 | 4.23 μs | 28.16 μs | 0.150099 |
| 51 | 4.23 μs | 28.16 μs | 0.150099 |
| 52 | 4.23 μs | 28.16 μs | 0.150099 |
| 53 | 4.23 μs | 28.16 μs | 0.150099 |
| 54 | 4.23 μs | 28.16 μs | 0.150099 |
| 55 | 4.23 μs | 28.16 μs | 0.150099 |
| 56 | 4.23 μs | 28.16 μs | 0.150099 |
| 57 | 4.23 μs | 28.16 μs | 0.150099 |
| 58 | 4.23 μs | 28.16 μs | 0.150099 |
| 59 | 4.23 μs | 28.16 μs | 0.150099 |
| 60 | 4.23 μs | 28.16 μs | 0.150099 |
| 61 | 4.23 μs | 28.16 μs | 0.150099 |
| 62 | 4.23 μs | 28.16 μs | 0.150099 |
| 63 | 4.23 μs | 28.16 μs | 0.150099 |

FIG. 16  TARGET VOLTAGE = 24V

V1SN TERMINAL VOLTAGE = 51dec (EQUIVALENT TO 225V AS AC POWER SUPPLY VOLTAGE)

| FB TERMINAL VOLTAGE [dec] | TIME1 | TIME2 | TIME1/TIME2 |
|---|---|---|---|
| 1 | 2.69 μs | 4.46 μs | 0.603533 |
| 2 | 2.69 μs | 4.46 μs | 0.603939 |
| 3 | 2.69 μs | 4.45 μs | 0.604617 |
| 4 | 2.69 μs | 4.45 μs | 0.605569 |
| 5 | 2.69 μs | 4.44 μs | 0.606798 |
| 6 | 2.69 μs | 4.43 μs | 0.608306 |
| 7 | 2.69 μs | 4.41 μs | 0.610098 |
| 8 | 2.69 μs | 4.40 μs | 0.612179 |
| 9 | 2.69 μs | 4.38 μs | 0.614554 |
| 10 | 2.69 μs | 4.36 μs | 0.617231 |
| 11 | 2.69 μs | 4.34 μs | 0.620217 |
| 12 | 2.69 μs | 4.32 μs | 0.623521 |
| 13 | 2.69 μs | 4.29 μs | 0.627152 |
| 14 | 2.69 μs | 4.27 μs | 0.631121 |
| 15 | 2.69 μs | 4.24 μs | 0.635441 |
| 16 | 2.69 μs | 4.21 μs | 0.640125 |
| 17 | 2.69 μs | 4.17 μs | 0.645187 |
| 18 | 2.69 μs | 4.14 μs | 0.650644 |
| 19 | 2.69 μs | 4.10 μs | 0.656514 |
| 20 | 2.69 μs | 4.06 μs | 0.662818 |
| 21 | 2.69 μs | 4.02 μs | 0.669576 |
| 22 | 2.82 μs | 4.19 μs | 0.673092 |
| 23 | 2.95 μs | 4.36 μs | 0.676644 |
| 24 | 3.08 μs | 4.52 μs | 0.680234 |
| 25 | 3.21 μs | 4.69 μs | 0.683863 |
| 26 | 3.33 μs | 4.85 μs | 0.68753 |
| 27 | 3.46 μs | 5.01 μs | 0.691237 |
| 28 | 3.59 μs | 5.17 μs | 0.694984 |
| 29 | 3.72 μs | 5.32 μs | 0.698772 |
| 30 | 3.85 μs | 5.47 μs | 0.702602 |
| 31 | 3.97 μs | 5.63 μs | 0.706473 |
| 32 | 4.10 μs | 5.78 μs | 0.710388 |
| 33 | 4.23 μs | 5.92 μs | 0.714346 |
| 34 | 4.36 μs | 6.07 μs | 0.718349 |
| 35 | 4.49 μs | 6.21 μs | 0.722396 |
| 36 | 4.62 μs | 6.35 μs | 0.72649 |
| 37 | 4.74 μs | 6.49 μs | 0.73063 |
| 38 | 4.87 μs | 6.63 μs | 0.734818 |
| 39 | 5.00 μs | 6.77 μs | 0.739054 |
| 40 | 5.13 μs | 6.90 μs | 0.743339 |
| 41 | 5.26 μs | 7.03 μs | 0.747674 |
| 42 | 5.38 μs | 7.16 μs | 0.75206 |
| 43 | 5.51 μs | 7.29 μs | 0.756497 |
| 44 | 5.64 μs | 7.41 μs | 0.760988 |
| 45 | 5.77 μs | 7.54 μs | 0.765532 |
| 46 | 5.90 μs | 7.66 μs | 0.77013 |
| 47 | 6.03 μs | 7.78 μs | 0.774784 |
| 48 | 6.15 μs | 7.89 μs | 0.779495 |
| 49 | 6.28 μs | 8.01 μs | 0.784264 |
| 50 | 6.41 μs | 8.12 μs | 0.789091 |
| 51 | 6.54 μs | 8.24 μs | 0.793978 |
| 52 | 6.67 μs | 8.34 μs | 0.798925 |
| 53 | 6.79 μs | 8.45 μs | 0.803935 |
| 54 | 6.92 μs | 8.56 μs | 0.809008 |
| 55 | 7.05 μs | 8.66 μs | 0.814146 |
| 56 | 7.18 μs | 8.76 μs | 0.819349 |
| 57 | 7.31 μs | 8.86 μs | 0.824619 |
| 58 | 7.44 μs | 8.96 μs | 0.829957 |
| 59 | 7.56 μs | 9.05 μs | 0.835365 |
| 60 | 7.69 μs | 9.15 μs | 0.840844 |
| 61 | 7.82 μs | 9.24 μs | 0.846395 |
| 62 | 7.95 μs | 9.33 μs | 0.85202 |
| 63 | 8.08 μs | 9.42 μs | 0.85772 |

V1SN TERMINAL VOLTAGE = 48dec (EQUIVALENT TO 215V AS AC POWER SUPPLY VOLTAGE)

| FB TERMINAL VOLTAGE [dec] | TIME1 | TIME2 | TIME1/TIME2 |
|---|---|---|---|
| 1 | 2.82 μs | 4.46 μs | 0.631604 |
| 2 | 2.82 μs | 4.46 μs | 0.632029 |
| 3 | 2.82 μs | 4.45 μs | 0.632739 |
| 4 | 2.82 μs | 4.45 μs | 0.633735 |
| 5 | 2.82 μs | 4.44 μs | 0.635021 |
| 6 | 2.82 μs | 4.43 μs | 0.636599 |
| 7 | 2.82 μs | 4.41 μs | 0.638474 |
| 8 | 2.82 μs | 4.40 μs | 0.640652 |
| 9 | 2.82 μs | 4.38 μs | 0.643138 |
| 10 | 2.82 μs | 4.36 μs | 0.64594 |
| 11 | 2.82 μs | 4.34 μs | 0.649064 |
| 12 | 2.82 μs | 4.32 μs | 0.652522 |
| 13 | 2.82 μs | 4.29 μs | 0.656322 |
| 14 | 2.82 μs | 4.27 μs | 0.660476 |
| 15 | 2.82 μs | 4.24 μs | 0.664996 |
| 16 | 2.82 μs | 4.21 μs | 0.669898 |
| 17 | 2.82 μs | 4.17 μs | 0.675196 |
| 18 | 2.82 μs | 4.14 μs | 0.680907 |
| 19 | 2.82 μs | 4.10 μs | 0.68705 |
| 20 | 2.82 μs | 4.06 μs | 0.693647 |
| 21 | 2.82 μs | 4.02 μs | 0.70072 |
| 22 | 2.95 μs | 4.19 μs | 0.704398 |
| 23 | 3.09 μs | 4.36 μs | 0.708116 |
| 24 | 3.22 μs | 4.52 μs | 0.711873 |
| 25 | 3.35 μs | 4.69 μs | 0.71567 |
| 26 | 3.49 μs | 4.85 μs | 0.719508 |
| 27 | 3.62 μs | 5.01 μs | 0.723388 |
| 28 | 3.76 μs | 5.17 μs | 0.727309 |
| 29 | 3.89 μs | 5.32 μs | 0.731273 |
| 30 | 4.03 μs | 5.47 μs | 0.735281 |
| 31 | 4.16 μs | 5.63 μs | 0.739333 |
| 32 | 4.29 μs | 5.78 μs | 0.743429 |
| 33 | 4.43 μs | 5.92 μs | 0.747572 |
| 34 | 4.56 μs | 6.07 μs | 0.75176 |
| 35 | 4.70 μs | 6.21 μs | 0.755996 |
| 36 | 4.83 μs | 6.35 μs | 0.76028 |
| 37 | 4.96 μs | 6.49 μs | 0.764613 |
| 38 | 5.10 μs | 6.63 μs | 0.768995 |
| 39 | 5.23 μs | 6.77 μs | 0.773428 |
| 40 | 5.37 μs | 6.90 μs | 0.777913 |
| 41 | 5.50 μs | 7.03 μs | 0.782449 |
| 42 | 5.64 μs | 7.16 μs | 0.787039 |
| 43 | 5.77 μs | 7.29 μs | 0.791683 |
| 44 | 5.90 μs | 7.41 μs | 0.796383 |
| 45 | 6.04 μs | 7.54 μs | 0.801138 |
| 46 | 6.17 μs | 7.66 μs | 0.80595 |
| 47 | 6.31 μs | 7.78 μs | 0.810821 |
| 48 | 6.44 μs | 7.89 μs | 0.815751 |
| 49 | 6.57 μs | 8.01 μs | 0.820741 |
| 50 | 6.71 μs | 8.12 μs | 0.825793 |
| 51 | 6.84 μs | 8.24 μs | 0.830907 |
| 52 | 6.98 μs | 8.34 μs | 0.836085 |
| 53 | 7.11 μs | 8.45 μs | 0.841327 |
| 54 | 7.25 μs | 8.56 μs | 0.846636 |
| 55 | 7.38 μs | 8.66 μs | 0.852013 |
| 56 | 7.51 μs | 8.76 μs | 0.857458 |
| 57 | 7.65 μs | 8.86 μs | 0.862973 |
| 58 | 7.78 μs | 8.96 μs | 0.86856 |
| 59 | 7.92 μs | 9.05 μs | 0.874219 |
| 60 | 8.05 μs | 9.15 μs | 0.879953 |
| 61 | 8.18 μs | 9.24 μs | 0.885762 |
| 62 | 8.32 μs | 9.33 μs | 0.891649 |
| 63 | 8.45 μs | 9.42 μs | 0.897614 |

FIG. 17  TARGET VOLTAGE = 5V

V1SN TERMINAL VOLTAGE = 51dec
(EQUIVALENT TO 225V AS AC POWER SUPPLY VOLTAGE)

| FB TERMINAL VOLTAGE [dec] | TIME1 | TIME2 | TIME1/TIME2 |
|---|---|---|---|
| 1 | 3.01 μs | 21.76 μs | 0.138471 |
| 2 | 3.01 μs | 21.76 μs | 0.138471 |
| 3 | 3.01 μs | 21.76 μs | 0.138471 |
| 4 | 3.01 μs | 21.76 μs | 0.138471 |
| 5 | 3.01 μs | 21.76 μs | 0.138471 |
| 6 | 3.01 μs | 21.76 μs | 0.138471 |
| 7 | 3.01 μs | 21.76 μs | 0.138471 |
| 8 | 3.01 μs | 21.76 μs | 0.138471 |
| 9 | 3.01 μs | 21.76 μs | 0.138471 |
| 10 | 3.01 μs | 21.76 μs | 0.138471 |
| 11 | 3.01 μs | 21.76 μs | 0.138471 |
| 12 | 3.01 μs | 21.76 μs | 0.138471 |
| 13 | 3.01 μs | 21.76 μs | 0.138471 |
| 14 | 3.01 μs | 21.76 μs | 0.138471 |
| 15 | 3.01 μs | 21.76 μs | 0.138471 |
| 16 | 3.01 μs | 21.76 μs | 0.138471 |
| 17 | 3.01 μs | 21.76 μs | 0.138471 |
| 18 | 3.01 μs | 21.76 μs | 0.138471 |
| 19 | 3.01 μs | 21.76 μs | 0.138471 |
| 20 | 3.01 μs | 21.76 μs | 0.138471 |
| 21 | 3.01 μs | 21.76 μs | 0.138471 |
| 22 | 3.01 μs | 21.76 μs | 0.138471 |
| 23 | 3.01 μs | 21.76 μs | 0.138471 |
| 24 | 3.01 μs | 21.76 μs | 0.138471 |
| 25 | 3.01 μs | 21.76 μs | 0.138471 |
| 26 | 3.01 μs | 21.76 μs | 0.138471 |
| 27 | 3.01 μs | 21.76 μs | 0.138471 |
| 28 | 3.01 μs | 21.76 μs | 0.138471 |
| 29 | 3.01 μs | 21.76 μs | 0.138471 |
| 30 | 3.01 μs | 21.76 μs | 0.138471 |
| 31 | 3.01 μs | 21.76 μs | 0.138471 |
| 32 | 3.01 μs | 21.76 μs | 0.138471 |
| 33 | 3.01 μs | 21.76 μs | 0.138471 |
| 34 | 3.01 μs | 21.76 μs | 0.138471 |
| 35 | 3.01 μs | 21.76 μs | 0.138471 |
| 36 | 3.01 μs | 21.76 μs | 0.138471 |
| 37 | 3.01 μs | 21.76 μs | 0.138471 |
| 38 | 3.01 μs | 21.76 μs | 0.138471 |
| 39 | 3.01 μs | 21.76 μs | 0.138471 |
| 40 | 3.01 μs | 21.76 μs | 0.138471 |
| 41 | 3.01 μs | 21.76 μs | 0.138471 |
| 42 | 3.01 μs | 21.76 μs | 0.138471 |
| 43 | 3.01 μs | 21.76 μs | 0.138471 |
| 44 | 3.01 μs | 21.76 μs | 0.138471 |
| 45 | 3.01 μs | 21.76 μs | 0.138471 |
| 46 | 3.01 μs | 21.76 μs | 0.138471 |
| 47 | 3.01 μs | 21.76 μs | 0.138471 |
| 48 | 3.08 μs | 22.17 μs | 0.13877 |
| 49 | 3.14 μs | 22.59 μs | 0.139071 |
| 50 | 3.21 μs | 23.00 μs | 0.139374 |
| 51 | 3.27 μs | 23.41 μs | 0.139677 |
| 52 | 3.33 μs | 23.81 μs | 0.139982 |
| 53 | 3.40 μs | 24.22 μs | 0.140289 |
| 54 | 3.46 μs | 24.62 μs | 0.140597 |
| 55 | 3.53 μs | 25.02 μs | 0.140906 |
| 56 | 3.59 μs | 25.42 μs | 0.141216 |
| 57 | 3.65 μs | 25.82 μs | 0.141528 |
| 58 | 3.72 μs | 26.21 μs | 0.141841 |
| 59 | 3.78 μs | 26.61 μs | 0.142155 |
| 60 | 3.85 μs | 27.00 μs | 0.142471 |
| 61 | 3.91 μs | 27.38 μs | 0.142789 |
| 62 | 3.97 μs | 27.77 μs | 0.143108 |
| 63 | 4.04 μs | 28.16 μs | 0.143428 |

V1SN TERMINAL VOLTAGE = 48dec
(EQUIVALENT TO 215V AS AC POWER SUPPLY VOLTAGE)

| FB TERMINAL VOLTAGE [dec] | TIME1 | TIME2 | TIME1/TIME2 |
|---|---|---|---|
| 1 | 3.15 μs | 21.76 μs | 0.144911 |
| 2 | 3.15 μs | 21.76 μs | 0.144911 |
| 3 | 3.15 μs | 21.76 μs | 0.144911 |
| 4 | 3.15 μs | 21.76 μs | 0.144911 |
| 5 | 3.15 μs | 21.76 μs | 0.144911 |
| 6 | 3.15 μs | 21.76 μs | 0.144911 |
| 7 | 3.15 μs | 21.76 μs | 0.144911 |
| 8 | 3.15 μs | 21.76 μs | 0.144911 |
| 9 | 3.15 μs | 21.76 μs | 0.144911 |
| 10 | 3.15 μs | 21.76 μs | 0.144911 |
| 11 | 3.15 μs | 21.76 μs | 0.144911 |
| 12 | 3.15 μs | 21.76 μs | 0.144911 |
| 13 | 3.15 μs | 21.76 μs | 0.144911 |
| 14 | 3.15 μs | 21.76 μs | 0.144911 |
| 15 | 3.15 μs | 21.76 μs | 0.144911 |
| 16 | 3.15 μs | 21.76 μs | 0.144911 |
| 17 | 3.15 μs | 21.76 μs | 0.144911 |
| 18 | 3.15 μs | 21.76 μs | 0.144911 |
| 19 | 3.15 μs | 21.76 μs | 0.144911 |
| 20 | 3.15 μs | 21.76 μs | 0.144911 |
| 21 | 3.15 μs | 21.76 μs | 0.144911 |
| 22 | 3.15 μs | 21.76 μs | 0.144911 |
| 23 | 3.15 μs | 21.76 μs | 0.144911 |
| 24 | 3.15 μs | 21.76 μs | 0.144911 |
| 25 | 3.15 μs | 21.76 μs | 0.144911 |
| 26 | 3.15 μs | 21.76 μs | 0.144911 |
| 27 | 3.15 μs | 21.76 μs | 0.144911 |
| 28 | 3.15 μs | 21.76 μs | 0.144911 |
| 29 | 3.15 μs | 21.76 μs | 0.144911 |
| 30 | 3.15 μs | 21.76 μs | 0.144911 |
| 31 | 3.15 μs | 21.76 μs | 0.144911 |
| 32 | 3.15 μs | 21.76 μs | 0.144911 |
| 33 | 3.15 μs | 21.76 μs | 0.144911 |
| 34 | 3.15 μs | 21.76 μs | 0.144911 |
| 35 | 3.15 μs | 21.76 μs | 0.144911 |
| 36 | 3.15 μs | 21.76 μs | 0.144911 |
| 37 | 3.15 μs | 21.76 μs | 0.144911 |
| 38 | 3.15 μs | 21.76 μs | 0.144911 |
| 39 | 3.15 μs | 21.76 μs | 0.144911 |
| 40 | 3.15 μs | 21.76 μs | 0.144911 |
| 41 | 3.15 μs | 21.76 μs | 0.144911 |
| 42 | 3.15 μs | 21.76 μs | 0.144911 |
| 43 | 3.15 μs | 21.76 μs | 0.144911 |
| 44 | 3.15 μs | 21.76 μs | 0.144911 |
| 45 | 3.15 μs | 21.76 μs | 0.144911 |
| 46 | 3.15 μs | 21.76 μs | 0.144911 |
| 47 | 3.15 μs | 21.76 μs | 0.144911 |
| 48 | 3.22 μs | 22.17 μs | 0.145225 |
| 49 | 3.29 μs | 22.59 μs | 0.14554 |
| 50 | 3.35 μs | 23.00 μs | 0.145856 |
| 51 | 3.42 μs | 23.41 μs | 0.146174 |
| 52 | 3.49 μs | 23.81 μs | 0.146493 |
| 53 | 3.56 μs | 24.22 μs | 0.146814 |
| 54 | 3.62 μs | 24.62 μs | 0.147136 |
| 55 | 3.69 μs | 25.02 μs | 0.147459 |
| 56 | 3.76 μs | 25.42 μs | 0.147784 |
| 57 | 3.82 μs | 25.82 μs | 0.14811 |
| 58 | 3.89 μs | 26.21 μs | 0.148438 |
| 59 | 3.96 μs | 26.61 μs | 0.148767 |
| 60 | 4.03 μs | 27.00 μs | 0.149098 |
| 61 | 4.09 μs | 27.38 μs | 0.14943 |
| 62 | 4.16 μs | 27.77 μs | 0.149764 |
| 63 | 4.23 μs | 28.16 μs | 0.150099 |

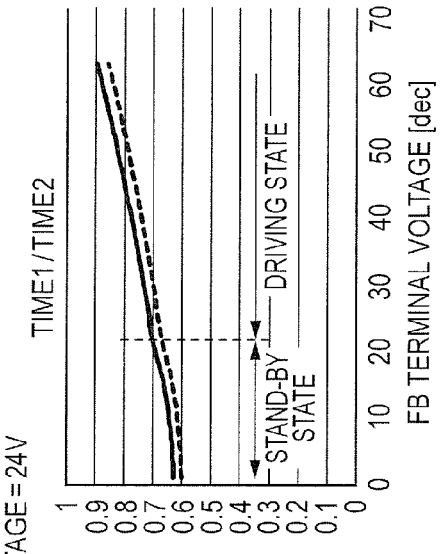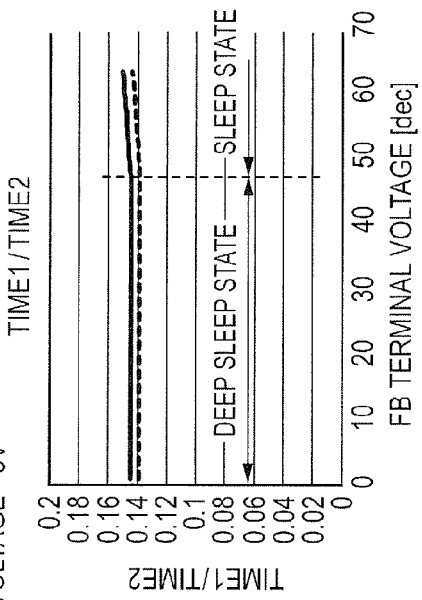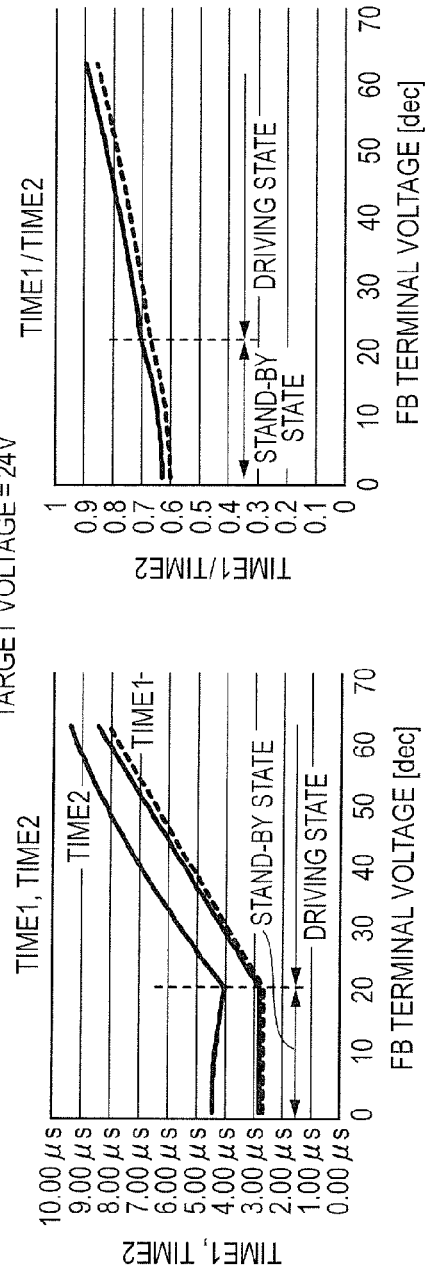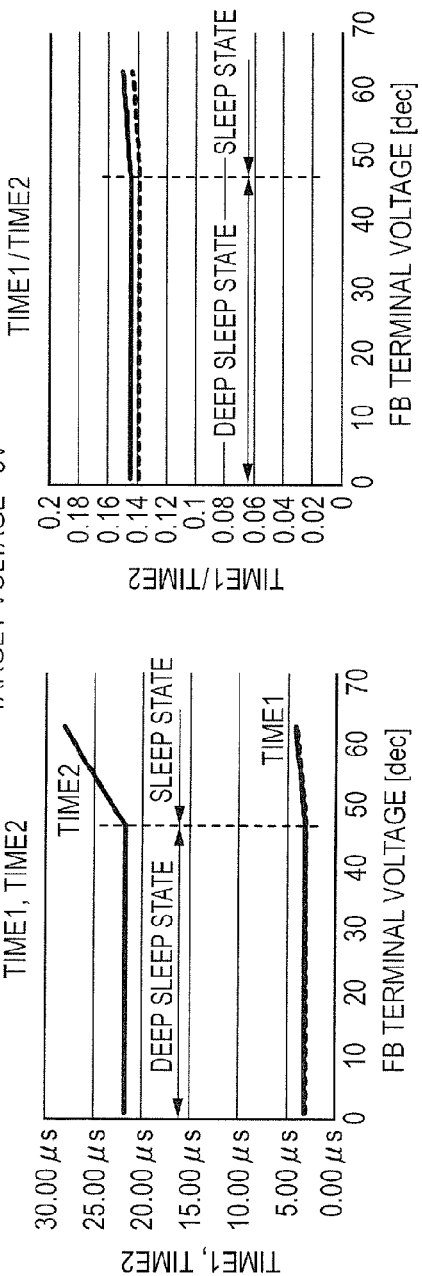

POWER SUPPLY APPARATUS AND IMAGE FORMING APPARATUS

BACKGROUND OF THE INVENTION

Field of the Invention

The present invention relates to a power supply apparatus and an image forming apparatus, and particularly, to a switching power supply apparatus using an active clamp system in an insulation converter using a flyback transformer.

Description of the Related Art

In a switching power supply, such as a commercial power supply, that converts an AC voltage to a DC voltage, improvement of efficiency of the switching power supply is required to reduce power consumption of the switching power supply. The efficiency of the switching power supply is expressed by a ratio of power output by the switching power supply to power supplied to the switching power supply.

In a switching power supply using an active clamp system in an insulation converter using a flyback transformer, a configuration of Japanese Patent No. 4370844 is proposed as an example of a unit that improves efficiency in a state that the switching power supply outputs low power. Hereinafter, the state that the switching power supply outputs low power will be referred to as a low load state.

However, further improvement of the efficiency in the low load state is required in the switching power supply using the active clamp system.

Two switching elements are alternately turned on and off in the switching power supply using the active clamp system in the insulation converter using the flyback transformer. Consequently, part of energy stored in the transformer is transmitted to a secondary side by flyback operation, and the rest of the energy is resonated on a primary side to switch the switching element with zero voltage. In this way, the power on the primary side can be highly efficiently converted to the secondary side by using the active clamp system. Therefore, high power conversion efficiency can be realized.

A circuit configuration is proposed for example in Japanese Patent Application Laid-Open No. H11-187664, in which turn-on times of two switching elements are appropriately controlled based on a load, and high power conversion efficiency is attained in a wide load range. A circuit configuration is proposed for example in Japanese Patent Application Laid-Open No. 2013-201829, in which turn-on times of two switching elements are changed according to an input voltage to handle fluctuations of the input voltage.

However, realization of a switching power supply that can flexibly handle specifications required for each of a plurality of target output voltages of control (hereinafter, "target voltage") is required.

SUMMARY OF THE INVENTION

The present invention can improve power efficiency during low load in a power supply apparatus of an active clamp system.

The present invention can also flexibly handle specifications required for each voltage in a power supply apparatus that can output a plurality of voltages.

To solve the problem, the present invention provides a power supply apparatus comprising: a transformer comprising a primary winding and a secondary winding; a first switching element connected in series to the primary winding of the transformer; a second switching element connected in parallel to the primary winding of the transformer; a capacitor connected in series to the second switching element and connected in parallel to the primary winding of the transformer along with the second switching element; a feedback unit that outputs information according to a voltage induced in the secondary winding of the transformer; and a control unit that controls turn-on or turn-off of the first switching element and the second switching element based on the information input from the feedback unit, wherein the control unit can perform operation of alternately repeating a first period and a second period, wherein the first period is for performing switching operation of alternately turning on or turning off the first switching element and the second switching element across a dead time for turning off both of the first switching element and the second switching element, and the second period is for halting the switching operation, and wherein the control unit makes a transition to the second period after turning on the second switching element in the transition from the first period to the second period and also makes a transition to the first period after turning on the second switching element in the transition from the second period to the first period.

Another object of the present invention is to provide an image forming apparatus comprising: an image forming unit that forms an image; and a power supply apparatus that supplies power to the image forming apparatus, the power supply apparatus comprising: a transformer comprising a primary winding and a secondary winding; a first switching element connected in series to the primary winding of the transformer; a second switching element connected in parallel to the primary winding of the transformer; a capacitor connected in series to the second switching element and connected in parallel to the primary winding of the transformer along with the second switching element; a feedback unit that outputs information according to a voltage induced in the secondary winding of the transformer; and a control unit that controls turn-on or turn-off of the first switching element and the second switching element based on the information input from the feedback unit, wherein the control unit can perform operation of alternately repeating a first period and a second period, wherein the first period is for performing switching operation of alternately turning on or turning off the first switching element and the second switching element across a dead time for turning off both of the first switching element and the second switching element, and the second period is for halting the switching operation, and wherein the control unit makes a transition to the second period after turning on the second switching element in the transition from the first period to the second period and also makes a transition to the first period after turning on the second switching element in the transition from the second period to the first period.

Another object of the present invention is to provide a power supply apparatus comprising: a transformer comprising a primary winding and a secondary winding; a first switching element connected in series to the primary winding of the transformer; a second switching element connected in parallel to the primary winding of the transformer; a capacitor connected in series to the second switching element and connected in parallel to the primary winding of the transformer along with the second switching element; a rectification smoothing unit that rectifies and smooths a voltage induced in the secondary winding of the transformer; a feedback unit that outputs information according to the voltage rectified and smoothed by the rectification smoothing unit; and a control unit that controls turn-on or turn-off of the first switching element and the second switching element based on the information input from the feedback unit so that the voltage rectified and smoothed by the rectification smoothing unit becomes a predetermined voltage, wherein operation can be performed in a first state in which the predetermined voltage is controlled at a first voltage and a second state in which the predetermined voltage is controlled at a second voltage greater than the first voltage, and wherein the control unit controls the first switching element and the second switching element so that a turn-on time of the first switching element is longer in the second state than in the first state, a turn-on time of the second switching element is shorter in the second state than in the first state, and a period for alternately turning on or off the first switching element and the second switching element is shorter in the second state than in the first state.

Another object of the present invention is to provide a power supply apparatus comprising: a transformer comprising a primary winding and a secondary winding; a first switching element connected in series to the primary winding of the transformer; a second switching element connected in parallel to the primary winding of the transformer; a capacitor connected in series to the second switching element and connected in parallel to the primary winding of the transformer along with the second switching element; a rectification smoothing unit that rectifies and smooths a voltage induced in the secondary winding of the transformer; a feedback unit that outputs a signal according to the voltage rectified and smoothed by the rectification smoothing unit; and a control unit that controls turn-on or turn-off of the first switching element and the second switching element based on the signal input from the feedback unit so that the voltage rectified and smoothed by the rectification smoothing unit becomes a predetermined voltage, wherein in both of the first state and the second state, the control unit can perform continuous operation and intermittent operation, wherein the continuous operation is for repeating a first period for performing switching operation of alternately turning on or turning off the first switching element and the second switching element across a dead time for turning off both of the first switching element and the second switching element, and the intermittent operation is for repeating the first period and a second period for halting the switching operation, wherein operation can be performed in a first state in which the predetermined voltage is controlled at a first voltage and a second state in which the predetermined voltage is controlled at a second voltage greater than the first voltage, and wherein the control unit makes a transition from the continuous operation to the intermittent operation when a turn-on time of the first switching element becomes equal to or smaller than a predetermined time, and the predetermined time varies between the first state and the second state.

Another object of the present invention is to provide an image forming apparatus comprising: an image forming unit that forms an image; and a power supply apparatus that supplies power to the image forming apparatus, the power supply apparatus comprising: a transformer comprising a primary winding and a secondary winding; a first switching element connected in series to the primary winding of the transformer; a second switching element connected in parallel to the primary winding of the transformer; a capacitor connected in series to the second switching element and connected in parallel to the primary winding of the transformer along with the second switching element; a rectification smoothing unit that rectifies and smooths a voltage induced in the secondary winding of the transformer; a feedback unit that outputs information according to the voltage rectified and smoothed by the rectification smoothing unit; and a control unit that controls turn-on or turn-off of the first switching element and the second switching element based on the information input from the feedback unit so that the voltage rectified and smoothed by the rectification smoothing unit becomes a predetermined voltage, wherein operation can be performed in a first state in which the predetermined voltage is controlled at a first voltage and a second state in which the predetermined voltage is controlled at a second voltage greater than the first voltage, and wherein the control unit controls the first switching element and the second switching element so that a turn-on time of the first switching element is longer in the second state than in the first state, a turn-on time of the second switching element is shorter in the second state than in the first state, and a period for alternately turning on or off the first switching element and the second switching element is shorter in the second state than in the first state.

Another object of the present invention is to provide an image forming apparatus comprising: an image forming unit that forms an image; and a power supply apparatus that supplies power to the image forming apparatus, the power supply apparatus comprising: a transformer comprising a primary winding and a secondary winding; a first switching element connected in series to the primary winding of the transformer; a second switching element connected in parallel to the primary winding of the transformer; a capacitor connected in series to the second switching element and connected in parallel to the primary winding of the transformer along with the second switching element; a rectification smoothing unit that rectifies and smooths a voltage induced in the secondary winding of the transformer; a feedback unit that outputs a signal according to the voltage rectified and smoothed by the rectification smoothing unit; and a control unit that controls turn-on or turn-off of the first switching element and the second switching element based on the signal input from the feedback unit so that the voltage rectified and smoothed by the rectification smoothing unit becomes a predetermined voltage, wherein in both of the first state and the second state, the control unit can perform continuous operation and intermittent operation, wherein the continuous operation is for repeating a first period for performing switching operation of alternately turning on or turning off the first switching element and the second switching element across a dead time for turning off both of the first switching element and the second switching element, and the intermittent operation is for repeating the first period and a second period for halting the switching operation, wherein operation can be performed in a first state in which the predetermined voltage is controlled at a first voltage and a second state in which the predetermined voltage is controlled at a second voltage greater than the first voltage, and wherein the control unit makes a transition from the continuous operation to the intermittent operation when a turn-on time of the first switching element becomes equal to or smaller than a predetermined time, and the predetermined time varies between the first state and the second state.

Further features of the present invention will become apparent from the following description of exemplary embodiments with reference to the attached drawings.

BRIEF DESCRIPTION OF THE DRAWINGS

FIGS. 10A and 10B are diagrams illustrating waveforms during continuous operation and during intermittent operation of the switching power supply according to the fourth and fifth embodiments.

FIG. 12 is a correspondence table of FB terminal voltages and each FET turn-on time according to the fourth embodiment.

FIG. 13 is a correspondence table of the FB terminal voltages and each FET turn-on time according to the fourth embodiment.

FIG. 16 is a correspondence table of the FB terminal voltages and each FET turn-on time according to the fifth embodiment.

FIG. 17 is a correspondence table of the FB terminal voltages and each FET turn-on time according to the fifth embodiment.

FIGS. 18A, 18B, 18C and 18D are graphs illustrating a relationship between the FB terminal voltages and each FET turn-on time according to the fifth embodiment.

DESCRIPTION OF THE EMBODIMENTS

Preferred embodiments of the present invention will now be described in detail in accordance with the accompanying drawings.

First Embodiment

[Power Supply Apparatus]

Figure 1:
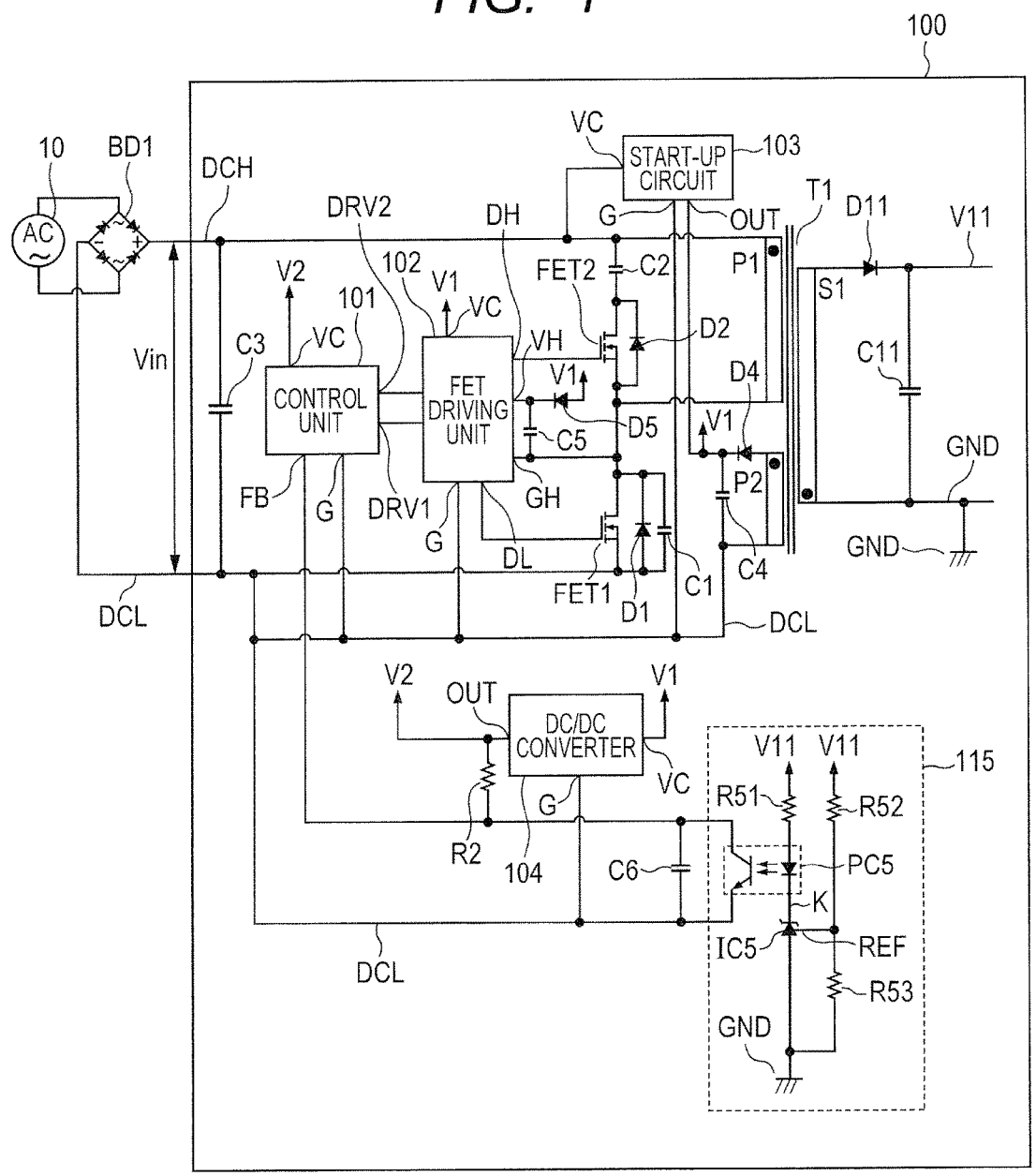
FIG. 1 is a schematic diagram of a power supply circuit according to a first embodiment.

FIG. 1 is a circuit diagram illustrating an outline of a switching power supply circuit using an active clamp system according to a first embodiment. An AC power supply 10, such as a commercial power supply, outputs an AC voltage, and a voltage rectified by a bridge diode BD1 that is a full-wave rectification unit is input to a switching power supply circuit 100. A smoothing capacitor C3 is used as a smoothing unit of the rectified voltage. A potential DCL is a lower potential of the smoothing capacitor C3, and a potential DCH is a higher potential. The switching power supply circuit 100 outputs a power supply voltage V11 from an input voltage Vin charged in the smoothing capacitor C3 to an insulated secondary side. In the present embodiment, the switching power supply circuit 100 outputs, for example, a constant voltage of 5V as the power supply voltage V11.

The switching power supply circuit 100 includes an insulation transformer T1 including a primary winding P1 and an auxiliary winding P2 on a primary side and a secondary winding S1 on the secondary side. Energy is supplied from the primary winding P1 of the transformer T1 to the secondary winding S1 by switching operation described later in FIG. 2. The auxiliary winding P2 of the transformer T1 is used to rectify and smooth, by a diode D4 and a capacitor C4, a forward voltage of the input voltage Vin applied to the primary winding P1 to supply a power supply voltage V1.

A field effect transistor (hereinafter, "FET") 1 that is a first switching element is connected in series to the primary winding P1 of the transformer T1 on the primary side of the switching power supply circuit 100. A voltage clamp capacitor C2 and an FET2 that is a second switching element are connected in series. The voltage clamp capacitor C2 and the FET2 connected in series are connected in parallel to the primary winding P1 of the transformer T1. A control unit 101 and an FET driving unit 102 as control units of the FET1 and the FET2 are provided on the primary side of the switching power supply circuit 100. A voltage resonance capacitor C1 connected in parallel to the FET1 is provided to reduce a loss during switch-off of the FET1 and the FET2. A capacitance between a drain terminal and a source terminal of the FET1 may be used, instead of providing the voltage resonance capacitor C1. To facilitate operation of turning on a switching element with zero voltage described later, the voltage resonance capacitor C1 is selected such that an electrostatic capacitance is smaller than that of the voltage clamp capacitor C2. A diode D1 of the present embodiment is a body diode of the FET1. Similarly, a diode D2 is a body diode of the FET2.

A diode D11 and a capacitor C11 that are rectification smoothing units on the secondary side for a flyback voltage generated in the secondary winding S1 of the transformer T1 are provided on the secondary side of the switching power supply circuit 100. A voltage induced in the secondary winding S1 of the transformer T1 is rectified and smoothed by the diode D11 and the capacitor C11 and is output as the power supply voltage V11. A feedback unit 115 (dotted frame in FIG. 1) as a feedback unit that feeds back, to the primary side, information according to the power supply voltage V11 output to the secondary side is provided on the secondary side of the switching power supply circuit 100. An arithmetic control unit, such as a CPU and an ASIC, operated by a clock generated by an oscillator or the like is used as the control unit 101 of the present embodiment. As a result, complicated waveform control of a control signal DRV1 and a control signal DRV2 described later can be realized by a simple and inexpensive circuit configuration.

A power supply voltage V2 generated by a DC/DC converter 104 is supplied from an OUT terminal of the DC/DC converter 104 to between a VC terminal and a G terminal of the control unit 101. The control unit 101 outputs the control signal DRV1 and the control signal DRV2 based on a voltage signal input from the feedback unit 115 to an FB terminal and controls the FET1 and the FET2 through the FET driving unit 102. The control signal DRV1 is a signal for driving the FET1, and the control signal DRV2 is a signal for driving the FET2.

The FET driving unit 102 is a circuit that generates an FET1 gate drive signal DL according to the control signal DRV1 input from the control unit 101 and an FET2 gate drive signal DH according to the control signal DRV2. The power supply voltage V1 generated by the auxiliary winding P2 is supplied to between a VC terminal and a G terminal of the FET driving unit 102. To drive the FET2, a charge pump circuit including a capacitor C5 and a diode D5 supplies the power supply voltage V1 to between a VH terminal and a GH terminal. When the control signal DRV1 in a high level is input, the FET driving unit 102 puts the FET1 gate drive signal DL into the high level, and the FET1 is turned on. Similarly, when the control signal DRV2 in a high level is input, the FET driving unit 102 puts the FET2 gate drive signal DH into the high level, and the FET2 is turned on.

The DC/DC converter 104 is a three-terminal regulator or a step-down switching power supply circuit configured to convert the power supply voltage V1 input to between a VC terminal and a G terminal to output the power supply voltage V2 from the OUT terminal. A start-up circuit 103 is a three-terminal regulator or a step-down switching power supply configured to convert the input voltage Vin input to between a VC terminal and a G terminal to output the power supply voltage V1 from an OUT terminal. The start-up circuit 103 is a circuit operated only when the power supply voltage V1 supplied from the auxiliary winding P2 is equal to or smaller than a predetermined voltage value and is used to supply the power supply voltage V1 at start-up of the switching power supply circuit 100.

(Feedback Unit)

The feedback unit 115 is used to control the power supply voltage V11 at a predetermined constant voltage. A voltage value of the power supply voltage V11 is set by a reference voltage of a reference terminal REF of a shunt regulator IC5 as well as a resistance R52 and a resistance R53. When the power supply voltage V11 becomes higher than a predetermined voltage (5V here), a current flows from a cathode terminal K of the shunt regulator IC5, and a secondary side diode of a photocoupler PC5 enters a conductive state through a pull-up resistance R51. As a result, a primary side transistor of the photocoupler PC5 is operated, and a charge is discharged from a capacitor C6. Therefore, a voltage of the FB terminal (hereinafter, "FB terminal voltage") of the control unit 101 decreases. On the other hand, when the power supply voltage V11 becomes lower than 5V, the secondary side diode enters a non-conductive state. As a result, the transistor on the primary side of the photocoupler PC5 is turned off, and a current for charging the capacitor C6 flows from the power supply voltage V2 through a resistance R2. Therefore, the FB terminal voltage of the control unit 101 increases. In this way, the feedback unit 115 changes the FB terminal voltage of the control unit 101 according to a fluctuation of the power supply voltage V11.

The control unit 101 detects the FB terminal voltage input from the feedback unit 115 to perform feedback control for controlling the power supply voltage V11 at the predetermined constant voltage. In this way, the control unit 101 can monitor the FB terminal voltage to indirectly perform the feedback control of the power supply voltage V11. The control unit 101 may be provided on the secondary side in place of the feedback unit 115 to monitor the power supply voltage V11 to directly perform the feedback control of the power supply voltage V11. Since the control unit 101 can monitor the FB terminal voltage to figure out a load state, the control unit 101 can perform appropriate control according to the load state. To more accurately determine the load state, a current detection unit may be provided on a path for supplying power to the load of the FET1 or the switching power supply circuit 100. In the description, the unit that determines a low load state in the present embodiment uses the FB terminal voltage of the control unit 101.

[Control Method of Switching Power Supply Circuit in Low Load State]

Figure 2:
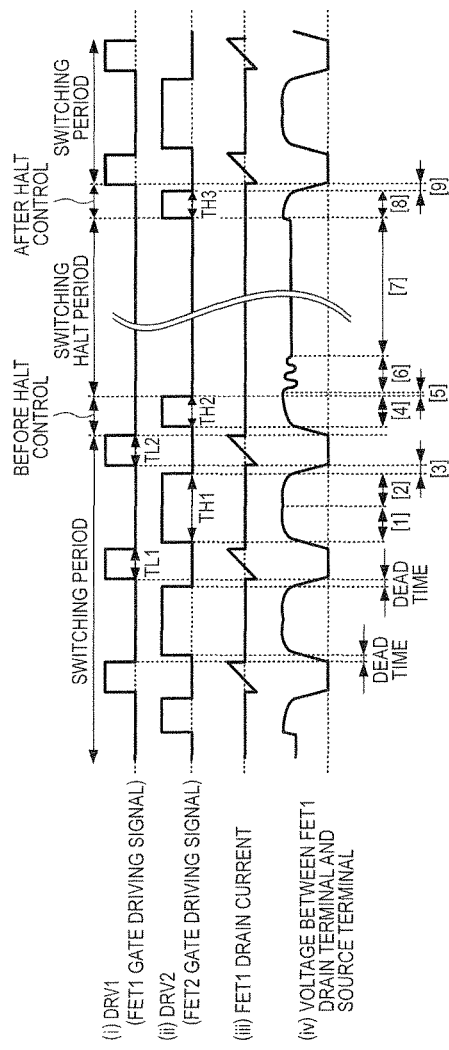
FIG. 2 is an explanatory diagram of a control method according to the first embodiment.
Figure 3:
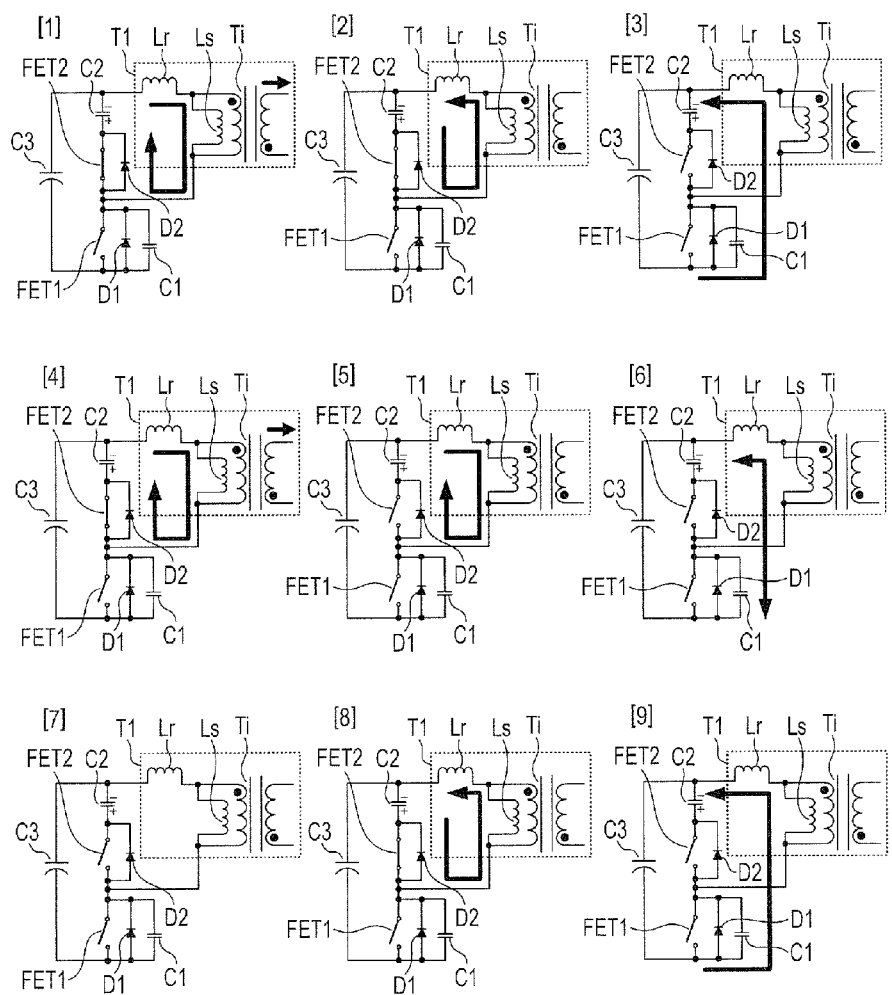
FIG. 3 is a simple circuit diagram describing the control method according to the first embodiment.

FIG. 2 is an explanatory diagram of a control method by the control unit 101 for improving efficiency of the low load state of the switching power supply circuit 100 using the active clamp system. In FIG. 2, (i) is a diagram illustrating the control signal DRV1 corresponding to the FET1 gate drive signal DL, and (ii) is a diagram illustrating the control signal DRV2 corresponding to the FET2 gate drive signal DH. In FIG. 2, (iii) is a diagram illustrating an FET1 drain current, and (iv) is a diagram illustrating a voltage between the drain terminal and the source terminal of the FET1. A horizontal axis denotes time. FIG. 3 illustrates, along with simple circuit diagrams, flows of current in a plurality of periods ([1] to [9]) illustrated in FIG. 2. Operation of each period will be described below. In FIG. 3, the transformer T1 is divided into a leakage inductance Lr, a coupling inductance Ls and an ideal transformer Ti. A thick solid line arrow in the circuit of FIG. 3 indicates the current flowing in each period. In the present embodiment, the periods for controlling the FET1 and the FET2 are sorted into a switching period that is a first period, a period for carrying out before-halt control, a switching halt period that is a second period, a period for carrying out after-halt control, and so forth.

(Switching Period)

The switching period of FIG. 2 is a period in which the control unit 101 alternately turns on or off the FET1 and the FET2 to repeatedly control the FET1 and the FET2 across a dead time in which both of the FET1 and the FET2 are turned off. Operation using the FET2 and the voltage clamp capacitor C2 in the switching period (hereinafter, "active clamp operation") will be described based on [1] to [3] of FIGS. 2 and 3.

While the FET1 in turned on, the current flows in the leakage inductance Lr and the coupling inductance Ls of the transformer T1 (see FIG. 2(iii)). The period [1] illustrated in FIG. 3 is a period in which the FET1 is turned off after turned on in a time TL1, and the FET2 is turned on after a dead time. A + terminal side of the voltage clamp capacitor C2 is charged by the current flowing while the FET1 is turned on, from the transformer T1 and through the FET2 or the diode D2. The voltage clamp capacitor C2 can absorb a kickback voltage of the leakage inductance Lr, and a surge voltage applied between the drain terminal and the source terminal of the FET1 can be reduced. When the voltage of the voltage clamp capacitor C2 increases, the diode D11 is turned on, and the power is supplied to the secondary side of the switching power supply circuit 100 through the secondary winding S1 of the transformer T1.

In the period [2] illustrated in FIG. 3, resonance of the voltage clamp capacitor C2 and the leakage inductance Lr and the coupling inductance Ls of the transformer T1 causes the current to flow from the + terminal side of the capacitor C2 to the transformer T1 through the FET2. When the voltage of the voltage clamp capacitor C2 decreases, the diode D11 on the secondary side enters the non-conductive state, and the power is not supplied to the secondary side of the switching power supply circuit 100. The conductive state of the FET2 is maintained, and the current flowing from the voltage clamp capacitor C2 to the leakage inductance Lr and the coupling inductance Ls of the transformer T1 increases.

The period [3] illustrated in FIG. 3 is a dead time period in which both of the FET1 and the FET2 are turned off. In the period [3] of FIG. 3, the FET2 is turned off, and the capacitance of the capacitor connected to the primary winding P1 of the transformer T1 decreases from a value of a combined capacity of the voltage clamp capacitor C2 and the voltage resonance capacitor C1 to a capacitance of the voltage resonance capacitor C1. Therefore, the electric charge in the voltage resonance capacitor C1 can be regenerated in the smoothing capacitor C3 through the current flowing in the leakage inductance Lr and the coupling inductance Ls of the transformer T1. The diode D1 is conducted when the operation of regeneration is finished. The FET1 is turned on while the diode D1 is conducted after the end of the period [3] illustrated in FIG. 3, and the FET1 can perform switching operation of making a transition from the turn-off condition to the turn-on condition in a zero voltage condition. The switching operation in which the FET1 makes a transition from the turn-off condition to the turn-on condition in the zero voltage condition will be called zero voltage switching. The operation until the end of the operation of regeneration in the smoothing capacitor C3 after the FET2 is turned on will be called active clamp operation. The FET1 is then turned on during a time TL2.

In this way, the action of the voltage clamp capacitor C2 and the FET2 in the active clamp operation described in [1] to [3] of FIGS. 2 and 3 can reduce the surge voltage of the FET1. The charge of the voltage resonance capacitor C1 can be regenerated in the smoothing capacitor C3, and the zero voltage switching of the FET1 can be further performed. Therefore, the active clamp system can be used to improve the efficiency of the switching power supply circuit 100 in the switching period illustrated in FIG. 2.

(Control Method of Power Supply Voltage V11)

A control method of the power supply voltage V11 on the secondary side in the switching period will be described. The power supply voltage V11 on the secondary side of the switching power supply circuit 100 is controlled by changing a ratio of an FET1 turn-on time and an FET2 turn-on time. The power supply voltage V11 on the secondary side increases when the ratio of the FET1 turn-on time to the FET2 turn-on time becomes high. An example of a method of controlling the ratio of the FET1 turn-on time and the FET2 turn-on time includes a method in which the FET2 turn-on time is a fixed time, and the FET1 turn-on time is variable based on feedback information, i.e. FB terminal voltage, output from the feedback unit 115. Similarly, there can be a method in which the ratio of the FET1 turn-on time and the FET2 turn-on time is variable according to the FB terminal voltage output from the feedback unit 115 so that the time of one period becomes constant.

In another method, the FET1 turn-on time and the FET2 turn-on time are corrected to optimal values based on information of a voltage value of the input voltage Vin or the power supply voltage V11 on the secondary side of the switching power supply circuit 100. Then, the FET1 turn-on time can be made variable based on the FB terminal voltage output from the feedback unit 115. The FET1 turn-on time is controlled to be short when the input voltage Vin is large, and the FET2 turn-on time is controlled to be short when the power supply voltage V11 on the secondary side is large. In another method, a current detection unit may be provided on the primary winding P1 of the transformer T1. Control may be performed by detecting an optimal FET2 turn-on time set to allow the FET1 to perform the zero voltage switching, and the FET1 turn-on time may be made variable based on the FB terminal voltage output from the feedback unit 115.

(Intermittent Operation)

Intermittent operation of alternately and repeatedly controlling the switching period described above and the switching halt period described later will be described. The following problem occurs if the control of the switching period is continued when the switching power supply circuit 100 is in a low load state. That is, the efficiency of the switching power supply circuit 100 is reduced by a resistance loss caused by the current on the primary side of the switching power supply circuit 100 or a switching loss of the FET1 and the FET2.

Therefore, when the switching power supply circuit 100 detects the low load state of the switching power supply circuit 100 based on the FB terminal voltage output from the feedback unit 115, the switching power supply circuit 100 performs before-halt control described later and makes a transition to the switching halt period. The switching power supply circuit 100 performs the intermittent operation of repeating the switching period and the switching halt period described later in the low load state. As a result, the current on the primary side of the switching power supply circuit 100 or the number of times that the FET1 and the FET2 are switched can be reduced to improve the power efficiency of the low load state of the switching power supply circuit 100.

The switching power supply circuit 100 of the present embodiment is characterized by improving the loss of the switching power supply circuit 100 based on the before-halt control performed at the transition from the switching period to the switching halt period illustrated in FIG. 2. The switching power supply circuit 100 is also characterized by improving the loss of the switching power supply circuit 100 based on the after-halt control performed at the transition from the switching halt period to the switching period.

(Period for Carrying Out Before-Halt Control)

The before-halt control performed in the period [4] illustrated in FIG. 3 will be described. The FET1 turn-on times in the switching period will be referred to as TL1 and TL2, and the FET2 turn-on time will be referred to as TH1. The FET2 turn-on time in the period for carrying out the before-halt control will be referred to as TH2, and the FET1 turn-on time before the FET2 is turned on at the turn-on time TH2 will be referred to as TL2 (see FIG. 2). The FET2 turn-on time in the period for carrying out the after-halt control will be referred to as TH3.

The operation in the period [4] illustrated in FIG. 3 is similar to the operation in the period [1]. In the present embodiment, the FET2 is turned on for a shorter time than the time that the switching halt period is continued. The FET2 is turned on for a shorter time (TH2) than the time (TH1) that the FET2 is turned on in the switching period. The FET2 is turned on for a time ($\leq$TH1/2) in a half of the time (TH1) that the FET2 is turned on in the switching period. In this way, the present embodiment is characterized in that the FET2 turn-on time TH2 (period [4]) in the period for carrying out the before-halt control is shorter than the FET2 turn-on time TH1 (period of sum of [1] and [2]) in the switching period. In the period for carrying out the before-halt control of the present embodiment, the ratio of the FET1 turn-on time and the FET2 turn-on time is controlled at a ratio (ratio of TL2 and TH2) in a half of the ratio (ratio of TL1 and TH1) of the turn-on time in the switching period. An example of a similar control method of reducing the FET2 turn-on time includes a method of controlling the FET2 turn-on time (TH2) in a time (TH2$\leq$TH1/2) in a half of the FET2 turn-on time (TH1) at which the FET2 is turned on lastly in the switching period.

In this way, the optimal FET2 turn-on time (TH2) at the before-halt control is determined from the ratio (ratio of TL1 and TH1) of the FET1 turn-on time and the FET2 turn-on time in the switching period. As a result, the FET2 can be turned off before the current flows from the + terminal side of the voltage clamp capacitor C2 to the transformer T1 (period [2] of FIG. 3), and a transition to the switching halt period, or more specifically, the state after [5], can be made. In the present embodiment, the FET2 turn-on time (TH2) at the before-halt control is determined as described in the periods [5] and [6] described later. As a result, the transition to the switching halt period can be made while the voltage clamp capacitor C2 is charged with the peak voltage of the resonance of the transformer T1 and the voltage clamp capacitor C2, without providing a dedicated detection unit (see FIG. 2(iv)). Therefore, the efficiency of the switching power supply circuit 100 can be improved.

In the period [5] illustrated in FIG. 3, the operation is as follows. The current not completely provided to the voltage clamp capacitor C2 from the transformer T1 in the period [4] is applied to the voltage clamp capacitor C2 through the voltage resonance capacitor C1 and the diode D2 to further charge the voltage clamp capacitor C2. The peak voltage of the resonance of the transformer T1, the voltage clamp capacitor C2 and the voltage resonance capacitor C1 is provided from the transformer T1 to the + terminal side of the voltage clamp capacitor C2, and then a transition to the state of [6] is made.

In the period [6] illustrated in FIG. 3, the FET1 and the FET2 are turned off, and the current does not flow from the + terminal side of the voltage clamp capacitor C2 to the transformer T1. Therefore, the peak voltage of the resonance can be maintained in the voltage clamp capacitor C2. In this state, resonance operation (indicated by two-way arrow in FIG. 3) of the voltage resonance capacitor C1 and the transformer T1 is generated (see FIG. 2(iv)). The capacitance of the voltage resonance capacitor C1 is low, and resonance operation with a higher frequency than in the switching period is generated. An amplitude of the resonance operation is attenuated in a relatively short time due to a loss caused by resistance components and the like ((iv) of FIG. 2).

An effect of improving the efficiency by the before-halt control that is a feature of the present embodiment will be described. The FET2 can be turned on by the operation in the period [4] illustrated in FIG. 3. Therefore, a loss caused by a forward direction voltage of the diode D2 can be reduced compared to when the resonance current of the transformer T1 and the voltage clamp capacitor C2 is conducted only by the diode D2. Particularly, the effect of reducing the loss is large when a super junction FET with a low turn-on resistance value is used as the FET2.

In the control method of the switching power supply circuit 100 according to the present embodiment, the FET2 turn-on time TH2 in the period [4] illustrated in FIGS. 2 and 3 is determined based on the FET2 turn-on time TH1 in the switching period. Therefore, the control method of the switching power supply circuit 100 according to the present embodiment is characterized in that a detection circuit does not have to be separately provided to detect the optimal turn-on time of the FET2. In this way, the FET2 turn-on time TH2 at the before-halt control is determined from the FET2 turn-on time TH1 in the switching period, and the control can be called predictive control. By determining the FET2 turn-on time TH2 at the before-halt control, a transition to the switching halt period can be made while the peak voltage of the resonance of the transformer T1, the voltage clamp capacitor C2 and the voltage resonance capacitor C1 is provided. The control also allows to obtain the effect of reducing the loss caused by the forward direction voltage of the diode D1.

The effect of reducing the loss caused by the forward direction voltage of the diode D1 can also be obtained even when a detection circuit is provided to detect the optimal turn-on time of the FET2 in the period [4] illustrated in FIG. 3. The determination method of the FET2 turn-on time in the switching halt period is not limited only to the method described in FIGS. 2 and 3 of the present embodiment (method based on TH1).

(Switching Halt Period)

Control of the switching halt period illustrated in FIG. 2 will be described. In the period [7] illustrated in FIG. 3, the FET1 and the FET2 are maintained in the turn-off condition, while the voltage is maintained in the voltage clamp capacitor C2 (FIG. 2(iv)). Since the voltage is maintained in the voltage clamp capacitor C2, the current flows from the + terminal side of the capacitor C2 to the transformer T1 (state of [2] in FIG. 3) by turning on the FET2 even after a predetermined halt period. The control unit 101 ends the switching halt period when the control unit 101 detects a state that the load needs to be supplied to the secondary side of the switching power supply circuit 100 based on the FB terminal voltage output from the feedback unit 115 or when a predetermined time has passed. The control unit 101 makes a transition to the switching period after performing the after-halt control described later.

(Period for Carrying Out after-Halt Control)

The after-halt control of [8] and [9] illustrated in FIG. 3 will be described. Although the operation in the period [8] illustrated in FIG. 3 is similar to the operation in the period [2], the FET2 turn-on time is shortened in the period [8] illustrated in FIG. 3. In the present embodiment, the FET2 is turned on for a time shorter than the time that the switching halt period is continued. The FET2 is turned on for a time shorter than the time (TH1) that the FET2 is turned on in the switching period. The FET2 is turned on for a time (<TH1/2) shorter than a half of the time (TH1) that the FET2 is turned on in the switching period. In the control of the present embodiment, the ratio of the FET1 turn-on time and the FET2 turn-on time is controlled at a ratio (ratio of TL2 and TH3) smaller than a half of the ratio (ratio of TL1 and TH1) of the turn-on time in the switching period.

An example of a similar control method for obtaining a similar effect includes the following method. In the after-halt control of [8] illustrated in FIG. 3, the FET2 turn-on time TH3 may be controlled in a time (TH3<TH1/2) shorter than a half of the FET2 turn-on time (TH1) (time of sum of [1] and [2]) at which the FET2 is turned on lastly in the switching period. The FET2 turn-on time TH3 may be a time (TH3<TH2) shorter than the FET2 turn-on time TH2 of the before-halt control. In this case, a relationship "TH1/2≥TH2>TH3" is established for the FET2 turn-on time (TH3). The efficiency of the switching power supply circuit 100 is improved by shortening the FET2 turn-on time in the period [8]. More specifically, an excessive increase in the current flowing from the voltage clamp capacitor C2 to the leakage inductance Lr and the coupling inductance Ls of the transformer T1 can be prevented, and the efficiency of the switching power supply circuit 100 is improved.

In the subsequent period [9] illustrated in FIG. 3, the FET1 and the FET2 are turned off as in the period [3], and the period [9] is a dead time period. After the dead time period [9] of FIG. 3, the FET1 can be turned on, and the FET1 can perform the zero voltage switching as in the description of the period [3].

In the intermittent operation of the present embodiment, the switching period described in [1] to [3] of FIGS. 2 and 3, the before-halt control described in [4], the switching halt period described in [5] to [7] and the after-halt control described in [8] and [9] are repeated. In this case, a switching halt period sufficiently long with respect to the FET2 turn-on times TH2 and TH3 of the before-halt control and the after-halt control is provided. As a result, the current on the primary side of the switching power supply circuit 100 or the number of times that the FET1 and the FET2 are switched can be reduced to improve the power efficiency of the switching power supply circuit 100 in the low load state.

[Control of Switching Power Supply Circuit]

Figure 4:
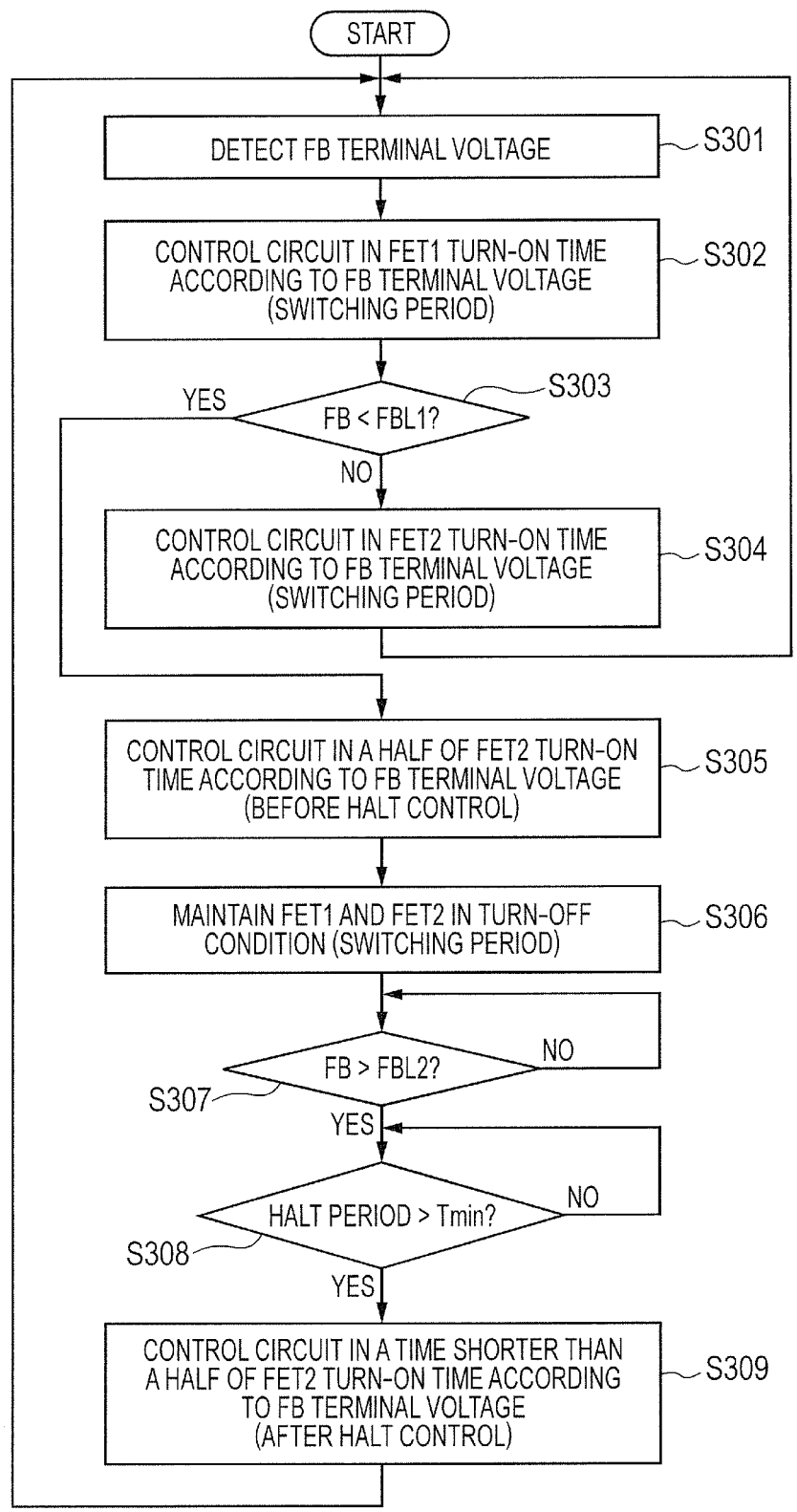
FIG. 4 is a flow chart illustrating control of a switching power supply circuit according to the first embodiment.

FIG. 4 is a flow chart describing a control process of the switching power supply circuit 100 by the control unit 101 according to the present embodiment. The control unit 101 starts the following control when the AC power supply 10 is connected to the switching power supply circuit 100, and power is supplied to the switching power supply circuit 100. In step (hereinafter, "S") 301, the control unit 101 detects the FB terminal voltage input from the feedback unit 115 to the FB terminal. In S302, the control unit 101 controls the FET1 turn-on time according to the FB terminal voltage detected in S301. For example, the control unit 101 sets the FET1 turn-on time to TL1 or TL2 to control the drive of the FET1.

In S303, the control unit 101 determines whether the FB terminal voltage is smaller than a predetermined voltage FBL1 (FB<FBL1) to determine whether the switching power supply circuit 100 is in a low load state. The predetermined voltage FBL1 used to determine whether the switching power supply circuit 100 is in the low load state will be called a halt voltage. If the control unit 101 determines that the FB terminal voltage is equal to or greater than the halt voltage FBL1 in S303, the control unit 101 proceeds to a process of S304. In S304, the control unit 101 determines the FET2 turn-on time based on the time according to the FB terminal voltage and returns to the process of S301. For example, the control unit 101 sets the FET2 turn-on time to TH1 to control the drive of the FET2. The control unit 101 stores the FET2 turn-on time (TH1) in the switching period in a storage unit, such as a RAM, not illustrated included inside. Note that the control unit 101 performs the control by providing the predetermined dead time between the FET1 turn-on time and the FET2 turn-on time. In this case, the switching power supply circuit 100 is not in the low load state, and the control unit 101 performs the continuous operation for continuously carrying out the switching period.

If the control unit 101 determines that the FB terminal voltage is smaller than the halt voltage FBL1 in S303, the control unit 101 proceeds to a process of S305. In S305, the control unit 101 controls the FET2 turn-on time so that the FET2 turn-on time becomes a time (TH2≤TH1/2) equal to or smaller than ½ (half) of the time (TH1) according to the FB terminal voltage. The control is the before-halt control described above. In S306, the control unit 101 turns off and maintains the FET1 and the FET2 after the FET2 turn-on time (TH2) determined in S305. The control is the control in the switching halt period described above. The control unit 101 resets and starts a timer not illustrated.

In S307, the control unit 101 determines whether the FB terminal voltage is greater than a predetermined voltage FBL2 to detect whether the power supplied as the power supply voltage V11 on the secondary side of the switching power supply circuit 100 is insufficient. The predetermined voltage FBL2 used to determine whether to make a transition from the switching halt period to the switching period will be called a return voltage. A relationship between the halt voltage FBL1 and the return voltage FBL2 is FBL2>FBL1 to provide a hysteresis.

If the control unit 101 determines that the FB terminal voltage is greater than the return voltage FBL2 in S307, the control unit 101 proceeds to a process of S308. If the FB terminal voltage is equal to or smaller than the return voltage FBL2 in S307, the control unit 101 continues the switching halt period and repeats the process of S307. In S308, the control unit 101 refers to the timer not illustrated to determine whether a length of the switching halt period started in the process of S306 is longer than a predetermined minimum halt period Tmin stored in a memory not illustrated of the control unit 101. In this way, the control unit 101 uses the internal timer of the control unit 101 to measure the length of the switching halt period.

If the control unit 101 determines that the switching halt period is longer than the minimum halt period Tmin in S308, the control unit 101 proceeds to a process of S309. If the control unit 101 determines that the switching halt period is equal to or smaller than the minimum halt period Tmin in S308, the control unit 101 repeats the process of S308 and continues the switching halt period. In this way, the determination of the return from the switching halt period to the switching period is performed based on the FB terminal voltage and the lapse of the predetermined time in the present embodiment. However, the determination of the return from the switching halt period to the switching period may be determined based on the FB terminal voltage, may be determined based on the lapse of time, or may be determined based on other factors. In S309, the control unit 101 reads the FET2 turn-on time (TH1) set according to the FB terminal voltage from the memory stored in S304. The control unit 101 determines the FET2 turn-on time (TH3<TH1/2) by setting the FET2 turn-on time in a time shorter than ½ of the FET2 turn-on time (TH1) in the switching period. The control unit 101 turns on the FET2 and returns to the process of S301. The control is the after-halt control described above. The control unit 101 repeats the control to control the switching power supply circuit 100.

As described, the control unit 101 turns on the FET2 and makes a transition to the switching halt period in the transition from the switching period to the switching halt period. The control unit 101 also turns on the FET2 to make a transition to the switching period in the transition from the switching halt period to the switching period. The switching power supply circuit 100 of the present embodiment has the following features.

- The intermittent operation of repeating the switching period and the switching halt period is performed in the low load state of the switching power supply circuit 100.
- The before-halt control of turning on the FET2 is performed before the switching halt period.
- The after-halt control of turning on the FET2 is performed after the switching halt period.
- The FET2 turn-on time of the before-halt control and the after-halt control is controlled to be shorter than the FET2 turn-on time in the switching period.

According to the present embodiment, the power efficiency during the low load in the power supply apparatus of the active clamp system can be improved.

Second Embodiment

[Configuration of Switching Power Supply Circuit]

Figure 5:
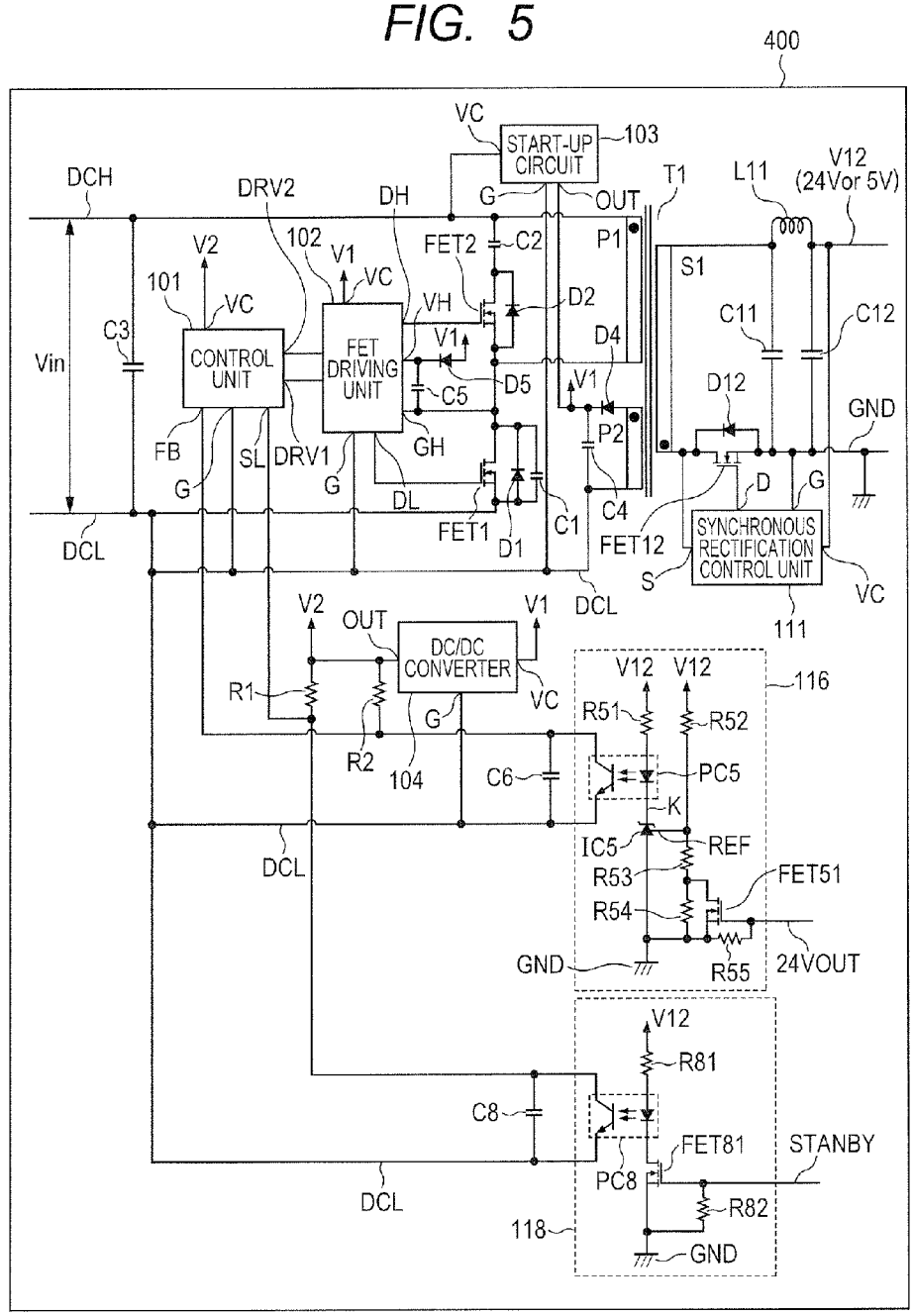
FIG. 5 is a schematic diagram of a power supply circuit according to a second embodiment.

A switching power supply circuit 400 according to a second embodiment will be described. The same reference signs are provided to the same components as in the first embodiment, and the description will not be repeated. The switching power supply circuit 400 illustrated in FIG. 5 includes a feedback unit 116 as a feedback device and a switching control unit 118. The switching control unit 118 switches two states, i.e. a stand-by state for outputting a 24V voltage that is a first voltage as a power supply voltage V12 on the secondary side and a sleep state for outputting a 5V voltage that is a second voltage. In this way, the configuration of the present embodiment is different from the first embodiment in that the switching control unit 118 that switches the stand-by state and the sleep state is included. The present embodiment is also different from the first embodiment in that a synchronous rectification circuit and a smoothing circuit described later are added in place of the diode D11 in the secondary side rectification circuit of the switching power supply circuit 400. The synchronous rectification circuit of the present embodiment includes an FET12, a diode D12 and a synchronous rectification control unit 111. The smoothing circuit of the present embodiment includes a coil L11 and a capacitor C12.

The synchronous rectification control unit 111 controls the synchronous rectification circuit of the switching power supply circuit 400. The synchronous rectification control unit 111 sets the output of a D terminal to a high level only in a conduction period of the diode D12 detected by an S terminal to turn on the FET12 that is a switch element for synchronous rectification. As a result, the voltage of the secondary winding S1 of the transformer T1 is rectified. The synchronous rectification control unit 111 is, for example, a control unit integrally formed as a discrete circuit or a semiconductor integrated circuit. A power supply voltage V12 is supplied to between a VC terminal and a G terminal of the synchronous rectification control unit 111. The power supply voltage V12 is an output voltage of the switching power supply circuit 400 and is a voltage of 24V or 5V in the present embodiment as described later. The capacitors C11 and C12 and the coil L11 smooth the voltage rectified by the synchronous rectification control unit 111, and the voltage is output as the power supply voltage V12.

(Feedback Unit)

The feedback unit 116 is different from the feedback unit 115 of the first embodiment in that a switching function of feedback voltage using resistances R53 and R54 and an FET51 is included. A resistance R55 is connected between a gate terminal and a source terminal of the FET51. A 24VOUT signal that is a signal for switching the feedback voltage is input to the gate terminal of the FET51 of the feedback unit 116 from a control unit or the like of an electronic device including the switching power supply circuit 400. When the 24VOUT signal becomes a high level, the FET51 is turned on, and the resistance R54 is short-circuited. Therefore, the voltage input to the reference terminal REF of the shunt regulator IC5 is a voltage obtained by dividing the power supply voltage V12 by the resistances R52 and R53. As a result, the switching power supply circuit 400 outputs the 24V voltage as the power supply voltage V12 on the secondary side.

On the other hand, when the 24VOUT signal becomes a low level, the FET51 is turned off, and the resistance R53 and the resistance R54 are connected in series. Therefore, the voltage input to the reference terminal REF of the shunt regulator IC5 is a voltage obtained by dividing the power supply voltage V12 by a combined resistance of the resistance R52, the resistance R53 and the resistance R54. As a result, the switching power supply circuit 400 outputs the 5V voltage as the power supply voltage V12 on the secondary side. In this way, the power supply voltage V12 of the switching power supply circuit 400 is switched to 24V or 5V according to the 24VOUT signal input from the outside of the switching power supply circuit 400 in the present embodiment.

(Switching Control Unit)

The switching control unit 118 performs switching control of the stand-by state and the sleep state according to a STAND-BY signal. The STAND-BY signal that is a signal for switching the operation state of the switching power supply circuit 400 is input to a gate terminal of an FET81 of the switching control unit 118 from a control unit or the like of an electronic device including the switching power supply circuit 400. A resistance R82 is connected between the gate terminal and a source terminal of the FET81. When the STAND-BY signal in the high level is input to the switching control unit 118, the FET81 is turned on, and a secondary side diode of a photocoupler PC8 enters a conductive state through a resistance R81. As a result, a primary side transistor of the photocoupler PC8 is turned on, and the electric charge in the capacitor C8 is discharged. One end of the capacitor C8 is connected to an SL terminal of the control unit 101, and the voltage of the SL terminal (hereinafter, "SL terminal voltage") of the control unit 101 becomes a low level when the charge of the capacitor C8 is discharged.

On the other hand, when the STAND-BY signal in the low level is input to the switching control unit 118, the FET81 is turned off, and the secondary side diode of the photocoupler PC8 enters a non-conductive state. As a result, the primary side transistor of the photocoupler PC8 is also turned off, and the capacitor C8 is charged from the power supply voltage V2 through a resistance R1. The SL terminal voltage of the control unit 101 becomes the high level. The control unit 101 determines whether to put the switching power supply circuit 400 into the stand-by state or the sleep state according to the SL terminal voltage. In the present embodiment, the stand-by state is set in the case where the SL terminal voltage of the control unit 101 is in the low level, and the sleep state is set in the case where the SL terminal voltage of the control unit 101 is in the high level. However, this may be opposite.

Figure 6A:
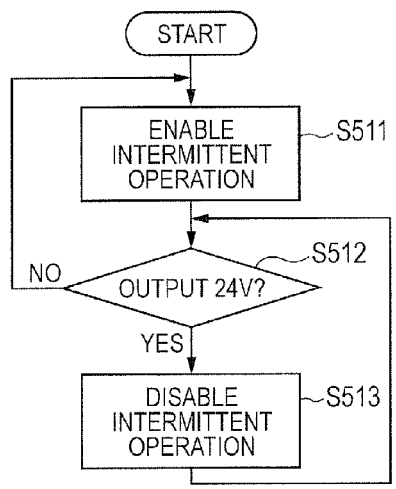
FIGS. 6A, 6B, 6C and 6D are flow charts illustrating control of the switching power supply circuit according to the second embodiment.
Figure 6B:
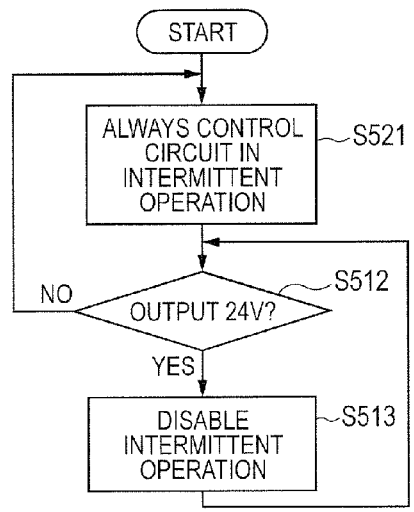
Figure 6C:
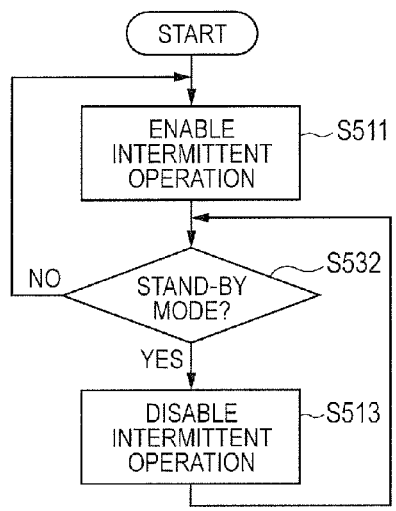
Figure 6D:
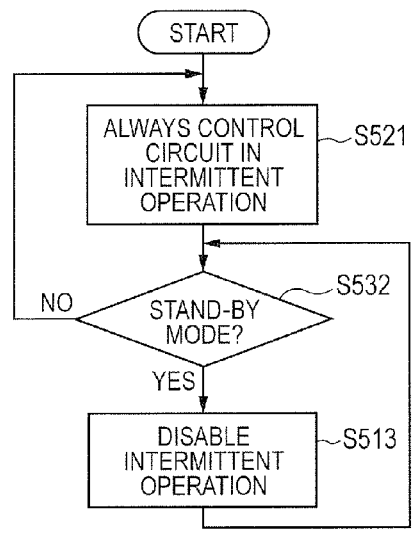

Flow charts of FIGS. 6A to 6D illustrate four different control methods of the switching power supply circuit 400 by the control unit 101. The control unit 101 can carry out various controls as described below according to an electronic device including the switching power supply circuit 400. The same reference signs are provided when processes in FIGS. 6B to 6D are the same as in FIG. 6A, and the description will not be repeated. In the present embodiment, the control unit 101 also carries out the intermittent operation (switching period, before-halt control, switching halt period and after-halt control) described in the first embodiment when the control unit 101 carries out the intermittent operation. The determination method of the FET2 turn-on time in the before-halt control and the after-halt control is also the same as in the first embodiment.

(When 24VOUT Signal and STAND-BY Signal are Connected)

(First Control Sequence)

FIG. 6A is a flow chart describing a first control sequence of the switching power supply circuit 400 by the control unit 101 of the present embodiment. In the flow chart described in FIG. 6A, the 24VOUT signal and the STAND-BY signal are connected. More specifically, the 24VOUT signal and the STAND-BY signal work together in the first control sequence of FIG. 6A. When the 24VOUT signal is in the high level, the STAND-BY signal is also in the high level. When the 24VOUT signal is in the low level, the STAND-BY signal is also in the low level. The control unit 101 starts the first control sequence when the power is supplied to the switching power supply circuit 400. In S511, the control unit 101 enables the intermittent operation of the switching power supply circuit 400 described in the first embodiment. Enabling the intermittent operation denotes that the switching power supply circuit 400 is enabled to perform not only the continuous operation, but also the intermittent operation as necessary.

In S512, the control unit 101 determines whether there is a request for outputting the 24V voltage to the power supply voltage V12 based on the SL terminal voltage. The SL terminal voltage is a voltage used by the switching power supply circuit 400 to determine switching of the stand-by state and the sleep state. In FIG. 6A, the STAND-BY signal and the 24VOUT signal are connected, and whether to set the power supply voltage V12 to the 24V voltage or to the 5V voltage can also be determined based on the SL terminal voltage. The control unit 101 may also perform the determination of S512 based on the FB terminal voltage changed according to the 24VOUT signal. If the control unit 101 determines that there is a request for outputting the 24V voltage in S512, the control unit 101 proceeds to a process of S513. In S513, the control unit 101 disables the intermittent operation described in the first embodiment and returns to the process of S512. Disabling the intermittent operation denotes that the switching power supply circuit 400 does not perform the intermittent operation, i.e. always performs the continuous operation. If the control unit 101 determines that there is no request for outputting the 24V voltage in S512, i.e. determines to output the 5V voltage as the power supply voltage V12, the control unit 101 returns to the process of S511. In S511, the control unit 101 maintains the intermittent operation described in the first embodiment in the enabled state.

Table 1 is a table describing FIGS. 6A and 6B. A second column of Table 1 indicates the case where the power supply voltage V12 of the switching power supply circuit 400 is the 5V voltage, and a third column indicates the case where the power supply voltage V12 of the switching power supply circuit 400 is the 24V voltage. Table 1 also illustrates operation states of the switching power supply circuit 400 in the low load state or the high load state for each voltage of the power supply voltage V12 of the switching power supply circuit 400.

In the case of FIG. 6A, the intermittent operation is disabled if there is a request for outputting the 24V voltage as the power supply voltage V12 of the switching power supply circuit 400 (S513). As a result, the intermittent operation is not performed when the 24V voltage that requires high power output is output, and responsiveness of the switching power supply circuit 400 can be increased. More specifically, if there is a request for outputting the 24V voltage to the power supply voltage V12 of the switching power supply circuit 400, the switching power supply circuit 400 performs the continuous operation in both of the low load state and the high load state. On the other hand, if there is no request for outputting the 24V voltage to the power supply voltage V12 of the switching power supply circuit 400, the intermittent operation is enabled (S511). In this case, the 5V voltage is output as the power supply voltage V12 of the switching power supply circuit 400. If the power supply voltage V12 of the switching power supply circuit 400 is the 5V voltage, the intermittent operation is enabled (S511), and the switching power supply circuit 400 performs not only the continuous operation, but also the intermittent operation according to the load state. Specifically, if the power supply voltage V12 of the switching power supply circuit 400 is the 5V voltage, the intermittent operation is performed in the low load state, and the continuous operation is performed in the high load state. The power supply voltage V12 is input to the feedback unit 116, and the FB terminal voltage output from the feedback unit 116 to the control unit 101 changes according to the load state. Therefore, the control unit 101 determines whether the state is the low load state or the high load state based on the FB terminal voltage.

(Second Control Sequence)

FIG. 6B is a flow chart describing a second control sequence of the switching power supply circuit 400 by the control unit 101 according to the present embodiment. The 24VOUT signal and the STAND-BY signal are also connected in the flow chart described in FIG. 6B. The control unit 101 starts the second control sequence when the power is supplied to the switching power supply circuit 400. In S521, the control unit 101 controls the switching power supply circuit 400 to always perform the intermittent operation. S512 and S513 are already described, and the description will not be repeated.

In the case of FIG. 6B, the control is always performed in the intermittent operation if there is no request for outputting the 24V voltage as the power supply voltage V12 of the switching power supply circuit 400, i.e. if the 5V voltage is output (S521, Table 1). The control of FIG. 6B can be applied to, for example, a power supply apparatus with specifications in which there is no high load state when the 5V voltage is output, in other words, when the state is always the low load state. In the case of the power supply apparatus in which the state is always the low load state when the 5V voltage is output, the control unit 101 can determine the low load state based on the SL terminal voltage. More specifically, in the power supply apparatus with the specifications, the low load state in which the intermittent operation needs to be performed can be deter-

TABLE 1

| | 5 V OUTPUT STATE | | 24 V OUTPUT STATE | |
| --- | --- | --- | --- | --- |
| | LOW LOAD STATE | HIGH LOAD STATE | LOW LOAD STATE | HIGH LOAD STATE |
| FIG. 6A | INTERMITTENT OPERATION | CONTINUOUS OPERATION | CONTINUOUS OPERATION | |
| FIG. 6B | INTERMITTENT OPERATION | | CONTINUOUS OPERATION | | mined only by the SL terminal voltage. The process is the same as in FIG. 6A if the power supply voltage V12 of the switching power supply circuit 400 is the 24V voltage, and the description will not be repeated.

In the control of FIGS. 6A and 6B, the 24VOUT signal and the STAND-BY signal are connected. Therefore, an auxiliary winding (not illustrated) for detecting a flyback voltage may be provided on the primary side of the transformer T1 in place of the switching control unit 118, and the voltage of the auxiliary winding may be detected. The state of the power supply voltage V12 on the secondary side (whether the 24V voltage is output or the 5V voltage is output) may be determined in this way.

(When 24VOUT Signal and STAND-BY Signal are Separated)

(Third Control Sequence)

FIG. 6C is a flow chart describing a third control consequence of the switching power supply circuit 400 by the control unit 101 according to the present embodiment. In the flow chart described in FIG. 6C, the 24VOUT signal and the STAND-BY signal are separated. More specifically, the 24VOUT signal and the STAND-BY signal do not work together in the third control sequence of FIG. 6C, and the signals independently become high-level or low-level signals. The control unit 101 starts the third control sequence when the power is supplied to the switching power supply circuit 400.

In S511, the control unit 101 enables the intermittent operation. In S532, the control unit 101 determines whether there is a request for transition to the stand-by state (stand-by mode) in the switching power supply circuit 400 based on the SL terminal voltage. If the control unit 101 determines that there is a request for transition to the stand-by state in S532, the control unit 101 proceeds to the process of S513 and disables the intermittent operation. If the control unit 101 determines that there is no request for transition to the stand-by state in S532, i.e. determines that the state is the sleep state, the control unit 101 returns to the process of S511 and maintains the intermittent operation in the enabled state.

Table 2 is a table describing FIGS. 6C and 6D. The rest is the same as in Table 1, and the description will not be repeated.

On the other hand, if there is no request for the transition to the stand-by state in the switching power supply circuit 400, the intermittent operation is enabled in S511. In this case, the switching power supply circuit 400 enters the sleep state. The intermittent operation is enabled when the switching power supply circuit 400 is in the sleep state, and the switching power supply circuit 400 performs not only the continuous operation, but also the intermittent operation according to the load state. Specifically, when the switching power supply circuit 400 is in the sleep state, the intermittent operation is performed in the low load state, and the continuous operation is performed in the high load state.

(Fourth Control Sequence)

FIG. 6D is a flow chart describing a fourth control sequence of the switching power supply circuit 400 by the control unit 101 according to the present embodiment. In the flow chart described in FIG. 6D, the 24VOUT signal and the STAND-BY signal are separated as in FIG. 6C. The control unit 101 starts the fourth control sequence when the power is supplied to the switching power supply circuit 400. The configuration of FIG. 6D is a combination of the processes described in FIGS. 6B and 6C, and the description will not be repeated.

In the case of FIG. 6D, whether to always perform the control in the intermittent operation or to disable the intermittent operation is determined according to the mode of the switching power supply circuit 400, regardless of whether the power supply voltage V12 of the switching power supply circuit 400 is the 24V voltage or the 5V voltage. In the case of FIG. 6D, the control is always performed in the intermittent operation if there is no request for transition to the stand-by mode in the switching power supply circuit 400, i.e. if the state is the sleep state (S521). The control of FIG. 6D can be applied to a power supply apparatus with specifications in which the state is always the low load state in the sleep state. In the power supply apparatus in which the state is always the low load state in the sleep state, the control unit 101 can determine the low load state based on the SL terminal voltage. The process is the same as in FIG. 6C when

TABLE 2

|  | SLEEP STATE | | STAND-BY STATE | |
| --- | --- | --- | --- | --- |
|  | LOW LOAD STATE | HIGH LOAD STATE | LOW LOAD STATE | HIGH LOAD STATE |
| FIG. 6C | INTERMITTENT OPERATION | CONTINUOUS OPERATION | CONTINUOUS OPERATION | |
| FIG. 6D | INTERMITTENT OPERATION | | CONTINUOUS OPERATION | |

In the case of FIG. 6C, the STAND-BY signal in the high level is input to the switching control unit 118 if there is a possibility of outputting high power, regardless of whether the power supply voltage V12 of the switching power supply circuit 400 is the 24V voltage or the 5V voltage. The control unit 101 disables the intermittent operation if the control unit 101 determines that the mode is the stand-by mode based on the SL terminal voltage. In this case, the control unit 101 does not perform the intermittent operation in the stand-by state and performs the continuous operation of the switching power supply circuit 400 regardless of whether the state is the low load state or the high load state. This can increase the responsiveness of the switching power supply circuit 400.

the switching power supply circuit 400 is in the stand-by mode, and the description will not be repeated.

In this way, the unit that determines the low load state of the switching power supply circuit 400 is not limited to the unit that uses the FB terminal voltage of the control unit 101 described in the first embodiment. As described in the switching power supply circuit 400 of the present embodiment, the STAND-BY signal or the like supplied from the outside may be used. The present invention is characterized by the control method of performing the intermittent operation when one of the units is used to determine that the switching power supply circuit 400 is in the low load state.

The switching power supply circuit 400 of the present embodiment has the following features in addition to the features of the switching power supply circuit 100.

The power supply voltage V12 of the switching power supply circuit 400 can be set to a plurality of voltages (24V voltage and 5V voltage).

The switching power supply circuit 400 has a plurality of states, such as the stand-by state and the sleep state.

The intermittent operation of the switching power supply circuit 400 is disabled in the stand-by state (state of outputting the 24V voltage).

The intermittent operation of the switching power supply circuit 400 is enabled in the sleep state (state of outputting the 5V voltage), or the switching power supply circuit 400 is always controlled by the intermittent operation.

According to the present embodiment, the power efficiency during the low load in the power supply apparatus of the active clamp system can be improved.

Third Embodiment

The switching power supply circuit that is a power supply apparatus described in the first and second embodiments can be applied to, for example, a low voltage power supply of an image forming apparatus, i.e. a power supply that supplies power to a controller (control unit) or a driving unit such as a motor. A configuration of an image forming apparatus provided with the power supply apparatus of the first and second embodiments will be described.

[Configuration of Image Forming Apparatus]

Figure 7:
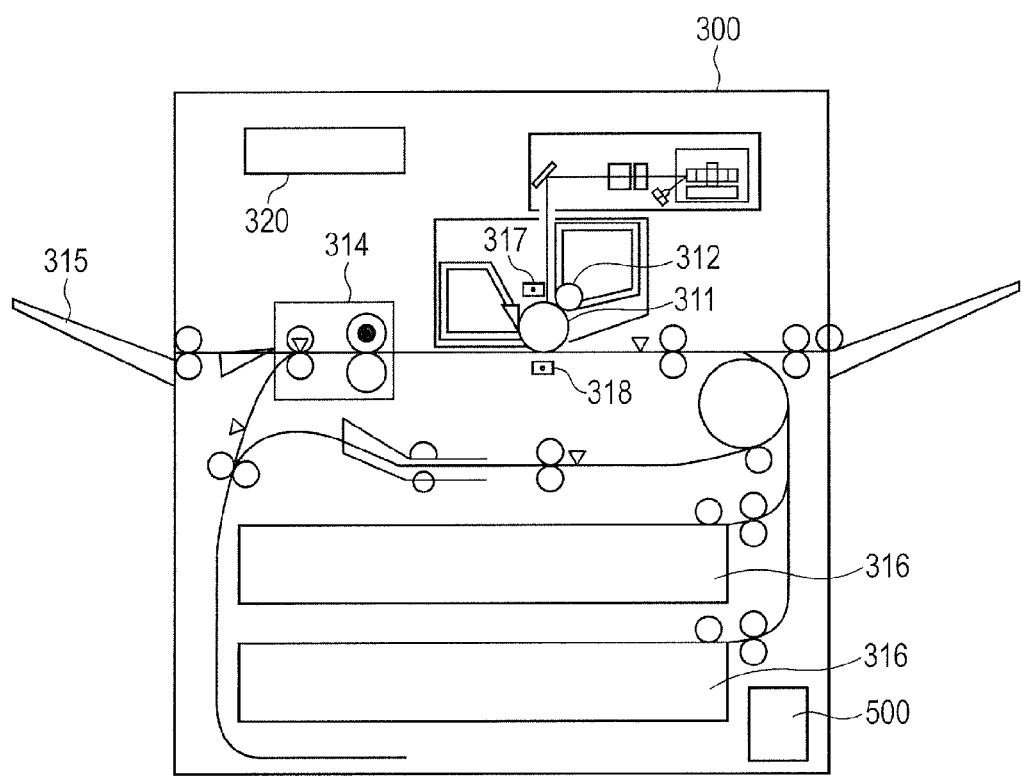
FIG. 7 is a diagram illustrating an image forming apparatus according to a third embodiment.

A laser beam printer will be described as an example of the image forming apparatus. FIG. 7 illustrates a schematic configuration of the laser beam printer as an example of an electrophotographic printer. A laser beam printer 300 includes: a photosensitive drum 311 as an image bearing member for forming an electrostatic latent image; a charging unit 317 (charging device) that uniformly charges the photosensitive drum 311; and a developing unit 312 (developing device) that uses toner to develop an electrostatic latent image formed on the photosensitive drum 311. A transfer unit 318 (transfer device) transfers a toner image developed on the photosensitive drum 311 to a sheet (not illustrated) as a recording material supplied from a cassette 316. A fixing device 314 fixes the toner image transferred to the sheet, and the sheet is discharged to a tray 315. The photosensitive drum 311, the charging unit 317, the developing unit 312 and the transfer unit 318 form an image forming unit. The laser beam printer 300 also includes a switching power supply circuit 500 described in the first to third embodiments. The image forming apparatus that can be provided with the switching power supply circuit 500 of the first and second embodiments is not limited to the one illustrated in FIG. 7, and the apparatus may be an image forming apparatus including a plurality of image forming units, for example. The apparatus may also be an image forming apparatus including: a primary transfer unit that transfers a toner image on the photosensitive drum 311 to an intermediate transfer belt; and a secondary transfer unit that transfers the toner image on the intermediate transfer belt to a sheet.

The laser beam printer 300 includes a controller 320 that controls image forming operation by the image forming unit and conveyance operation of the sheet, and the switching power supply circuit 500 according to the first and second embodiments supplies power to the controller 320, for example. The switching power supply circuit 500 according to the first and second embodiments also supplies power to the driving unit, such as a motor, for rotating the photosensitive drum 311 or for driving various rollers for conveying the sheet. When the switching power supply circuit 500 of the present embodiment is the switching power supply circuit 100 of the first embodiment, the control unit 101 performs the intermittent operation based on the FB terminal voltage. In this case, as described in the first embodiment, the control unit 101 performs the before-halt control in the transition from the switching period to the switching halt period and performs the after-halt control in the transition from the switching halt period to the switching period. As a result, the power efficiency of the switching power supply circuit 500 during the low load can be improved.

The image forming apparatus of the present embodiment can operate in a normal operation mode, a stand-by mode or a sleep mode. The stand-by mode is a mode in which the consumed power is lower than in the normal operation mode for performing the image forming operation, and the image forming operation can be immediately carried out once a print instruction is received. The sleep mode is a mode in which the consumed power is further lower than in the stand-by mode. When the power supply apparatus is the switching power supply circuit 400 of the second embodiment, the controller 320 outputs a 20VOUT signal or a STAND-BY signal to the switching power supply circuit 400, for example. As described in Table 1, Table 2 and the like, the control unit 101 of the switching power supply circuit 400 performs the intermittent operation in the low load state based on the SL terminal voltage. The control unit 101 controls the intermittent operation described in the first embodiment. As a result, the power efficiency of the switching power supply circuit 500 during the low load can be improved.

According to the present embodiment, the power efficiency during the low load in the power supply apparatus of the active clamp system can be improved.

Fourth Embodiment

[Power Supply Apparatus]

Figure 8:
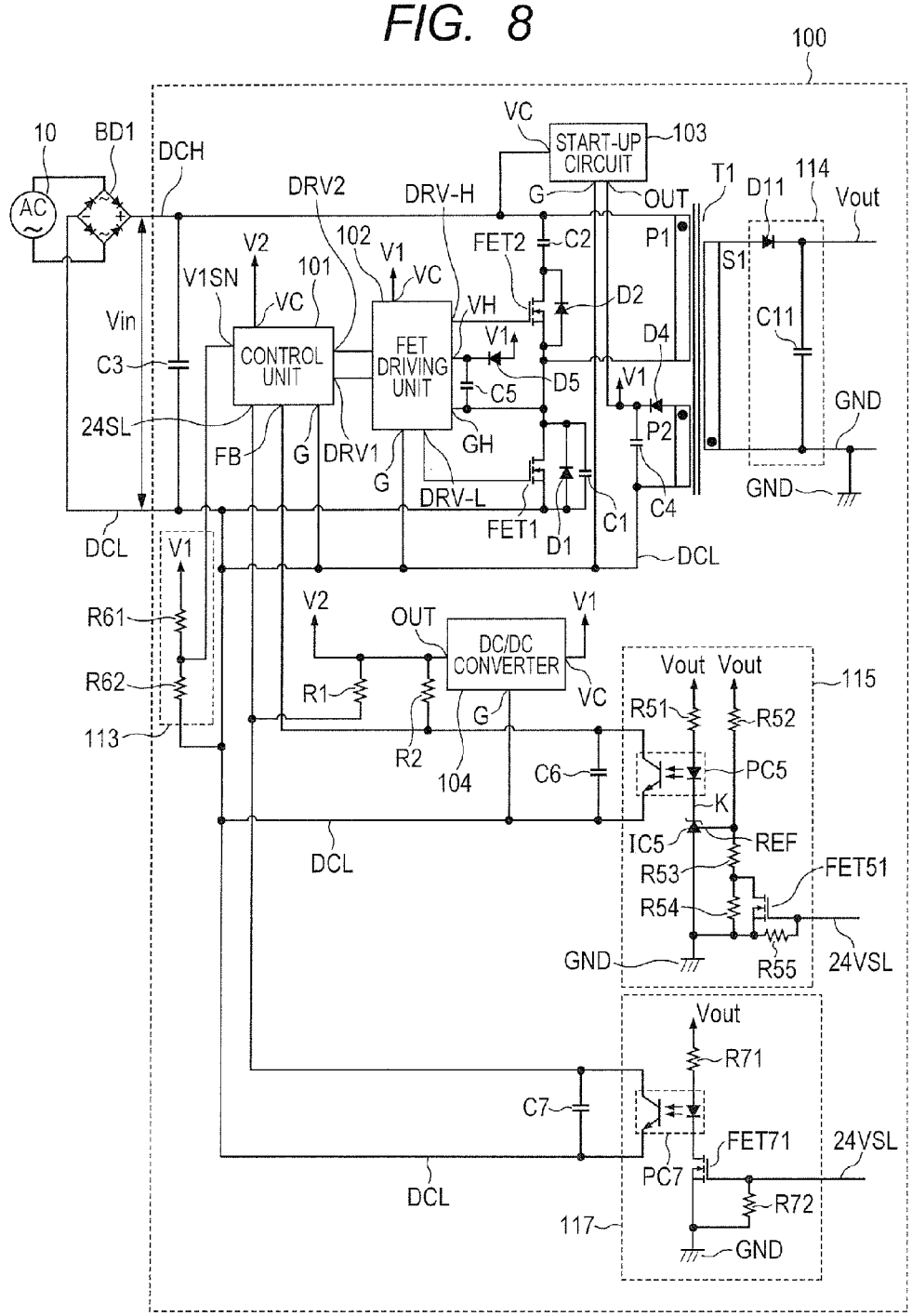
FIG. 8 is a circuit diagram of a switching power supply according to a fourth embodiment.

FIG. 8 is a circuit diagram describing a flyback power supply using the active clamp system that is a switching power supply according to a fourth embodiment. The circuit of the switching power supply of the present embodiment is the switching power supply circuit 100 in the following description. The AC power supply 10, such as a commercial power supply, outputs an AC voltage, and a voltage rectified by the bridge diode BD1 that is a full-wave rectification unit is input to the switching power supply circuit 100. The smoothing capacitor C3 is used as a smoothing unit of the rectified voltage. The potential DCL is a lower potential of the smoothing capacitor C3, and the potential DCH is a higher potential. The switching power supply circuit 100 outputs a power supply voltage Vout from the input voltage Vin charged in the smoothing capacitor C3 to the insulated secondary side. The switching power supply circuit 100 can output a plurality of power supply voltages Vout with different voltage values. In the present embodiment, the switching power supply circuit 100 outputs, for example, a constant voltage of 24V or 5V as the power supply voltage Vout.

The switching power supply circuit 100 includes the insulation transformer T1 including the primary winding P1 and the auxiliary winding P2 on the primary side and the secondary winding S1 on the secondary side. Energy is supplied from the primary winding P1 of the transformer T1 to the secondary winding S1 by switching operation described in FIGS. 9A and 9B described later. The auxiliary winding P2 of the transformer T1 is used to rectify and smooth, by the diode D4 and the capacitor C4, the forward voltage of the input voltage Vin applied to the primary winding P1 to supply the power supply voltage V1.

The field effect transistor (hereinafter, "FET") 1 that is a first switching element is connected in series to the primary winding P1 of the transformer T1 on the primary side of the switching power supply circuit 100. The voltage clamp capacitor C2 and the FET2 that is a second switching element are connected in series. The voltage clamp capacitor C2 and the FET2 connected in series are connected in parallel to the primary winding P1 of the transformer T1. The control unit 101 and the FET driving unit 102 as control units of the FET1 and the FET2 are provided on the primary side of the switching power supply circuit 100. The voltage resonance capacitor C1 connected in parallel to the FET1 is provided to reduce a loss during switch-off of the FET1 and the FET2. The capacitance between the drain terminal and the source terminal of the FET1 may be used, instead of providing the voltage resonance capacitor C1. The diode D1 of the present embodiment is a body diode of the FET1. Similarly, the diode D2 is a body diode of the FET2.

The rectification smoothing circuit 114 that is a rectification smoothing unit on the secondary side of the flyback voltage induced in the secondary winding S1 of the transformer T1 is provided on the secondary side of the switching power supply circuit 100 (dotted frame in FIG. 8). The rectification smoothing circuit 114 includes the diode D11, the capacitor C11 and the feedback unit 115 as a feedback device that feeds back, to the primary side, the power supply voltage Vout output to the secondary side (dotted frame in FIG. 8).

An arithmetic control unit, such as a CPU and an ASIC, operated by a clock generated by an oscillator or the like is used as the control unit 101 of the present embodiment. As a result, complicated control as described later can be realized by a simple and inexpensive circuit configuration. The present embodiment will be described on the assumption that the control unit 101 is a CPU. The power supply voltage V2 generated by the DC/DC converter 104 is supplied from the OUT terminal of the DC/DC converter 104 to between the VC terminal and the G terminal of the control unit 101. The control unit 101 outputs the control signal DRV1 and the control signal DRV2 based on the voltage signal input from the feedback unit 115 to the FB terminal and controls the FET1 and the FET2 through the FET driving unit 102. The control signal DRV1 is a signal for driving the FET1, and the control signal DRV2 is a signal for driving the FET2.

The FET driving unit 102 is a circuit that generates an FET1 gate drive signal DRV-L according to the control signal DRV1 input from the control unit 101 and an FET2 gate drive signal DRV-H according to the control signal DRV2. The power supply voltage V1 is supplied to between the VC terminal and the G terminal of the FET driving unit 102. To drive the FET2, the charge pump circuit including the capacitor C5 and the diode D5 supplies the power supply voltage V1 to between the VH terminal and the GH terminal. When the control signal DRV1 in a high level is input from the control unit 101, the FET driving unit 102 puts the FET1 gate drive signal DRV-L into the high level, and the FET1 is turned on. Similarly, when the control signal DRV2 in a high level is input from the control unit 101, the FET driving unit 102 puts the FET2 gate drive signal DRV-H into the high level, and the FET2 is turned on.

The DC/DC converter 104 is a three-terminal regulator or a step-down switching power supply configured to convert the power supply voltage V1 input to between the VC terminal and the G terminal to output the power supply voltage V2 from the OUT terminal. The start-up circuit 103 is a three-terminal regulator or a step-down switching power supply configured to convert the input voltage Vin input to between the VC terminal and the G terminal to output the power supply voltage V1 from the OUT terminal. The start-up circuit 103 is a circuit operated only when the power supply voltage V1 supplied from the auxiliary winding P2 is equal to or smaller than a predetermined voltage value and is used to supply the power supply voltage V1 at start-up of the switching power supply circuit 100.

(Feedback Unit)

The feedback unit 115 is used to control the power supply voltage Vout at a predetermined voltage (hereinafter, "target voltage") and outputs a signal according to the power supply voltage Vout. The power supply voltage Vout is set by a dividing ratio of the voltage (i.e. reference voltage) input to the reference terminal REF of the shunt regulator IC5 to the power supply voltage Vout. More specifically, the power supply voltage Vout is set by the dividing resistances R52, R53 and R54. When the power supply voltage Vout becomes higher than the target voltage (24V or 5V), the cathode terminal K of the shunt regulator IC5 draws in the current, and the secondary side diode of the photocoupler PC5 enters the conductive state through the pull-up resistance R51. As a result, the primary side transistor of the photocoupler PC5 is operated, and the charge is discharged from the capacitor C6. Therefore, the voltage of the FB terminal (hereinafter, "FB terminal voltage") of the control unit 101 decreases. On the other hand, when the power supply voltage Vout becomes lower than the target voltage, the cathode terminal K of the shunt regulator IC5 does not draw in the current, and the secondary side diode enters the non-conductive state. As a result, the transistor on the primary side of the photocoupler PC5 is turned off, and the charge current flows from the power supply voltage V2 to the capacitor C6 through the resistance R2. Therefore, the FB terminal voltage of the control unit 101 increases.

The FB terminal voltage equivalent to the signal according to the power supply voltage Vout is input from the feedback unit 115, and the control unit 101 detects the FB terminal voltage to perform the feedback control for controlling the power supply voltage Vout at the target voltage. In this way, the control unit 101 can monitor the FB terminal voltage to indirectly perform the feedback control of the voltage of the power supply voltage Vout. The control unit 101 may be provided on the secondary side in place of the feedback unit 115, and the voltage of the power supply voltage Vout may be monitored to directly perform the feedback control of the voltage of the power supply voltage Vout.

(Target Voltage Switching Unit)

In a target voltage switching unit (hereinafter, "switching unit") 117, a 24VSL signal is input to a control terminal of an FET71. The 24VSL signal is switched to switch two states, a first state in which a 5V voltage that is a first voltage is output to a power supply voltage Vout and a second state in which a 24V voltage that is a second voltage higher than the first voltage is output. The 24VSL signal output from a control unit or the like of an electronic device including the switching power supply circuit 100 is input to the switching unit 117. Specifically, the switching unit 117 switches the state to the second state to output the 24V voltage as the power supply voltage Vout in the case where the 24VSL signal is in the high level. The switching unit 117 switches the state to the first state to output the 5V voltage as the power supply voltage Vout in the case where the 24VSL signal is in the low level. The 24VSL signal is input to a gate terminal of the FET71. The power supply voltage Vout is connected to a drain terminal of the FET71 through a photodiode of a photocoupler PC7 and a resistance R71, and a source terminal is grounded. A resistance R72 is connected between the gate terminal and the source terminal of the FET71.

When the 24VSL signal becomes the high level, the FET71 is turned on, and a secondary side diode of the photocoupler PC7 enters the conductive state through the resistance R71. As a result, a primary side transistor of the photocoupler PC7 is operated, and charge is discharged from a capacitor C7. The voltage of a 24SL terminal (hereinafter, "24SL terminal voltage") of the control unit 101 becomes a low level. On the other hand, when the 24VSL signal becomes the low level, the FET71 is turned off, and the secondary side diode of the photocoupler PC7 enters the non-conductive state. As a result, the primary side transistor of the photocoupler PC7 is turned off, and the capacitor C7 is charged from the power supply voltage V2 through the resistance R1. The voltage of the 24SL terminal of the control unit 101 becomes the high level. The control unit 101 detects whether the target voltage is 24V or 5V according to the 24SL terminal voltage. In the present embodiment, the target voltage is 24V when the load of the switching power supply circuit 100 supplying the power supply voltage Vout is operated in the normal state. On the other hand, when the load is operated in the stand-by state or the sleep state, the target voltage is 5V to reduce the power consumption compared to the power consumption in the normal operation.

The 24VSL signal is input to the switching unit 117 and is also input to the feedback unit 115. The FET51 is connected in parallel to the resistance R54 of the feedback unit 115. The 24VSL signal is input to the gate terminal of the FET51, and the resistance R55 is connected between the gate terminal and the source terminal. When the 24VSL signal becomes the high level, the FET51 is turned on, and the resistance R54 is short-circuited. As a result, the dividing ratio of the reference voltage of the shunt regulator IC5 to the power supply voltage Vout decreases, and the feedback control is performed while 24V is output to the power supply voltage Vout. On the other hand, when the 24VSL signal becomes the low level, the FET51 is turned off, and the resistance R53 and the resistance R54 are connected in series. As a result, the dividing ratio of the reference voltage to the power supply voltage Vout increases, and the feedback control is performed while 5V is output to the power supply voltage Vout.

(Input Voltage Detection Unit)

An input voltage detection unit 113 inputs a voltage obtained by dividing the power supply voltage V1 by resistances R61 and R62 to a V1SN terminal of the control unit 101. As a result, the control unit 101 can detect the voltage of the input voltage Vin.

[Operation of Switching Power Supply Circuit]

Figure 9A:
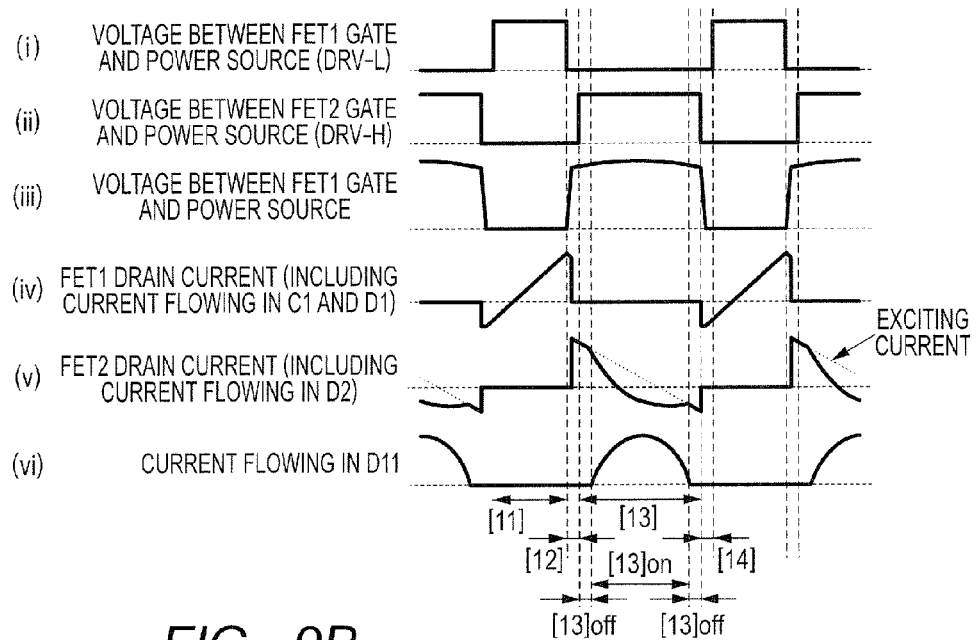
FIGS. 9A and 9B illustrate operation waveforms of the switching power supply and simple circuit diagrams according to fourth and fifth embodiments.
Figure 9B:
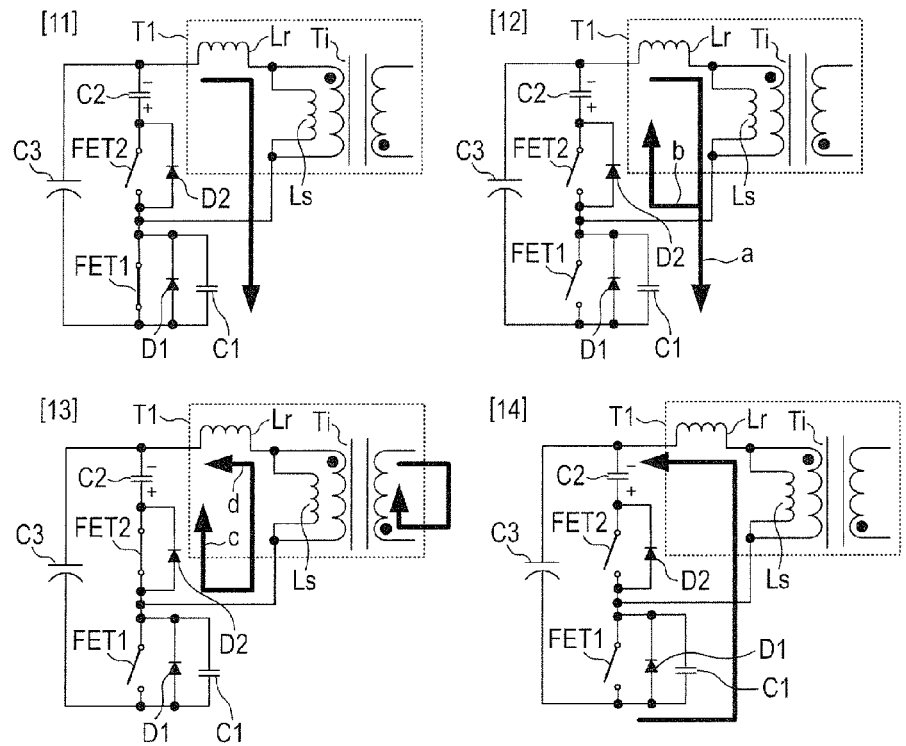

Operation of the switching power supply circuit 100 according to the present embodiment will be described with reference to FIGS. 9A and 9B. The control unit 101 alternately turns on and off the FET1 and the FET2 through dead times so that the FET1 and the FET2 are not turned on at the same time, and in this way, the switching power supply circuit 100 supplies power to the secondary side. FIG. 9A is a graph sorting and illustrating voltages of terminals and current waveforms of the FET1 and the FET2 in a plurality of periods ([I1] to [I4]). In FIG. 9A, (i) is a diagram illustrating the voltage between the gate and the source of the FET1, i.e. the gate drive signal DRV-L input from the FET driving unit 102 to the gate terminal of the FET1. A diagram (ii) illustrates the voltage between the gate and the source of the FET2, i.e. the gate drive signal DRV-H input from the FET driving unit 102 to the gate terminal of the FET2. A diagram (iii) illustrates the voltage between the drain and the source of the FET1. A diagram (iv) illustrates the drain current of the FET1. A diagram (v) illustrates the drain current of the FET2. A diagram (vi) illustrates the current flowing in the diode D11. The FET1 drain current includes the current flowing in the diode D1 and the capacitor C1. The FET2 drain current includes the current flowing in the diode D2. The horizontal axis denotes time. FIG. 9B illustrates, along with simple circuit diagrams, flows of current in the plurality of periods ([I1] to [I4]) illustrated in FIG. 9A. Operation of each period will be described below. In FIG. 9B, the transformer T1 is divided into the leakage inductance Lr, the coupling inductance Ls and the ideal transformer T1. A thick solid line arrow in the circuit of FIG. 9B indicates the current flowing in each period.

In the period [I1], the FET1 is turned on. The current flows from the smoothing capacitor C3 to the primary winding P1 of the transformer T1, and energy is stored in the leakage inductance Lr and the exciting inductance Ls of the transformer T1. In this case, the voltage between the drain and the source of the FET1 is substantially zero, and the drain current flowing in the FET1 linearly increases.

The period [I2] is a period in which both of the FET1 and the FET2 are turned off, i.e. the dead time. When the FET1 is turned off, the current flowing in the primary winding P1 of the transformer T1 flows and charges the voltage resonance capacitor C1 (arrow a in [I2]). As the voltage resonance capacitor C1 is charged, the voltage between the drain and the source of the FET1 increases.

When the voltage between the drain and the source of the FET1 exceeds the voltage of the + terminal of the voltage clamp capacitor C2, the current flowing in the primary winding P1 of the transformer T1 starts to flow as follows. The current starts to flow and charge the voltage clamp capacitor C2 through the diode D2 of the FET2 (arrow b in [I2]). As a result, the kickback voltage of the leakage inductance Lr is absorbed by the voltage clamp capacitor C2, and the surge voltage applied to between the drain and the source of the FET1 can be reduced. The voltage between the drain and the source of the FET2 is substantially zero. Therefore, the FET2 can be turned on by making a transition to the period [I3] in this state, and switching of the FET2 with zero voltage can be realized.

The period [I2] (dead time) can be set to a period substantially equivalent to or slightly longer than the time that the voltage between the drain and the source of the FET2 becomes substantially zero after the FET1 is turned off. If the period [I2] is long, the period that the current flows in the diode D2 becomes long, and this leads to consumption of unnecessary power. On the other hand, if the period [I2] is short, the FET2 is turned on before the voltage between the drain and the source of the FET2 becomes zero. Therefore, switching with zero voltage cannot be realized, and unnecessary power is similarly consumed. Thus, the period [I2] can be set to an appropriate value to reduce the power consumption.

The period [I3] is a period in which the FET1 is turned off, and the FET2 is turned on after the dead time. The + terminal side of the voltage clamp capacitor C2 is charged by the current flowing while the FET1 is turned on, from the transformer T1 and through the FET2 or the diode D2 (arrow c in [13]). The kickback voltage of the leakage inductance Lr can be absorbed by the voltage clamp capacitor C2, and the surge voltage applied to between the drain terminal and the source terminal of the FET1 can be reduced. When the voltage of the voltage clamp capacitor C2 increases, the diode D11 on the secondary side is turned on, and the power is supplied to the secondary side of the switching power supply circuit 100 through the secondary winding S1 of the transformer T1.

Subsequently, in the period [13], the current flows from the + terminal side of the capacitor C2 to the transformer T1 through the FET2 (arrow d in [13]). The current flowing in the transformer T1 flows due to the resonance of the voltage clamp capacitor C2 and the leakage inductance Lr and the coupling inductance Ls of the transformer T1. When the voltage of the voltage clamp capacitor C2 decreases, the diode D11 on the secondary side enters the non-conductive state, and the power is not supplied to the secondary side of the switching power supply circuit 100. The conductive state of the FET2 is maintained, and the current flowing from the voltage clamp capacitor C2 to the leakage inductance Lr and the coupling inductance Ls of the transformer T1 increases.

In the FET2 drain current in (v) of FIG. 9A, a waveform illustrated by a dotted line indicates an exciting current flowing in the exciting inductance Ls of the transformer T, and the current linearly decreases. A sum of the exciting current and the current flowing in the ideal transformer Ti is the FET2 drain current. The current flowing in the ideal transformer Ti has a shape similar to the current flowing in the diode D11.

In the period [13], the current flows as follows in periods (periods written as "[13]off" in FIG. 9A) in which the power is not supplied to the secondary side. More specifically, the current flows in the FET2 mainly according to the resonance operation of the voltage clamp capacitor C2 and the leakage inductance Lr and the exciting inductance Ls of the transformer T1. Meanwhile, the current flows as follows in a period (period written as "[13]on" in FIG. 9A) in which the power is supplied to the secondary side. More specifically, the current flows in the FET2 mainly according to the resonance operation of the voltage clamp capacitor C2 and the leakage inductance Lr of the transformer T1. The inductance value of the leakage inductance Lr is significantly smaller than that of the exciting inductance Ls, and the resonance frequency in the period "[13]on" is higher than the resonance frequency in the period "[13]off".

When the exciting current flowing in the exciting inductance Ls of the transformer T becomes zero, the energy stored in the exciting inductance Ls is all released. When the FET2 is kept turned on, the current starts to flow from the voltage clamp capacitor C2 to the exciting inductance Ls, and the exciting inductance Ls starts storing energy again.

The period [14] is a period in which both of the FET1 and the FET2 are turned off again, i.e. the dead time. When the FET2 is turned off, the current flowing in the primary winding P1 of the transformer T1 flows so as to discharge the voltage resonance capacitor C1. As the voltage resonance capacitor C1 is discharged, the voltage between the drain and the source of the FET1 decreases. When the voltage between the drain and the source of the FET1 falls below zero, the current flowing in the primary winding P1 of the transformer T1 is regenerated in the smoothing capacitor C3 through the diode D1. When the FET1 is turned on by returning to the period [11] in this state, switching of the FET1 with zero voltage can be realized. In the period [14], as in the period [12], the period [14] can be set to a period substantially equivalent to or slightly longer than the time that the voltage between the drain and the source of the FET1 becomes substantially zero after the FET2 is turned off, and the power consumption can be reduced.

As described, the flyback power supply using the active clamp system that is the switching power supply according to the present embodiment can reduce the surge voltage of the leakage inductance Lr by repeating the periods from [11] to [14]. The power can be supplied to the secondary side while switching the FET1 and the FET2 with zero voltage. The period for performing the switching operation in which the FET1 and the FET2 are repeatedly turned on or off will be called a switching period, and the operation in which the switching period continues will be called continuous operation. The period in which the switching operation is halted will be called a switching halt period.

[Intermittent Operation]

Intermittent operation of the switching power supply circuit 100 in which the control unit 101 repeatedly controls the switching period and the switching halt period will be described. FIG. 10A is a diagram illustrating waveforms during the continuous operation of the switching power supply circuit 100, and FIG. 10B is a diagram illustrating waveforms during the intermittent operation of the switching power supply circuit 100. In FIGS. 10A and 10B, (i) indicates the voltage of the diode D1 of the FET1, i.e. the FET1 gate driving voltage DRV-L, and (ii) indicates the voltage of the diode D2 of the FET2, i.e. the FET2 gate driving voltage DRV-H. In FIGS. 10A and 10B, (iii) indicates the FET1 drain current, and (iv) indicates the voltage between the drain terminal and the source terminal of the FET1. In FIGS. 10A and 10B, (v) indicates the FB terminal voltage of the control unit 101, and dotted lines indicate the FBL1 and the FBL2 described later. The horizontal axis denotes time.

In the low load state of the switching power supply circuit 100, the following problem occurs if the control of the switching power supply circuit 100 is continued in the switching period as illustrated in FIG. 10A. For example, the efficiency of the switching power supply circuit 100 decreases due to a resistance loss caused by the current on the primary side of the switching power supply circuit 100 or due to a switching loss of the FET1 and the FET2. Therefore, as illustrated in FIG. 10B, the intermittent operation for repeating the switching period and the switching halt period described later is performed in the low load state of the switching power supply circuit 100. As a result, the current on the primary side of the switching power supply circuit 100 or the number of times that the FET1 and the FET2 are switched can be reduced to improve the power efficiency of the switching power supply circuit 100 in the low load state.

The control unit 101 of the switching power supply circuit 100 detects the low load state of the switching power supply circuit 100 based on the feedback information (FB terminal voltage) or the like of the feedback unit 115. When the control unit 101 detects the low load state, the control 101 performs before-halt control described later and then makes a transition to the switching halt period. In the present embodiment, when the control unit 101 detects that the FB terminal voltage becomes lower than the voltage FBL1, the control unit 101 determines that the switching power supply circuit 100 is switched to the low load state. When the control unit 101 determines that the switching power supply circuit 100 is switched to the low load state, the control unit 101 makes a transition to the switching halt period. After the transition to the switching halt period, the control unit 101 makes a transition to the switching period again when both of the following two conditions are satisfied. One of the two conditions is that the FB terminal voltage becomes greater than the voltage FBL2, and the other is that the switching halt period becomes longer than the predetermined minimum halt period Tmin stored in a storage unit not illustrated included in the control unit 101. When the FB terminal voltage becomes greater than the voltage FBL2, and the switching halt period becomes longer than the minimum halt period Tmin, the control unit 101 performs after-halt control described later and then makes a transition to the switching period. The time from the start of the after-halt control to the end of the switching halt period through the switching period and the period of the before-halt control is an intermittent operation period.

In the switching power supply circuit 100 of the present embodiment, the voltage FBL2 is set to a voltage higher than the voltage FBL1. The voltage FBL2 is a voltage used in the determination for making a transition from the switching halt period to the switching period, and the voltage FBL1 is a voltage used in the determination for making a transition from the switching period to the switching halt period. In this way, the overshoot and the undershoot of the FB terminal voltage are used to realize the intermittent operation illustrated in FIG. 10B. In the intermittent operation illustrated in FIG. 10B, the control unit 101 uses an embedded timer not illustrated to perform the control to prevent the switching halt period from becoming shorter than the predetermined minimum halt period Tmin stored in the storage unit of the control unit 101. Operation sound caused by a high frequency generated from the transformer T1 of the switching power supply circuit 100 during the intermittent operation is reduced by preventing the intermittent operation period illustrated in FIG. 10B from becoming too short. The minimum halt period Tmin may be controlled by making the minimum halt period Tmin variable so that the intermittent operation period becomes a constant period. In the high load state of the switching power supply circuit 100, the FB terminal voltage of the control unit 101 is maintained at a high level. In other word, the state that the FB terminal voltage of the control unit 101 is higher than the voltage FBL2 is maintained. Therefore, the state does not become the intermittent operation state illustrated in FIG. 10B. The control can be continued in the switching period illustrated in FIG. 10A, and the state can be the continuous operation state of the switching power supply circuit 100.

[Before-Halt Control]

The before-halt control in the intermittent operation period of FIG. 10B will be described. The before-halt control is started at the timing of the end of the turn-on condition of the FET1 after the FB terminal voltage of the control unit 101 falls below the voltage FBL1 (FB<FBL1). The power efficiency can be improved by performing the before-halt control. The period of the before-halt control is a period from the turn-off of the FET1 to the turn-off of the FET2, and the period of the before-halt control includes the FET2 turn-on time [4]. The FET2 turn-on time [4] in the period of the before-halt control is set to a half of the FET2 turn-on time (sum of [1] and [2]) of the switching period. In the period of the before-halt control, the FET2 is turned off before the switch from the state of c in [13] of FIG. 9A to the state of d in [13] after the FET2 is turned on, or in other words, before the timing of the switch in the direction of the resonance current. This is for reducing as much as possible the time that the resonance current of the transformer T1 and the voltage clamp capacitor C2 is applied only by the diode D2.

In the present embodiment, the noise may increase while the FET2 is turned off if the current flows from the + terminal side of the voltage clamp capacitor C2 to the transformer T1 ([2] (period of d of [13] in FIG. 9A)). Therefore, the FET2 turn-on time [4] is set to a time slightly shorter than the optimal time.

[After-Halt Control]

The after-halt control in the intermittent operation period of FIG. 10B will be described. The after-halt control is started when the FB terminal voltage of the control unit 101 exceeds the voltage FBL2 (FB>FBL2), and the switching halt period becomes longer than the minimum halt time Tmin. The power efficiency can be improved by performing the after-halt control. The optimal value of the FET2 turn-on time [8] in the after-halt control is set to a time further shorter than the FET2 turn-on time illustrated in [4] of FIG. 10B. The magnetic reset of the transformer T1 is finished during the switching halt period. Therefore, the FET2 turn-on time [8] of the after-halt control illustrated in FIG. 10B may be a time shorter than the turn-on time of [2] in the switching period. Even if the setting is performed in this way, the energy necessary to move the charge of the voltage resonance capacitor C1 in the period [9] can be supplied from the voltage clamp capacitor C2 to the transformer T1.

However, even if the FET2 turn-on time [4] in the before-halt control and the FET2 turn-on time [8] in the after-halt control are longer than the optimal values, the power efficiency of the switching power supply circuit 100 in the low load state can be improved in the following case. More specifically, the power efficiency during the low load can be improved when the transition to the intermittent operation described in FIG. 10B is made, compared to when the continuous operation of FIG. 10A is continued. When the FET2 turn-on times ([4] and [8]) are shorter than the optimal values, the effect of improving the power efficiency by the before-halt control and the after-halt control is smaller than the effect in the case where the FET2 turn-on times are the optimal times. However, although the effect is reduced, the power efficiency of the switching power supply circuit 100 in the low load state can be improved.

Therefore, the effect of improving the power efficiency of the switching power supply circuit 100 in the low load state can be obtained even when the FET2 turn-on times ([4] and [8]) in the before-halt control and the after-halt control are longer or shorter than the optimal times. Thus, the configuration of the present embodiment does not limit the FET2 turn-on times in the before-halt control and the after-halt control only to the optimal turn-on times.

[Control Method of Power Supply Voltage Vout]

A control method of the power supply voltage Vout that is an output voltage on the secondary side will be described. In the switching power supply circuit 100 of the present embodiment, the power supply voltage Vout is roughly expressed by the following Expression (1).

Here, TIME1 is a FET1 turn-on time and is the period [11] in FIG. 9B. TIME2 is a FET2 turn-on time and is the period [13] in FIG. 9B. Nr is a ratio of the number of turns Np1 of the primary winding P1 of the transformer T1 and the number of turns Ns1 of the secondary winding S1 (Np1/Ns1).

According to Expression (1), it can be understood that the power supply voltage Vout is determined by the ratio of TIME1 and TIME2 and the input voltage Vin. Therefore, one or both of TIME1 and TIME2 can be changed to control the ratio of TIME1 and TIME2 to control the power supply voltage Vout at a constant voltage by taking into account the input voltage Vin.

According to Expression (1), it can also be understood that the power supply voltage Vout is determined only by TIME1 and TIME2, regardless of the load on the secondary side. However, when the load actually increases, the drop in the voltage caused by the diode D11 increases, and the power supply voltage Vout decreases. The increase in the load decreases the voltage of the input voltage Vin and increases the voltage between the drain and the source caused by the FET1 turn-on resistance. The voltage applied to the exciting inductance Ls of the transformer T1 decreases in the period [11] of FIG. 9B, and the power supply voltage Vout decreases as well. Therefore, the power supply voltage Vout is actually affected by the load on the secondary side in some level, in spite of Expression (1). As a result, the load state can be estimated from the input voltage Vin and the ratio of TIME1 and TIME2. That is, the FB terminal voltage of the control unit 101 can be monitored to figure out the load state.

According to Expression (1), it can be understood that the power supply voltage Vout is not changed by increasing or decreasing the switching frequency while maintaining the ratio of TIME1 and TIME2. Therefore, the frequency suitable for the use can be selected to control the power supply voltage Vout at the target voltage. However, for the reason described below, the switching frequency also needs to be controlled to reduce as much as possible the power consumption in the switching power supply circuit 100.

[Relationship Between Exciting Inductance Ls and Load]

Figure 11A:
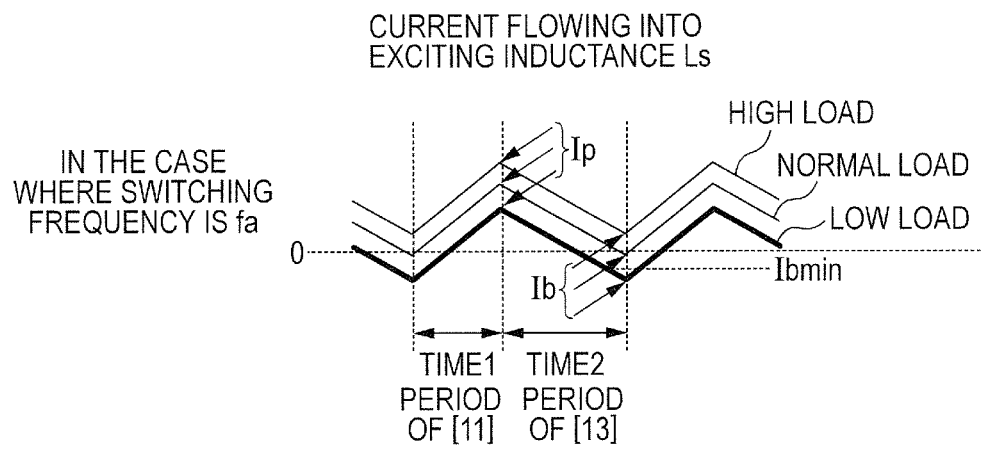
FIGS. 11A and 11B are diagrams describing a current flowing in an exciting inductance according to the fourth and fifth embodiments.
Figure 11B:
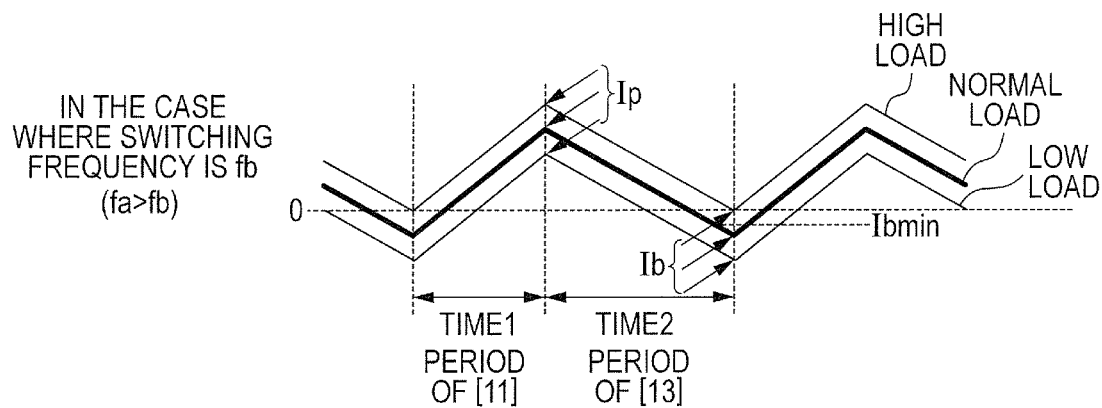

FIGS. 11A and 11B illustrate that the current flowing in the exciting inductance Ls of the transformer T1 changes according to the load when the ratio of TIME1 and TIME2 is constant. FIG. 11A illustrates a case in which the switching frequency is fa, and FIG. 11B illustrates a case in which the switching frequency is fb. The switching frequency fb of FIG. 11B is smaller than the switching frequency fa of FIG. 11A (fa>fb). FIGS. 11A and 11B illustrate currents flowing in the exciting inductance Ls during the normal load, during the low load and during the high load. Maximum values of the current flowing in the exciting inductance Ls are peak currents Ip, and minimum values are bottom currents Ib.

The energy stored in the exciting inductance Ls in the period [13] of FIGS. 9A and 9B is used to discharge the charge of the voltage resonance capacitor C1 in the period [14], and the current flowing in this case is the bottom current Ib. Therefore, the bottom current Ib has a minimum value required for discharging the charge of the voltage resonance capacitor C1. The value is a negative value, and the value will be called Ibmin. If the bottom current Ib exceeds the minimum required value Ibmin, the FET1 cannot be switched with zero voltage, and the power consumption in the switching power supply circuit 100 increases.

For example, in the case of the switching frequency fa of FIG. 11A, the bottom current Ib satisfies a relationship of Ib<Ibmin when the load is a low load, and the FET1 can perform the switching with zero voltage. However, the bottom current Ib is in a relationship of Ib>Ibmin in FIG. 11A when the load is a normal load or a high load, and the FET1 cannot perform the switching with zero voltage. In such a case, control is performed to lower the switching frequency so that the bottom current Ib satisfies the relationship of Ib<Ibmin. For example, if the switching frequency is lowered from fa to fb in the normal load, the bottom current Ib satisfies the relationship of Ib<Ibmin as illustrated in FIG. 11B, and the FET1 can perform the switching with zero voltage. Conversely, if the switching frequency is lowered from fa to fb when the load is a low load, the bottom current Ib during the low load falls much lower than Ibmin as in FIG. 11B. If the bottom current Ib falls much lower than Ibmin, the energy stored in the exciting inductance Ls is not transmitted to the secondary side, and the energy returns to the smoothing capacitor C3. In this case, the power consumption in the switching power supply circuit 100 also increases.

Therefore, to improve the conversion efficiency of the power of the switching power supply circuit 100, the switching frequency needs to be changed according to the load fluctuation so that the bottom current Ib of the exciting inductance Ls becomes an appropriate value. Under the same load, the smaller the target voltage, the greater the time TIME2 that the FET2 is turned on, and the lower the switching frequency. In summary, TIME1 and TIME2 can be controlled at optimal values based on the FB terminal voltage of the control unit 101 to control the power supply voltage Vout at a constant voltage while reducing the power consumption for a wide range of load.

[Control Method of TIME1 and TIME2 According to Target Voltage]

A control method of TIME1 and TIME2 according to the target voltage that is a characteristic configuration of the present embodiment will be described with reference to FIG. 12. FIG. 12 illustrates an example of a table of TIME1, TIME2 and a ratio of TIME1 and TIME2 (TIME1/TIME2) corresponding to the FB terminal voltage of the control unit 101 for each input voltage Vin in the case where the target voltage is 24V. FIG. 13 is a table similar to FIG. 12 and is a table in the case where the target voltage is 5V. Specifically, values in the case of 51 dec that is the V1SN terminal voltage equivalent to AC power supply voltage of 225V and values in the case of 48 dec that is the V1Sn terminal voltage equivalent to AC power supply voltage of 215V are illustrated for each target voltage. TIME1 is determined inversely proportional to the AC power supply voltage. More specifically, TIME1 is set to a shorter time for a higher AC power supply voltage. On the other hand, the output voltage of the secondary side is controlled at a constant voltage, and TIME2 is constant regardless of the AC power supply voltage.

Figure 14A:
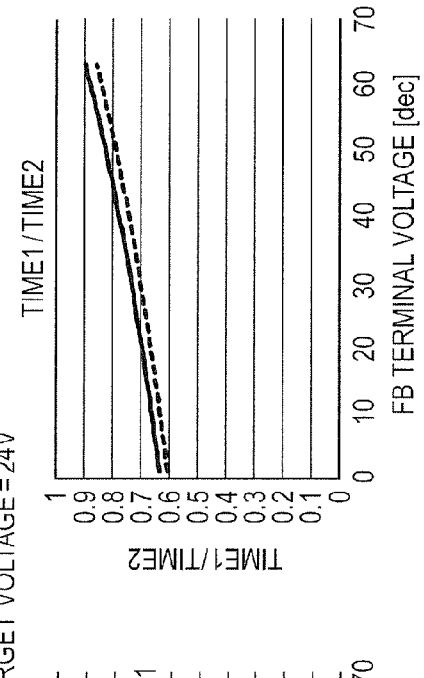
FIGS. 14A, 14B, 14C and 14D are graphs illustrating a relationship between the FB terminal voltages and each FET turn-on time according to the fourth embodiment.
Figure 14B:
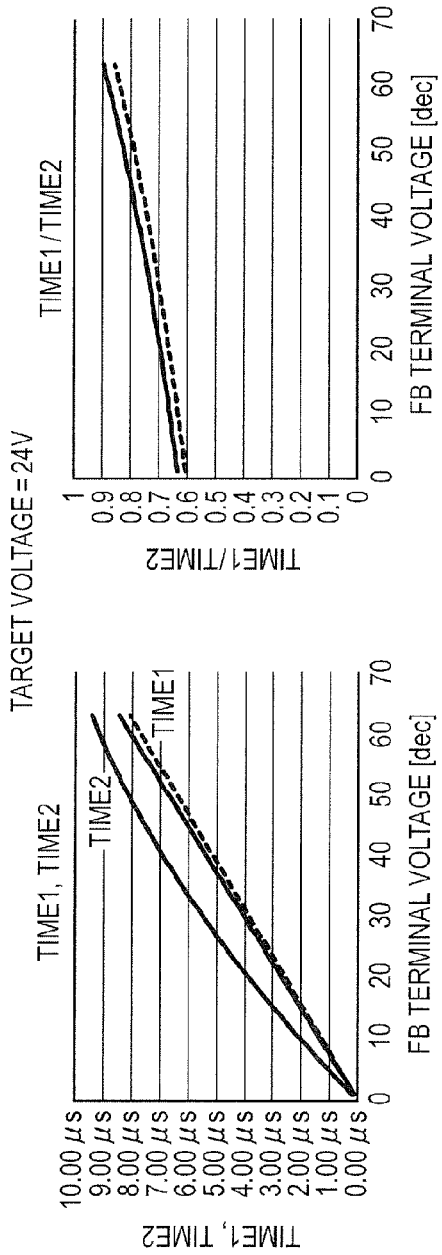
Figure 14C:
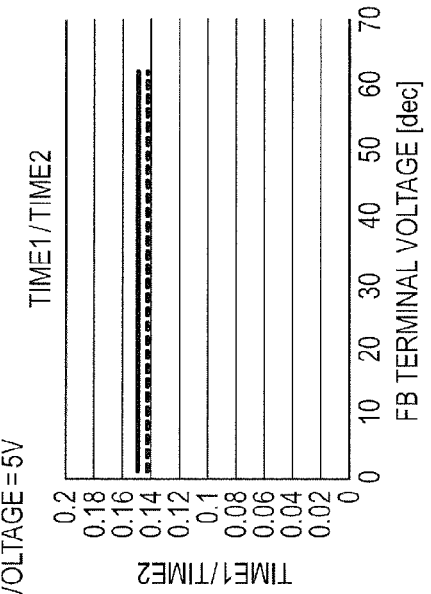
Figure 14D:
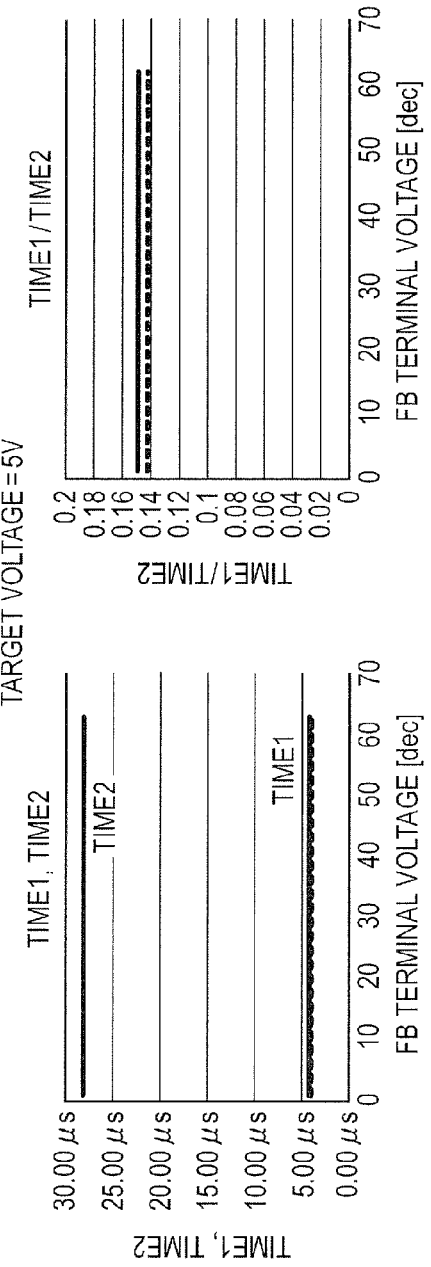

FIGS. 14A to 14D illustrate graphs of FIGS. 12 and 13. The vertical axis of FIG. 14A illustrates the time (μs) of TIME1 and TIME2 in the case where the target voltage is 24V. The vertical axis of FIG. 14B illustrates the ratio of TIME1 and TIME2 (TIME1/TIME2) in the case where the target voltage is 24V, and the horizontal axis illustrates the FB terminal voltage [dec]. The vertical axis of FIG. 14C illustrates the time (μs) of TIME1 and TIME2 in the case where the target voltage is 5V, and the vertical axis of FIG. 14D illustrates the ratio of TIME1 and TIME2 (TIME1/TIME2) in the case where the target voltage is 5V.

As described, the FB terminal voltage is information used to indirectly detect the power supply voltage Vout and to figure out the load state on the secondary side. The V1SN terminal and the FB terminal of the control unit 101 are connected to an internal analog and digital (hereinafter, "AD") converter not illustrated. The AD converter performs AD conversion of the voltage input to the V1SN terminal and the FB terminal of the control unit 101. The V1SN terminal voltage and the FB terminal voltage in FIG. 12 are displayed in decimal numbers [dec] with 6-bit digital values.

When the target value is 24V, TIME1 and TIME2 are set so that the load increases with an increase in the FB terminal voltage. Specifically, TIME1 and TIME2 are set so that both of TIME1 and TIME2 increase with an increase in the FB terminal voltage as illustrated in FIG. 14A. TIME1 and TIME2 are set so that the ratio of TIME1 and TIME2 (TIME1/TIME2) also increases with an increase in the FB terminal voltage as illustrated in FIG. 14B.

On the other hand, when the target value is 5V, TIME1 and TIME2 are set to perform the operation of intermittently turning on and off the FET1 and the FET2, i.e. the intermittent operation, to reduce the power loss in the switching power supply circuit 100. The intermittent operation can be mandatorily performed by setting TIME1 and TIME2 so that the ratio of TIME1 and TIME2 (TIME1/TIME2) is sufficiently large with respect to the target voltage. This means that the output voltage Vout (=TIME1/TIME2×Vin/Nr) is set to, for example, 6V in the continuous operation, and the output voltage Vout is adjusted to 5V in the intermittent operation. In the present embodiment, when the target voltage is 5V, TIME1 and TIME2 are set so that both of TIME1 and TIME2 are constant values regardless of the FB terminal voltage as illustrated in FIG. 14C. Therefore, the ratio of TIME1 and TIME2 (TIME1/TIME2) is also a constant value regardless of the FB terminal voltage as illustrated in FIG. 14D. When the target voltage is 24V, there is at least one FB terminal voltage in which the FET1 turn-on time is longer, the FET2 turn-on time is shorter, and the period for alternately turning on and off the FET1 and the FET2 is shorter, compared to the case where the target voltage is 5V. For example, in the graphs of FIGS. 14A to 14D, TIME1 and TIME2 satisfy such a relationship after the FB terminal voltage is about 40 dec.

In the cases where the target voltage is 24V and 5V, the tables to be used are changed according to the V1SN terminal voltage in order to take into account the influence of the input voltage Vin. FIGS. 12 and 13 describe tables and graphs in the case where the V1SN terminal voltage is 51 dec (equivalent to 225V as the voltage of the AC power supply 10) and in the case where the V1SN terminal voltage is 48 dec (equivalent to 215V as the voltage of the AC power supply 10). In FIGS. 14A to 14D, solid lines illustrate the case where the V1SN terminal voltage is 48 dec, and dashed lines illustrate the case where the V1SN terminal voltage is 51 dec. Comparing the tables, TIME2 does not depend on the V1SN terminal voltage (solid lines and dashed lines overlap), and only TIME1 depends on the V1SN terminal voltage. As can be understood in FIGS. 14A and 14C, the larger the V1SN terminal voltage, the shorter TIME1. TIME1 and the V1SN terminal voltage are inversely proportional. As can be understood in FIGS. 14B and 14D, the larger the V1SN terminal voltage, the smaller the ratio of TIME1 and TIME2 (TIME1/TIME2). The ratio of TIME1 and TIME2 and the V1SN terminal voltage are inversely proportional.

In the present embodiment, the load fluctuation is greater in the case where the target voltage is 24V than in the case where the target voltage is 5V. Therefore, followability of the power supply voltage Vout for the load fluctuation is requested more than the reduction of the power loss in the switching power supply circuit 100 in the case where the target voltage is 24V. Thus, the control unit 101 controls the FET1 turn-on time TIME1 and the FET2 turn-on time TIME2 as in FIG. 12 so that the switching power supply circuit 100 performs the continuous operation in the case where the target voltage is 24V in the present embodiment. On the other hand, when the target voltage is 5V, the reduction of the power loss in the switching power supply circuit 100 is highly requested, because the switching power supply circuit 100 is continuously used for a long time. Therefore, the control unit 101 controls the FET1 turn-on time TIME1 and the FET2 turn-on time TIME2 as in FIG. 13 so that the switching power supply circuit 100 performs the intermittent operation in the case where the target voltage is 5V in the present embodiment. Although the continuous operation is performed in the case where the target voltage is 24V in the present embodiment, the continuous operation and the intermittent operation may be performed in the case where the target voltage is 24V. In this case, the control unit 101 may perform the intermittent operation when the FB terminal voltage is lower than a predetermined level and may perform the continuous operation when the FB terminal voltage is equal to or higher than the predetermined level, for example.

In this way, a CPU is used as the control unit 101 to control the FET1 and FET2 turn-on times at appropriate values according to the target voltage. As a result, a switching power supply that can flexibly handle specifications necessary for each target voltage can be realized even when a plurality of target voltages is provided. An example of a conventional method of controlling the switching operation of the FET1 and the FET2 for outputting the target voltage includes a method of changing an on-duty while maintaining a constant switching frequency by PWM control. Another example of the control method includes a method of fixing the turn-off time and the FET2 turn-on time and changing the FET1 turn-on time to change the switching frequency. In the control of the FET1 and the FET2 of the present embodiment, the FET1 and FET2 turn-on times are set according to the FB terminal voltage, and the switching frequency is also changed to output the target voltage, as compared to the conventional control.

According to the present embodiment, the power supply apparatus that can output a plurality of voltages can flexible handle specifications required for each voltage.

Fifth Embodiment

[Power Supply Apparatus]

Figure 15:
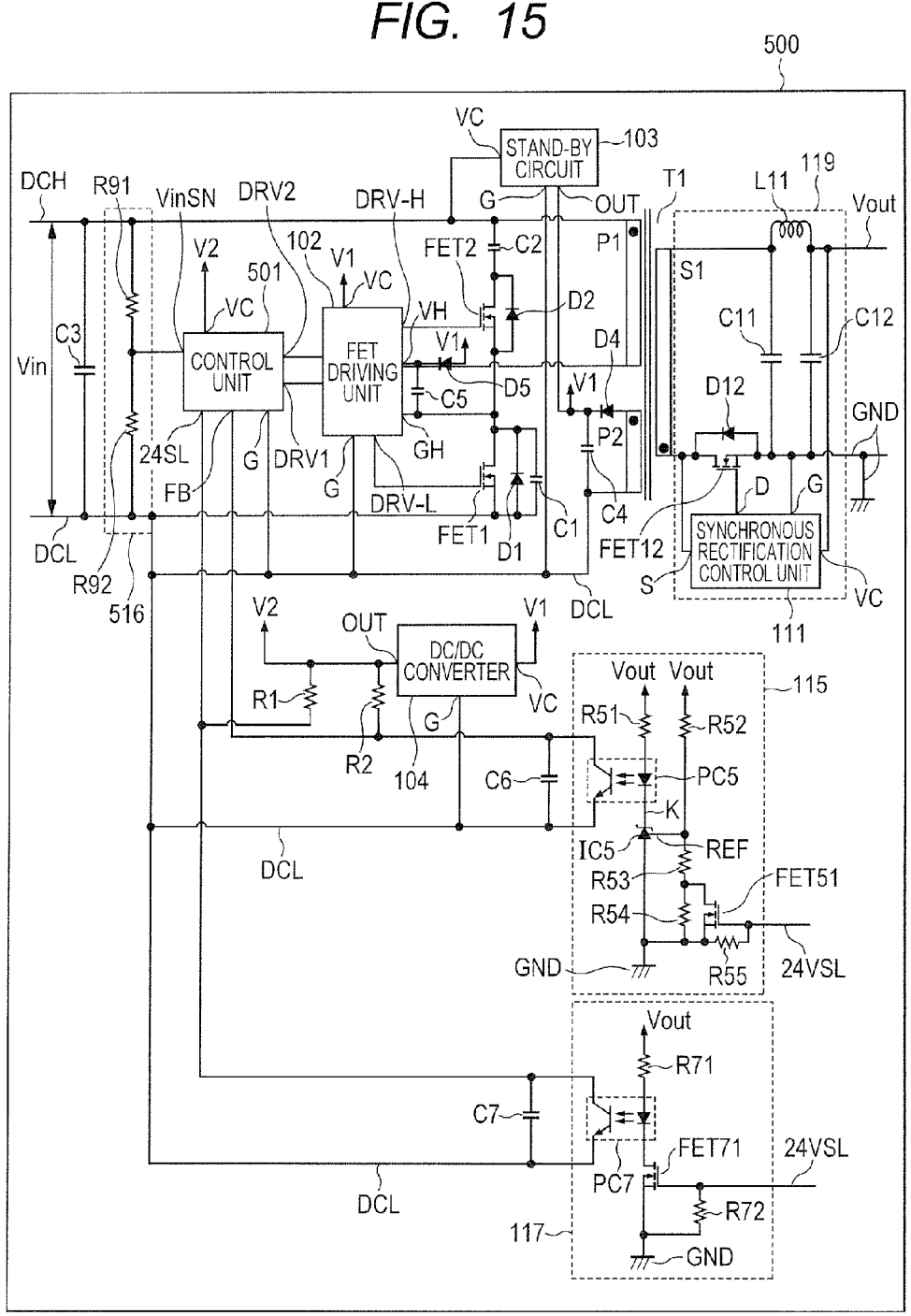
FIG. 15 is a circuit diagram of a switching power supply according to the fifth embodiment.

A fifth embodiment will be described. For a switching power supply in the present embodiment, the same reference signs are provided to the same components as the components described in the fourth embodiment, and the description will not be repeated. FIG. 15 illustrates a switching power supply circuit 500 that is a circuit of the power supply apparatus according to the present embodiment. The switching power supply circuit 500 has four states, a driving state that is a state in which the load is normal, a stand-by state that is a state in which the load is low, a sleep state in which the load is low and the load fluctuation is small, and a deep sleep state in which the load is further lower. The target voltage in the driving state and the stand-by state is 24V, and the target voltage in the sleep state and the deep sleep state is 5V. The control unit 101 makes a transition from the continuous operation to the intermittent operation when the FET1 turn-on time becomes equal to or smaller than a predetermined time. In the present embodiment, a predetermined time that is the FET1 turn-on time serving as a threshold for the transition from the continuous operation to the intermittent operation is a time that varies between the case where the target voltage is 5V and the case where the target voltage is 24V. The FET1 turn-on time during the continuous operation changes according to the FB terminal voltage. Therefore, whether to make a transition from the continuous operation to the intermittent operation is determined based on the value of the FB terminal voltage equivalent to the predetermined time in the present embodiment.

A control unit 501 as a control unit determines that the state is one of the driving state and the stand-by state and sets the target voltage to 24V when a 24SL terminal of the control unit 501 is in a high level (target voltage is 24V). The control unit 501 determines that the state is the stand-by state if the FB terminal voltage of the control unit 501 is equal to or smaller than 20 dec and determines that the state is the driving state if the FB terminal voltage is equal to or greater than 21 dec. The control unit 501 determines that the state is one of the sleep state and the deep sleep state and sets the target voltage to 5V when the 24SL terminal is in a low level (target voltage is 5V). The control unit 501 determines that the state is the sleep state if the FB terminal voltage of the control unit 501 is equal to or greater than dec and determines that the state is the deep sleep state if the FB terminal voltage is equal to or smaller than 46 dec.

A secondary side rectification circuit 119 of the switching power supply circuit 500 is a smoothing circuit including the synchronous rectification control unit 111, the FET12, the diode D12, the coil L11, the capacitor C11 and the capacitor C12, compared to FIG. 8 of the fourth embodiment. This is different from the fourth embodiment. The configuration of the secondary side in the present embodiment may be applied to the fourth embodiment, or the configuration of the secondary side in the fourth embodiment may be applied to the present embodiment. The terminal S of the synchronous rectification control unit 111 can determine whether the diode D12 is conducted or not conducted, and the synchronous rectification control unit 111 puts the terminal D into the high level state only if the terminal S determines that the diode D12 is in the conductive state. In this way, the FET12 for synchronous rectification is turned on, and the voltage of the secondary winding S1 of the transformer T1 is rectified. The synchronous rectification control unit 111 is a control unit integrally formed as a discrete circuit or a semiconductor integrated circuit. The power supply voltage Vout is supplied between the terminal VC and the terminal G of the synchronous rectification control unit 111. The capacitors C11 and C12 and the coil L11 smooth the voltage rectified by the synchronous rectification control unit 111, and the voltage is output as the power supply voltage Vout.

The configuration of an input voltage detection unit 516 is also different from the input voltage detection unit 113 of the fourth embodiment. Dividing resistances R91 and R92 of the input voltage detection unit 516 divide the input voltage Vin stored in the smoothing capacitor C3, and the input voltage detection unit 516 inputs the voltage to a VinSN terminal of the control unit 501. In this way, the control unit 501 detects the voltage of the input voltage Vin.

[Control Method of TIME1 and TIME2 According to Target Voltage]

A control method of TIME1 and TIME2 according to the target voltage in the present embodiment will be described with reference to FIGS. 16 to 18D. FIG. 16 corresponds to FIG. 12, FIG. 17 corresponds to FIG. 13, and FIGS. 18A to 18D correspond to FIGS. 14A to 14D. Duplicating description will not be repeated. In the case where the target voltage is 24V, TIME1 and TIME2 are set so that the load increases with an increase in the FB terminal voltage when the switching power supply circuit 500 is in the driving state, i.e. when the FB terminal voltage is equal to or greater than 21 dec that is a second level. Therefore, when the target voltage is 24V, and the FB terminal voltage is equal to or greater than 21 dec, TIME1 and TIME2 are set so that TIME1 and TIME2 as well as the ratio of TIME1 and TIME2 (TIME1/TIME2) increase with an increase in the FB terminal voltage (FIGS. 18A and 18B).

On the other hand, when the switching power supply circuit 500 is in the stand-by state, i.e. when the FB terminal voltage is equal to or smaller than 20 dec, the switching frequency is high and may become equal to or greater than a predetermined frequency. Specifically, the predetermined frequency is a frequency of 150 kHz with which the effect of radiated noise on the AC power supply 10 becomes large, and the frequency may exceed 150 kHz in the stand-by state. To avoid such a situation in the present embodiment, TIME1 is constant regardless of the FB terminal voltage, and TIME2 is set to decrease with an increase in the FB terminal voltage, when the FB terminal voltage is equal to or smaller than 20 dec with which the load is small (FIG. 18A). During the intermittent operation, the lower the FB terminal voltage, the longer the turn-on time of TIME2. In this way, the control unit 101 controls the FET2 turn-on time during the intermittent operation in a length equal to or greater than the FET2 turn-on time at the transition to the intermittent operation. As a result, the ratio of TIME1 and TIME2 (TIME1/TIME2) increases with an increase in the FB terminal voltage (FIG. 18B). Therefore, the relationship between the FB terminal voltage and the load in which the load increases with an increase in the FB terminal voltage can be maintained from the driving state, and the situation that the switching frequency exceeds 150 kHz with which the effect of the radiated noise on the AC power supply 10 is large can be avoided.

In the case where the target voltage is 5V, TIME1 and TIME2 are set as follows when the switching power supply circuit 500 is in the deep sleep state, i.e. when the FB terminal voltage is equal to or smaller than 46 dec. More specifically, to reduce the power loss in the switching power supply circuit 500, TIME1 and TIME2 are set to perform the intermittent operation in which the FET1 and the FET2 are intermittently turned on and off. The intermittent operation can be mandatorily performed by setting TIME1 and TIME2 so that the ratio of TIME1 and TIME2 (TIME1/TIME2) becomes sufficiently large with respect to the target voltage. In the present embodiment, both of TIME1 and TIME2 are set to constant values regardless of the FB terminal voltage (FIG. 18C).

On the other hand, in the case where the switching power supply circuit 500 is in the sleep state, i.e. in the case where the FB terminal voltage is equal to or greater than 47 dec that is a first level, the ripple of the output voltage Vout increases if the intermittent operation is performed as in the deep sleep state. To avoid such a situation in the present embodiment, both of TIME1 and TIME2 are increased with an increase in the FB terminal voltage so that the load increases with an increase in the FB terminal voltage in the sleep state (FIG. 18C). In the present embodiment, the ratio of TIME1 and TIME2 (TIME1/TIME2) is also set to increase (FIG. 18D). As in the fourth embodiment, the table to be used can be changed according to the VinSN terminal voltage equivalent to the AC power supply voltage to perform the control by taking into account the influence of the input voltage Vin. In the graphs of FIGS. 18A to 18D, solid lines illustrate the case where the VinSN terminal voltage is 48 dec, and dashed lines illustrate the case where the VinSN terminal voltage is 51 dec. Comparing the tables, TIME2 does not depend on the VinSN terminal voltage, and only TIME1 depends on the VinSN terminal voltage. As can be understood in FIGS. 18A and 18C, the larger the VinSN terminal voltage, the shorter TIME1. TIME1 and the VinSN terminal voltage are inversely proportional. As can be understood in FIGS. 18B and 18D, the larger the VinSN terminal voltage, the smaller the ratio of TIME1 and TIME2 (TIME1/TIME2). The ratio of TIME1 and TIME2 and the VinSN terminal voltage are inversely proportional.

[Switching Control of Control According to Target Voltage]

Figure 19:
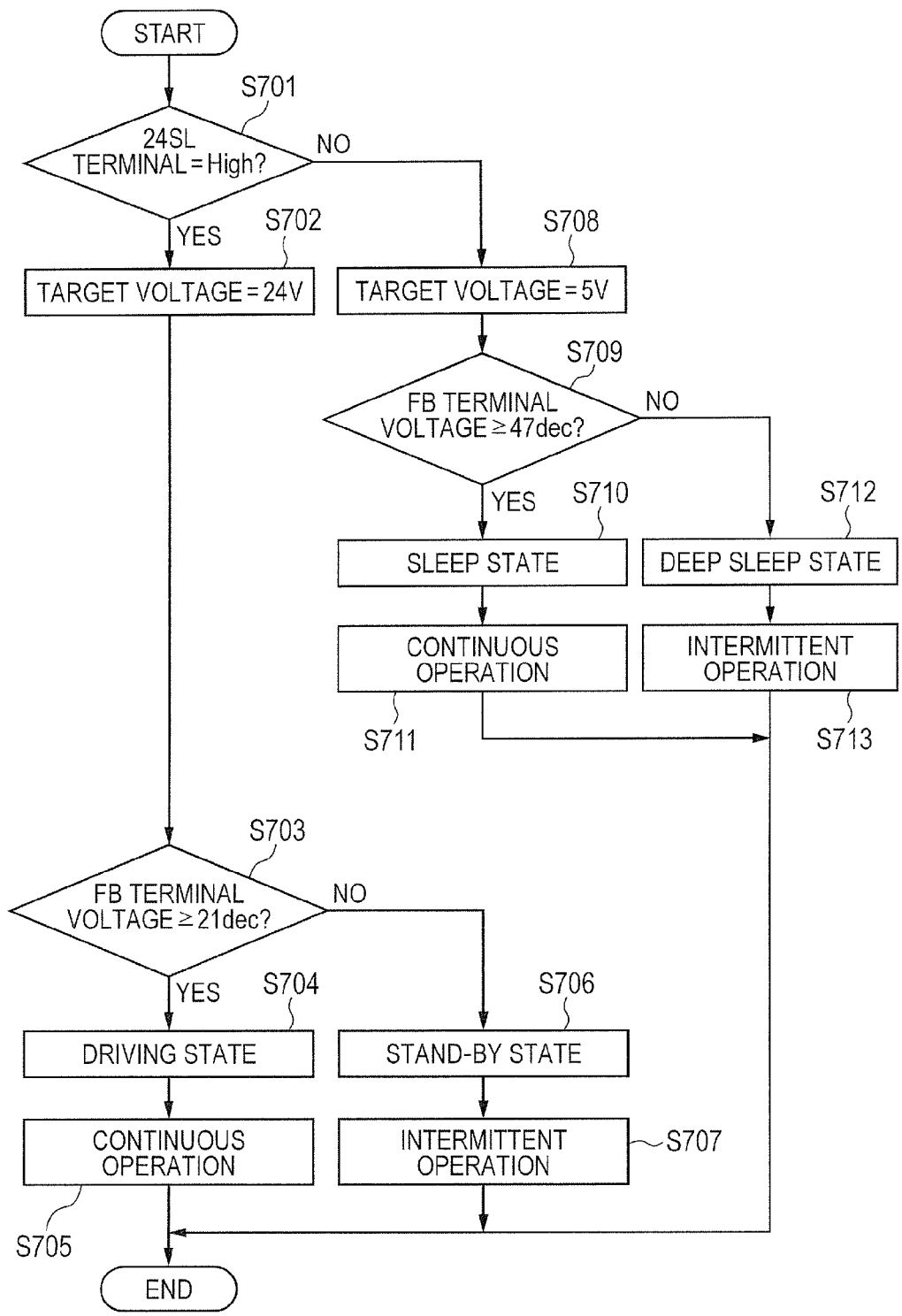
FIG. 19 is a flow chart illustrating switching of control corresponding to a target voltage according to the fifth embodiment.

A flow of the switching of the control according to the target voltage of the control unit 501 described above will be described with reference to a flow chart of FIG. 19. In step (hereinafter, "S") 701, the control unit 501 determines whether the voltage input to the 24SL terminal of the control unit 501 is in a high level. If the control unit 501 determines that the signal in the high level is input to the 24SL terminal in S701, the control unit 501 sets the target voltage to 24V in S702. In S703, the control unit 501 determines whether the FB terminal voltage is equal to or greater than 21 dec.

If the control unit 501 determines that the FB terminal voltage is equal to or greater than 21 dec in S703, the control unit 501 determines that the switching power supply circuit 500 is in the driving state in S704 and controls the switching power supply circuit 500 to perform the continuous operation in S705. More specifically, the control unit 501 sets TIME1 and TIME2 with the FB terminal voltage of equal to or greater than 21 in the target voltage 24V of FIG. 16 according to the VinSN terminal voltage.

On the other hand, if the control unit 501 determines that the FB terminal voltage is smaller than 21 dec (equal to or smaller than 20 dec) in S703, the control unit 501 determines that the switching power supply circuit 500 is in the stand-by state in S706 and controls the switching power supply circuit 500 to perform the intermittent operation in S707. More specifically, the control unit 501 sets TIME1 and TIME2 with the FB terminal voltage of equal to or smaller than 20 in the target voltage 24V of FIG. 16 according to the VinSN terminal voltage and performs the intermittent operation.

If the control unit 501 determines that the voltage input to the 24SL terminal of the control unit 501 is in a low level in S701, the control unit 501 sets the target voltage to 5V in S708. In S709, the control unit 501 determines whether the FB terminal voltage is equal to or greater than 47 dec. If the control unit 501 determines that the FB terminal voltage is equal to or greater than 47 dec in S709, the control unit 501 determines that the switching power supply circuit 500 is in the sleep state in S710 and controls the switching power supply circuit 500 to perform the continuous operation in S711. More specifically, the control unit 501 sets TIME1 and TIME2 with the FB terminal voltage equal to or greater than 47 in the target voltage 5V of FIG. 17 according to the VinSN terminal voltage.

On the other hand, if the control unit 501 determines that the FB terminal voltage is smaller than 47 dec (equal to or smaller than 46 dec) in S709, the control unit 501 determines that the switching power supply circuit 500 is in the deep sleep state in S712 and controls the switching power supply circuit 500 to perform the intermittent operation in S713. More specifically, the control unit 501 sets TIME1 and TIME2 with the FB terminal voltage equal to or smaller than 46 in the target voltage 5V of FIG. 17 according to the VinSN terminal voltage.

As described, even when the switching power supply circuit 500 in the present embodiment includes a plurality of states, such as the driving state and the stand-by state, the FET1 and FET2 turn-on times can be controlled at appropriately values according to each state. As a result, a switching power supply that can flexibly handle required specifications can be realized.

According to the present embodiment, the power supply apparatus that can output a plurality of voltages can flexibly handle specifications required for each voltage.

Sixth Embodiment

The power supply apparatus described in the fourth and fifth embodiments can be applied to, for example, a low voltage power supply of an image forming apparatus, i.e. a power supply that supplies power to a controller (control unit) and a driving unit such as a motor. A configuration of the image forming apparatus provided with the power supply apparatus of the fourth and fifth embodiments will be described below.

[Configuration of Image Forming Apparatus]

Figure 20:
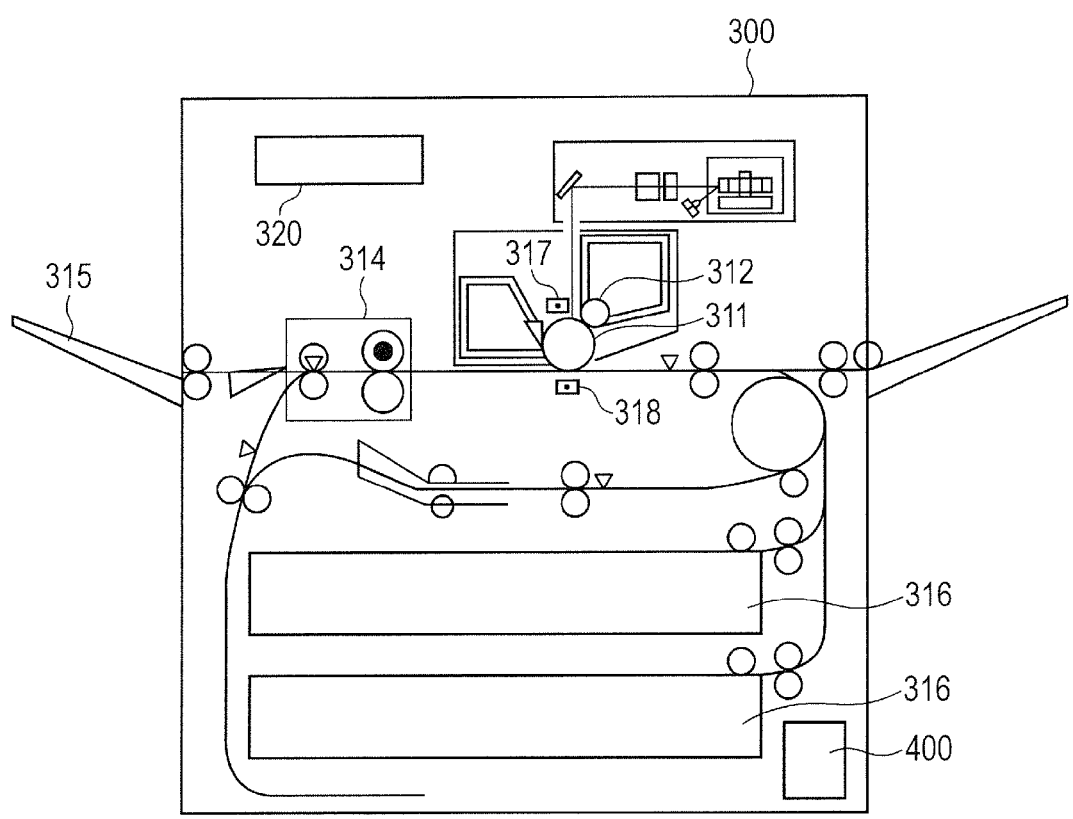
FIG. 20 is a diagram illustrating an image forming apparatus according to a sixth embodiment.

A laser beam printer will be described as an example of the image forming apparatus. FIG. 20 illustrates a schematic configuration of the laser beam printer as an example of an electrophotographic printer. The laser beam printer 300 includes: the photosensitive drum 311 as an image bearing member for forming an electrostatic latent image; the charging unit 317 (charging device) that uniformly charges the photosensitive drum 311; and the developing unit 312 (developing device) that uses toner to develop an electrostatic latent image formed on the photosensitive drum 311. The transfer unit 318 (transfer device) transfers a toner image developed on the photosensitive drum 311 to a sheet (not illustrated) as a recording material supplied from the cassette 316. The fixing device 314 fixes the toner image transferred to the sheet, and the sheet is discharged to the tray 315. The photosensitive drum 311, the charging unit 317, the developing unit 312 and the transfer unit 318 form an image forming unit. The laser beam printer 300 also includes one of the switching power supply circuit 100 and the switching power supply circuit 500 described in the fourth and fifth embodiments as the power supply apparatus. The image forming apparatus that can be provided with the switching power supply circuit 400 of the fourth and fifth embodiments is not limited to the one illustrated in FIG. 20, and the apparatus may be an image forming apparatus including a plurality of image forming units, for example. The apparatus may also be an image forming apparatus including: a primary transfer unit that transfers a toner image on the photosensitive drum 311 to an intermediate transfer belt; and a secondary transfer unit that transfers the toner image on the intermediate transfer belt to a sheet.

The laser beam printer 300 includes the controller 320 that controls image forming operation by the image forming unit and conveyance operation of the sheet, and the switching power supply circuit 400 according to the fourth and fifth embodiments supplies power to the controller 320, for example. The switching power supply circuit 400 according to the fourth and fifth embodiments also supplies power to the driving unit, such as a motor, for rotating the photosensitive drum 311 or for driving various rollers for conveying the sheet. The controller 320 outputs a 24VSL signal for determining whether to set the target voltage of the switching power supply circuit 400 to 4V or 5V to the switching power supply circuit 400 according to the operation state of the laser beam printer 300. The control unit 101 detects the operation state of the switching power supply circuit 400 based on the FB terminal voltage and sets the FET1 turn-on time TIME1 and the FET2 turn-on time TIME2 as in FIG. 12. As a result, the continuous operation and the intermittent operation of the FETs 1 and 2 can be appropriately set according to the target voltage, and the power efficiency during the low load can be improved.

The image forming apparatus of the present embodiment has a power saving state for realizing power saving, with respect to the driving state for performing the image forming operation. Examples of the state for realizing power saving include the stand-by state, the sleep state and the deep sleep state described in the fifth embodiment. In the image forming apparatus of the present embodiment, the switching power supply circuit 400 also operates according to each state. The control unit 101 detects the operation state of the switching power supply circuit 400 based on the FB terminal voltage and sets the FET1 turn-on time TIME1 and the FET2 turn-on time TIME2 as in FIGS. 14A to 14D. As a result, the continuous operation and the intermittent operation of the FETs 1 and 2 can be appropriately set according to the target voltage, and the power efficiency during the low load can be improved. When the switching power supply circuit 400 of the fifth embodiment is included, the effect of the radiated noise can be reduced in the stand-by state of the laser beam printer 300, and the ripple of the output voltage Vout can be reduced in the sleep state.

According to the present embodiment, a power supply apparatus that can output a plurality of voltages can flexibly handle specifications required for each voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-131592, filed Jun. 30, 2015, and Japanese Patent Application No. 2015-131593, filed Jun. 30, 2015, which are hereby incorporated by reference herein in their entirety.

What is claimed is:

1. A power supply apparatus comprising:
a transformer comprising a primary winding and a secondary winding;
a first switching element connected in series to the primary winding of the transformer;
a second switching element connected in parallel to the primary winding of the transformer;
a capacitor connected in series to the second switching element and connected in parallel to the primary winding of the transformer along with the second switching element;
a feedback unit that outputs information according to a voltage induced in the secondary winding of the transformer; and
a control unit that controls turn-on or turn-off of the first switching element and the second switching element based on the information input from the feedback unit,
wherein the control unit can perform operation of alternately repeating a first period and a second period, wherein the first period is for performing switching operation of alternately turning on or turning off the first switching element and the second switching element before and after a dead time for turning off both of the first switching element and the second switching element, and the second period is for halting the switching operation, and
wherein the control unit makes a transition to the second period after turning on the second switching element in the transition from the first period to the second period and also makes a transition to the first period after turning on the second switching element in the transition from the second period to the first period, and wherein the control unit turns on the second switching element in a shorter time than a time of continuation of the second period in the transition from the first period to the second period and in the transition from the second period to the first period.

2. A power supply apparatus according to claim 1, wherein the control unit turns on the second switching element in a shorter time than a time that the second switching element is turned on in the first period in the transition from the first period to the second period and in the transition from the second period to the first period.

3. A power supply apparatus according to claim 2, wherein the control unit turns on the second switching element in a time in a half of the time that the second switching element is turned on in the first period in the transition from the first period to the second period.

4. A power supply apparatus according to claim 2 or 3, wherein the control unit turns on the second switching element in a time shorter than the half of the time that the second switching element is turned on in the first period in the transition from the second period to the first period.

5. A power supply apparatus according to claim 3, wherein the capacitor is charged as the second switching element is turned on in the transition from the first period to the second period, and the charged state is maintained in the second period.

6. A power supply apparatus according to claim 5, wherein the capacitor is discharged as the second switching element is turned on in the transition from the second period to the first period.

7. A power supply apparatus according to claim 1, wherein the control unit makes the transition from the first period to the second period or from the second period to the first period based on at least the information input from the feedback unit.

8. A power supply apparatus according to claim 7, wherein the control unit makes the transition from the second period to the first period based on the information input from the feedback unit and the time of the continuation of the second period.

9. An image forming apparatus comprising:
an image forming unit that forms an image; and
a power supply apparatus that supplies power to the image forming apparatus,
wherein the power supply apparatus comprises:
a transformer comprising a primary winding and a secondary winding;
a first switching element connected in series to the primary winding of the transformer;
a second switching element connected in parallel to the primary winding of the transformer;
a capacitor connected in series to the second switching element and connected in parallel to the primary winding of the transformer along with the second switching element;
a feedback unit that outputs information according to a voltage induced in the secondary winding of the transformer; and
a control unit that controls turn-on or turn-off of the first switching element and the second switching element based on the information input from the feedback unit,
wherein the control unit can perform operation of alternately repeating a first period and a second period, wherein the first period is for performing switching operation of alternately turning on or turning off the first switching element and the second switching element before and after a dead time for turning off both of the first switching element and the second switching element, and the second period is for halting the switching operation, and wherein the control unit makes a transition to the second period after turning on the second switching element in the transition from the first period to the second period and also makes a transition to the first period after turning on the second switching element in the transition from the second period to the first period, wherein the power supply apparatus supplies a first voltage when the image forming apparatus forms an image and supplies a second voltage lower than the first voltage when the image forming apparatus is in a power saving state, and the control unit performs control to perform operation of continuing the first period when the power supply apparatus controls the control unit to output the first voltage, and performs control to perform the operation of continuing the first period or operation of alternately repeating the first period and the second period when the power supply apparatus controls the control unit to output the second voltage.

10. An image forming apparatus according to claim 9, wherein the control unit determines a load state of the supply of the power by the power supply apparatus based on at least the information input from the feedback unit.

11. A power supply apparatus comprising:
a transformer comprising a primary winding and a secondary winding;
a first switching element connected in series to the primary winding of the transformer;
a second switching element connected in parallel to the primary winding of the transformer;
a capacitor connected in series to the second switching element and connected in parallel to the primary winding of the transformer along with the second switching element;
a rectification smoothing unit that rectifies and smooths a voltage induced in the secondary winding of the transformer;
a feedback unit that outputs information according to the voltage rectified and smoothed by the rectification smoothing unit; and
a control unit that controls turn-on or turn-off of the first switching element and the second switching element based on the information input from the feedback unit so that the voltage rectified and smoothed by the rectification smoothing unit becomes a predetermined voltage,
wherein operation can be performed in a first state in which the predetermined voltage is controlled at a first voltage and a second state in which the predetermined voltage is controlled at a second voltage greater than the first voltage, and
wherein the control unit controls the first switching element and the second switching element so that a turn-on time of the first switching element is longer in the second state than in the first state, a turn-on time of the second switching element is shorter in the second state than in the first state, and a period for alternately turning on or off the first switching element and the second switching element is shorter in the second state than in the first state,
wherein the control unit switches the state to the first state or the second state according to a level of a signal corresponding to the information output by the feedback unit, and wherein in at least one of the first state and the second state, the control unit performs intermittent operation of repeating a first period and a second period, wherein the first period is for performing switching operation of alternately turning on or turning off the first switching element and the second switching element across a dead time for turning off both of the first switching element and the second switching element, and the second period is for halting the switching operation.

12. A power supply apparatus according to claim 11, wherein the control unit performs continuous operation of repeating the first period in the second state.

13. A power supply apparatus according to claim 11, wherein in the first state, the control unit performs the intermittent operation if the level of the signal is lower than a predetermined level and performs the continuous operation of repeating the first period if the level of the signal is equal to or greater than the predetermined level.

14. A power supply apparatus according to claim 11, wherein when the control unit performs the intermittent operation in the first state, the control unit makes the turn-on time of the second switching element longer than the turn-on time of the second switching element in the second state.

15. A power supply apparatus according to claim 14, wherein when the control unit performs the intermittent operation in the first state, the control unit controls a ratio of the turn-on time of the first switching element and the turn-on time of the second switching element so that the ratio becomes constant regardless of the level of the signal.

16. A power supply apparatus comprising:
a transformer comprising a primary winding and a secondary winding;
a first switching element connected in series to the primary winding of the transformer;
a second switching element connected in parallel to the primary winding of the transformer;
a capacitor connected in series to the second switching element and connected in parallel to the primary winding of the transformer along with the second switching element;
a rectification smoothing unit that rectifies and smooths a voltage induced in the secondary winding of the transformer;
a feedback unit that outputs a signal according to the voltage rectified and smoothed by the rectification smoothing unit; and
a control unit that controls turn-on or turn-off of the first switching element and the second switching element based on the signal input from the feedback unit so that the voltage rectified and smoothed by the rectification smoothing unit becomes a predetermined voltage,
wherein in both of the first state and the second state, the control unit can perform continuous operation and intermittent operation, wherein the continuous operation is for repeating a first period for performing switching operation of alternately turning on or turning off the first switching element and the second switching element across a dead time for turning off both of the first switching element and the second switching element, and the intermittent operation is for repeating the first period and a second period for halting the switching operation,
wherein operation can be performed in a first state in which the predetermined voltage is controlled at a first voltage and a second state in which the predetermined voltage is controlled at a second voltage greater than the first voltage, and wherein the control unit makes a transition from the continuous operation to the intermittent operation when a turn-on time of the first switching element becomes equal to or smaller than a predetermined time, and the predetermined time varies between the first state and the second state.

17. A power supply apparatus according to claim 16, wherein the control unit controls the first switching element during the intermittent operation to be constant regardless of a level of the signal and controls a turn-on time of the second switching element during the intermittent operation at a length equal to or greater than the turn-on time of the second switching element at the transition to the intermittent operation.

18. A power supply apparatus according to claim 16, wherein the control unit controls the turn-on times of the first switching element and the second switching element so that a frequency during the intermittent operation does not become equal to or greater than a predetermined frequency.

19. A power supply apparatus according to claim 18, wherein the predetermined frequency is 150 kHz.

20. A power supply apparatus according to claim 16, wherein in the first state, the control unit performs the intermittent operation if the level of the signal is lower than a first level equivalent to the predetermined time and performs the continuous operation if the level of the signal is equal to or greater than the first level.

21. A power supply apparatus according to claim 16, wherein in the second state, the control unit performs the intermittent operation if the level of the signal is lower than a second level equivalent to the predetermined time and performs the continuous operation if the level of the signal is equal to or greater than the second level.

22. An image forming apparatus comprising:
an image forming unit that forms an image; and
a power supply apparatus that supplies power to the image forming apparatus,
wherein the power supply apparatus comprises:
a transformer comprising a primary winding and a secondary winding;
a first switching element connected in series to the primary winding of the transformer;
a second switching element connected in parallel to the primary winding of the transformer;
a capacitor connected in series to the second switching element and connected in parallel to the primary winding of the transformer along with the second switching element;
a rectification smoothing unit that rectifies and smooths a voltage induced in the secondary winding of the transformer;
a feedback unit that outputs information according to the voltage rectified and smoothed by the rectification smoothing unit; and
a control unit that controls turn-on or turn-off of the first switching element and the second switching element based on the information input from the feedback unit so that the voltage rectified and smoothed by the rectification smoothing unit becomes a predetermined voltage,
wherein operation can be performed in a first state in which the predetermined voltage is controlled at a first voltage and a second state in which the predetermined voltage is controlled at a second voltage greater than the first voltage, and
wherein the control unit controls the first switching element and the second switching element so that a turn-on time of the first switching element is longer in the second state than in the first state, a turn-on time of the second switching element is shorter in the second state than in the first state, and a period for alternately turning on or off the first switching element and the second switching element is shorter in the second state than in the first state.

23. An image forming apparatus according to claim 22, wherein the power supply apparatus supplies a first voltage when the image forming apparatus forms an image and supplies a second voltage lower than the first voltage when the image forming apparatus is in a power saving state, and
the control unit performs control to perform operation of continuing the first period when the power supply apparatus controls the control unit to output the first voltage, and performs control to perform the operation of continuing the first period or operation of alternately repeating the first period and the second period when the power supply apparatus controls the control unit to output the second voltage.

24. An image forming apparatus comprising:
an image forming unit that forms an image; and
a power supply apparatus that supplies power to the image forming apparatus,
wherein the power supply apparatus comprises:
a transformer comprising a primary winding and a secondary winding;
a first switching element connected in series to the primary winding of the transformer;
a second switching element connected in parallel to the primary winding of the transformer;
a capacitor connected in series to the second switching element and connected in parallel to the primary winding of the transformer along with the second switching element;
a rectification smoothing unit that rectifies and smooths a voltage induced in the secondary winding of the transformer;
a feedback unit that outputs a signal according to the voltage rectified and smoothed by the rectification smoothing unit; and
a control unit that controls turn-on or turn-off of the first switching element and the second switching element based on the signal input from the feedback unit so that the voltage rectified and smoothed by the rectification smoothing unit becomes a predetermined voltage,
wherein in both of the first state and the second state, the control unit can perform continuous operation and intermittent operation, wherein the continuous operation is for repeating a first period for performing switching operation of alternately turning on or turning off the first switching element and the second switching element across a dead time for turning off both of the first switching element and the second switching element, and the intermittent operation is for repeating the first period and a second period for halting the switching operation,
wherein operation can be performed in a first state in which the predetermined voltage is controlled at a first voltage and a second state in which the predetermined voltage is controlled at a second voltage greater than the first voltage, and
wherein the control unit makes a transition from the continuous operation to the intermittent operation when a turn-on time of the first switching element becomes equal to or smaller than a predetermined time, and the predetermined time varies between the first state and the second state.

25. An image forming apparatus according to claim 24, wherein the power supply apparatus supplies a first voltage when the image forming apparatus forms an image and supplies a second voltage lower than the first voltage when the image forming apparatus is in a power saving state, and the control unit performs control to perform operation of continuing the first period when the power supply apparatus controls the control unit to output the first voltage and performs control to perform the operation of continuing the first period or operation of alternately repeating the first period and the second period when the power supply apparatus controls the control unit to output the second voltage.

26. A power supply apparatus comprising:
a transformer having a primary winding and a secondary winding;
a first switching element connected to the primary winding of the transformer in series;
a second switching element connected to the secondary winding of the transformer in parallel;
a capacitor connected to the second switching element in series, the capacitor connected to the primary winding with the second switching element in parallel; and
a control unit configured to alternately turn on and off the first switching element and the second switching element so as to form a dead period in which the first switching element and the second switching element are turned off by turning the second switching element on for a shorter period than the turn-off of the first switching element during the turn-off of the first switching element in a case where the control unit turns the first switching element on repeatedly,
wherein the control unit is configured to control an operation of the first switching element and the second switching element in a case of transiting an operation state from a switching state in which the first switching element and the second switching element are turned on and off alternately to a halt state to form a halt period in which the first switching element and the second switching element are turned off together, the halt period being a period longer than the dead time period, the control unit controls so that the transit to the halt state is performed after the first switching element is turned off, the second switching element is turned on and then the second switching element is turned off in a state in which a peak voltage is charged in the capacitor in the switching.

27. A power supply apparatus according to claim 26, wherein a time period in which the second switching element is turned on in the state change from the switching state to the halt state is shorter than a time period in which the second switching element is turned on in the switching state.

28. A power supply apparatus according to claim 27, wherein the time period in which the second switching element is turned on in the switching state is equal to or less than a half of the time period in which the second switching element is turned on in the switching state.

29. A power supply apparatus according to claim 26, wherein in a case of the state change from the switching state to the halt state, the capacitor is charged by turning-on of the second switching element and a state in which the capacitor is charged is maintained in the halt state.

30. A power supply apparatus according to claim 26, comprising a feedback unit to feed information according to a voltage induced to the secondary winding back to the control unit,
wherein in a case where a value corresponding to the information fed back from the feedback unit is less than a predetermined value, the control unit performs the shift to change from the switching state to the halt state.

31. A power supply apparatus according to claim 26, wherein the state change from the switching state to the halt state is performed by an external switching signal.

32. A power supply apparatus according to claim 26, wherein a consumption power of the power supply apparatus in a state in which the state change from the switching state to the halt state is performed alternately.

33. A power supply apparatus according to claim 26, wherein in a case where the operation state is transited from the halt state to the switching state, the control unit controls an operation of the first switching element and the second switching element so that the second switching element is turned on and then transits to the switching state.

34. A power supply apparatus according to claim 26, wherein the dead time period is defined as a period in an operation in which the switching state is continuously performed without transiting to the halt state, and the halt period is defined as a period in an intermittent operation in which the switching state and the halt state are repeated.

35. A power supply apparatus comprising:
a transformer having a primary winding and a secondary winding;
a first switching element connected to the primary winding of the transformer in series;
a second switching element connected to the secondary winding of the transformer in parallel;
a capacitor connected to the second switching element in series, the capacitor connected to the primary winding with the second switching element in parallel; and
a control unit configured to alternately turn on and off the first switching element and the second switching element so as to form a dead period in which the first switching element and the second switching element are turned off by turning the second switching element on for a shorter period than the turn-off of the first switching element during the turn-off of the first switching element in a case where the control unit turns the first switching element on repeatedly,
wherein the control unit is configured to control an operation of the first switching element and the second switching element so that in a case where the control unit controls an operation of the first switching element and the second switching element so as to transit from a switching state in which the first switching element and the second switching element are turned on and off alternately to a halt state in which the first switching element and the second switching element are turned off during a longer period than the dead time period, the control unit control the operation of the first switching element and the second switching element so that the second switching element is turned on in the halt state and then transits to the switching state.

36. A power supply apparatus according to claim 35, wherein a time period in which the second switching element is turned on in the state change from the halt state to the switching state is shorter than a time period in which the second switching element is turned on in the switching state.

37. A power supply apparatus according to claim 36, wherein the time period in which the second switching element is turned on in the switching state is equal to or less than a half of the time period in which the second switching element is turned on in the switching state.

38. A power supply apparatus according to claim 35, wherein in a case of the state change from the halt state to the switching state, the capacitor is charged by turning-on of the second switching element and a state in which the capacitor is charged is maintained in the halt state.

39. A power supply apparatus according to claim 35, comprising a feedback unit to feed information according to a voltage induced to the secondary winding back to the control unit, wherein in a case where a value corresponding to the information fed back from the feedback unit is less than a predetermined value, the control unit performs the shift to change from the halt state to the switching state.

40. A power supply apparatus according to claim 35, wherein the state change from the halt state to the switching state is performed by an external switching signal.

41. A power supply apparatus according to claim 35, wherein in a case where the operation state is transited from the switching state to the halt state, the control unit controls an operation of the first switching element and the second switching element so that the first switching element is turned off in the switching state and then the second switching element is turned on, and then transits to the halt state.

42. A power supply apparatus according to claim 35, wherein the dead time period is defined as a period in an operation in which the switching state is continuously performed without transiting to the halt state, and the halt period is defined as a period in an intermittent operation in which the switching state and the halt state are repeated.

43. A power supply apparatus according to claim 35, wherein a consumption power of the power supply apparats in a state in which the state change from the switching state to the halt state is performed alternately.

44. An image forming apparatus comprising:
an image forming unit configured to perform image formation on a recording material; and
a power supply apparatus configured to generate a power to perform the image formation,
wherein the power supply apparatus comprises:
a transformer having a primary winding and a secondary winding;
a first switching element connected to the primary winding of the transformer in series;
a second switching element connected to the secondary winding of the transformer in parallel;
a capacitor connected to the second switching element in series, the capacitor connected to the primary winding with the second switching element in parallel; and
a control unit configured to alternately turn on and off the first switching element and the second switching element so as to form a dead period in which the first switching element and the second switching element are turned off by turning the second switching element on for a shorter period than the turn-off of the first switching element during the turn-off of the first switching element in a case where the control unit turns the first switching element on repeatedly,
wherein the control unit is configured to control an operation of the first switching element and the second switching element in a case of transiting an operation state from a switching state in which the first switching element and the second switching element are turned on and off alternately to a halt state to form a halt period in which the first switching element and the second switching element are turned off together, the halt period being a period than the dead time period, the control unit controls so that the transit to the halt state is performed after the first switching element is turned off, the second switching element is turned on and then the second switching element is turned off in a state in which a peak voltage is charged in the capacitor in the switching state.

45. An image forming apparatus according to claim 44, wherein a time period in which the second switching element is turned on in the state change from the switching state to the halt state is shorter than a time period in which the second switching element is turned on in the switching state.

46. An image forming apparatus according to claim 45, wherein the time period in which the second switching element is turned on in the switching state is equal to or less than a half of the time period in which the second switching element is turned on in the switching state.

47. An image forming apparatus according to claim 44, wherein in a case of the state change from the switching state to the halt state, the capacitor is charged by turning-on of the second switching element and a state in which the capacitor is charged is maintained in the halt state.

48. An image forming apparatus according to claim 44, comprising a feedback unit to feed information according to a voltage induced to the secondary winding back to the control unit,
wherein in a case where a value corresponding to the information fed back from the feedback unit is less than a predetermined value, the control unit performs the shift change from the switching state to the halt state.

49. An image forming apparatus according to claim 44, wherein the state change from the switching state to the halt state is performed by an external switching signal.

50. An image forming apparatus according to claim 44, wherein the image forming apparatus is switchable between a stand-by mode in which the image formation is capable of performing immediately according to a print order and a sleep-state mode in which a power consumption is smaller than the stand-by mode.

51. An image forming apparatus comprising:
an image forming unit configured to perform image formation on a recording material; and
a power supply apparatus configured to generate a power to perform the image formation,
wherein the power supply apparatus comprises:
a transformer having a primary winding and a secondary winding;
a first switching element connected to the primary winding of the transformer in series;
a second switching element connected to the secondary winding of the transformer in parallel;
a capacitor connected to the second switching element in series, the capacitor connected to the primary winding with the second switching element in parallel; and
a control unit configured to alternately turn on and off the first switching element and the second switching element so as to form a dead period in which the first switching element and the second switching element are turned off by turning the second switching element on for a shorter period than the turn-off of the first switching element during the turn-off of the first switching element in a case where the control unit turns the first switching element on repeatedly,
wherein the control unit is configured to control an operation of the first switching element and the second switching element so that in a case where the control unit controls an operation of the first switching element and the second switching element so as to transit from a switching state in which the first switching element and the second switching element are turned on and off alternately to a halt state in which the first switching element and the second switching element are turned off during a longer period than the dead time period, the control unit control the operation of the first switching element and the second switching element so that the second switching element is turned on in the halt state and then transits to the switching state.

52. An image forming apparatus according to claim 51, wherein a time period in which the second switching element is turned on in the state change from the halt state to the switching state is shorter than a time period in which the second switching element is turned on in the switching state.

53. An image forming apparatus according to claim 51, wherein the time period in which the second switching element is turned on in the switching state is equal to or less than a half of the time period in which the second switching element is turned on in the switching state.

54. An image forming apparatus according to claim 51, wherein in a case of the state change from the halt state to the switching state, the capacitor is charged by turning-on of the second switching element and a state in which the capacitor is charged is maintained in the halt state.

55. A power supply apparatus according to claim 51, comprising a feedback unit to feed information according to a voltage induced to the secondary winding back to the control unit,
wherein in a case where a value corresponding to the information fed back from the feedback unit is less than a predetermined value, the control unit performs the shift to change from the halt state to the switching state.

56. A power supply apparatus according to claim 51, wherein the state change from the halt state to the switching state is performed by an external switching signal.

57. A power supply apparatus according to claim 51, wherein a consumption power of the power supply apparatus in a state in which the state change from the switching state to the halt state is performed alternately.

* * * * *